US012447102B2

(12) United States Patent
Arcio

(10) Patent No.: US 12,447,102 B2
(45) Date of Patent: Oct. 21, 2025

(54) HAND CLAMP FOR TRIGGER POINT THERAPY AND ACUPRESSURE

(71) Applicant: Madeline Arcio, Columbus, OH (US)

(72) Inventor: Madeline Arcio, Columbus, OH (US)

( * ) Notice: Subject to any disclaimer, the term of this patent is extended or adjusted under 35 U.S.C. 154(b) by 209 days.

(21) Appl. No.: 18/235,159

(22) Filed: Aug. 17, 2023

(65) Prior Publication Data

US 2025/0057726 A1 Feb. 20, 2025

(51) Int. Cl.
*A61H 39/04* (2006.01)
*A61H 39/02* (2006.01)

(52) U.S. Cl.
CPC ............. *A61H 39/04* (2013.01); *A61H 39/02* (2013.01)

(58) Field of Classification Search
CPC ........ A61H 39/00; A61H 39/02; A61H 39/04; A61H 2201/0192; A61H 2201/1253; A61H 2201/1635; A61H 2201/165; A61H 2205/065; A61H 2205/067; A61H 7/001
See application file for complete search history.

(56) References Cited

U.S. PATENT DOCUMENTS

| | | | |
|---|---|---|---|
| 1,453,863 | A | 5/1923 | Conrad |
| 1,782,752 | A | 11/1930 | Weisler |
| 2,711,167 | A | 6/1955 | Rickard |
| 3,595,225 | A | 7/1971 | Beeman |
| 3,884,240 | A | 5/1975 | Gilman |
| 3,923,064 | A | 12/1975 | Leupold |
| 4,122,852 | A | 10/1978 | Knetsch |
| 4,319,574 | A | 3/1982 | Sun |
| 4,320,760 | A | 3/1982 | Sun |
| 4,479,495 | A | 10/1984 | Isaacson |
| 4,549,536 | A | 10/1985 | Varjabedian |
| 4,592,342 | A | 6/1986 | Salmasian |
| 4,619,447 | A | 10/1986 | Blake |
| 4,632,095 | A | 12/1986 | Libin |
| 4,694,831 | A | 9/1987 | Seltzer |
| 4,716,898 | A | 1/1988 | Chauve |
| 4,944,289 | A | 7/1990 | Matthews |
| 4,981,146 | A | 1/1991 | Bertolucci |
| 5,021,058 | A | 6/1991 | McKee |
| 5,078,728 | A | 1/1992 | Giarratano |
| 5,094,227 | A | 3/1992 | Eglauf |
| 5,224,469 | A | 7/1993 | Mocny |
| 5,366,475 | A | 11/1994 | Voss |
| 5,405,310 | A | 4/1995 | Yoo |
| 5,405,357 | A | 4/1995 | Rowe-Lanzisera |
| 5,423,853 | A | 6/1995 | Lasvignes |
| 5,448,777 | A | 9/1995 | Lew |
| 5,470,304 | A | 11/1995 | Decanto |
| 5,501,697 | A | 3/1996 | Fisher |
| 5,584,854 | A | 12/1996 | Minarik |
| 5,601,598 | A | 2/1997 | Fisher |
| 5,662,679 | A | 9/1997 | Voss |
| 5,666,964 | A | 9/1997 | Meilus |
| 5,695,520 | A | 12/1997 | Bruckner |
| 5,709,647 | A | 1/1998 | Ferber |
| 5,713,833 | A | 2/1998 | Milligan |
| 5,735,143 | A | 4/1998 | Tanaka |

(Continued)

*Primary Examiner* — Robert A Lynch
(74) *Attorney, Agent, or Firm* — Dawsey Co., LPA; David J. Dawsey

(57) ABSTRACT

A hand clamp for trigger point therapy and acupressure, having a unique configuration of contact points and motion to allow a user to precisely activate their own acupressure and trigger points.

20 Claims, 26 Drawing Sheets

(56) References Cited

U.S. PATENT DOCUMENTS

| | | | | |
|---|---|---|---|---|
| 5,792,093 | A | 8/1998 | Tanaka | |
| 5,792,175 | A | 8/1998 | Yoo | |
| 6,053,881 | A | 4/2000 | Boodramsingh | |
| 6,313,370 | B1 | 11/2001 | Hyson | |
| 6,361,550 | B2 | 3/2002 | Grey | |
| 6,663,653 | B2 | 12/2003 | Akerfeldt | |
| 6,711,750 | B1 | 3/2004 | Yoo | |
| 6,711,789 | B2 | 3/2004 | Ping | |
| 6,718,202 | B2 | 4/2004 | Mann | |
| 6,763,525 | B1 | 7/2004 | Spector | |
| 6,835,174 | B2 | 12/2004 | Yoo | |
| 6,986,779 | B2 | 1/2006 | Begley | |
| 7,077,855 | B2 | 7/2006 | Curtis | |
| 7,101,345 | B1 | 9/2006 | Liu | |
| 7,393,333 | B2 | 7/2008 | Stivers | |
| 7,452,339 | B2 | 11/2008 | Mattison | |
| 7,637,883 | B2 | 12/2009 | Nyi | |
| 7,660,637 | B2 | 2/2010 | Szeles | |
| D616,559 | S | 5/2010 | Boyer | |
| 7,763,046 | B2 | 7/2010 | Schouten | |
| 7,780,612 | B2 | 8/2010 | Ross | |
| D623,306 | S | 9/2010 | Boyer | |
| 7,871,421 | B2 | 1/2011 | Woodley | |
| 8,031,559 | B2 | 10/2011 | Lee | |
| 8,048,009 | B2 | 11/2011 | Porter | |
| 8,137,379 | B2 | 3/2012 | Abash | |
| 8,602,962 | B2 | 12/2013 | Gavish | |
| 8,808,324 | B2 | 8/2014 | Van Kuren | |
| 9,301,900 | B2 | 4/2016 | Johnston | |
| D796,686 | S | 9/2017 | Internicola | |
| 10,307,332 | B2 | 6/2019 | Cheng | |
| 10,363,198 | B2 | 7/2019 | Salstein-Begley | |
| 11,077,010 | B2 | 8/2021 | Heller | |
| 2002/0151930 | A1 | 10/2002 | Mills | |
| 2003/0120189 | A1 | 6/2003 | Chinea | |
| 2003/0163176 | A1 | 8/2003 | Bae | |
| 2004/0044362 | A1 | 3/2004 | Klassen | |
| 2004/0158284 | A1 | 8/2004 | Son | |
| 2005/0222608 | A1 | 10/2005 | Hou | |
| 2006/0190026 | A1 | 8/2006 | Sanders | |
| 2007/0073335 | A1 | 3/2007 | Carter-Smith | |
| 2007/0093867 | A1 | 4/2007 | Savoia | |
| 2007/0198054 | A1 | 8/2007 | Hecht | |
| 2008/0021498 | A1 | 1/2008 | Lustro | |
| 2008/0091254 | A1 | 4/2008 | Wong | |
| 2009/0177129 | A1 | 7/2009 | Chan | |
| 2009/0182387 | A1 | 7/2009 | Liu | |
| 2009/0209993 | A1 | 8/2009 | Hsieh | |
| 2010/0152771 | A1 | 6/2010 | Di Lustro | |
| 2011/0270013 | A1 | 11/2011 | Labash | |
| 2013/0041401 | A1 | 2/2013 | Di Lustro | |
| 2013/0150758 | A1 | 6/2013 | Cox, Jr. | |
| 2013/0190644 | A1 | 7/2013 | Spector | |
| 2015/0224024 | A1 | 8/2015 | Yoo | |
| 2015/0320637 | A1 | 11/2015 | Henre | |
| 2016/0242997 | A1 | 8/2016 | Ho | |
| 2017/0042764 | A1 | 2/2017 | Tima | |
| 2017/0135899 | A1 | 5/2017 | Milkowski | |
| 2017/0326027 | A1 | 11/2017 | Moore | |
| 2017/0326028 | A1 | 11/2017 | Doogan | |
| 2019/0038505 | A1 | 2/2019 | Wedemeyer | |
| 2019/0110949 | A1 | 4/2019 | Bhatti | |
| 2020/0093688 | A1 | 3/2020 | Pantaleo | |
| 2020/0237617 | A1 | 7/2020 | Moore | |
| 2020/0324104 | A1 | 10/2020 | Labuschagne | |
| 2021/0205169 | A1 | 7/2021 | Schnieder | |
| 2021/0228875 | A1 | 7/2021 | Ehrlich | |
| 2021/0259919 | A1 | 8/2021 | Magarian | |
| 2021/0393478 | A1 | 12/2021 | Bhatti | |
| 2022/0062096 | A1 | 3/2022 | Carballo | |
| 2022/0071842 | A1* | 3/2022 | Short | A61H 39/04 |

* cited by examiner

HAND CLAMP FOR TRIGGER POINT THERAPY AND ACUPRESSURE

CROSS-REFERENCE TO RELATED APPLICATION

Not applicable.

STATEMENT REGARDING FEDERALLY SPONSORED RESEARCH OR DEVELOPMENT

Not applicable.

TECHNICAL FIELD OF THE INVENTION

The present invention relates generally to hand clamps for trigger point therapy and acupressure, having a unique configuration of contact points and motion to allow a user to precisely activate their own acupressure and trigger points.

BACKGROUND

Traditional Chinese medicine (TCM) is based on ancient Chinese medical practices, dating back thousands of years, and has a long tradition of using acupressure and acupuncture to promote health and treat various ailments. The Chinese Emperor wrote a foundational text of TCM believed to have been written around 2600 BCE that included the concept of acupressure points, including LI-4, and describes the theory of meridians, which are channels or pathways through which Qi (energy) flows in the body. Under TCM theory of meridians, Qi could be accessed and manipulated at specific points along the meridians of a human body to restore balance and health. The LI-4 pressure point is located on the hand, between the thumb and index finger, in the webbing where the two fingers meet and is associated with the Large Intestine meridian, which is believed to be responsible for regulating the functions of the large intestine and promoting the flow of Qi throughout the body. It is also believed to be connected to the Lung meridian and is considered a "command point" that has a general regulatory effect on the body.

The means of stimulating acupressure points have evolved though out the history of TCM. For example, the traditional method of applying pressure to stimulate the LI-4 acupressure point LI-4 involved using a finger and thumb. However, over time, various devices have been developed to assist in stimulating the LI-4 acupressure points. Some of these devices include acupressure wristbands which have a small raised surface that directly targets the LI-4 point when worn on the wrist, and handheld acupressure pen devices.

While acupuncture and acupressure work to balance vital energy, or chi, trigger point therapy works to release muscle tension to promote overall health. Trigger points are small areas in the body that become tight and tender due to reduced circulation, aggravated muscle spasm, and augmented nerve sensitivity resulting in sensations such as sharp pain, tingling, and numbness, which can lead to more serious symptoms such as chronic pain and nausea. These complications are often the result of muscle overuse, accident, surgery, skeletal imbalance, poor posture, improper stretching, etc. Such pain and discomfort can be reduced by applying trigger point therapy. Trigger point therapy is the practice of applying pressure to the painful muscle tissue in a way that can untie muscle knots and relieve muscle dysfunction. Trigger point therapy can be categorized as a neuromuscular therapy that intends to promote the health and comfort of the muscles in deep layers of connective tissues. Trigger point therapy includes sustained pressure on the muscle knots which can increase blood circulation. Trigger point therapy is often used to treat carpal tunnel, arthritis, muscle spasm and stiffness, tension, weakness, sciatica, headaches, and back pain. Unfortunately, the most existing hand clamping devices are deficient in how they apply pressure to acupressure points and/or trigger points. For example, hand clamps and clips may not provide consistent pressure to the desired point(s), and/or pressure directed in the most effective direction or orientation. Depending on the strength and technique of the individual using the device, the pressure applied by the hand clamping device is often inconsistent, whether it is too much, too little, and/or applied to a position other than the most effective location. This is particularly common with devices intended to be facilitated by the user, especially when the user is attempting to manipulate the clamp with their non-dominant hand to activate a point, or points, of their dominant hand. Inconsistent application of a hand claim will obviously impact the effectiveness of the stimulation of the desired points, and the desired therapeutic outcomes. Additionally, many of the hand clamping devices have limited adjustability, and/or lack features promoting proper location of the device. Many hand clamps and clips have a fixed pressure setting which many will find inadequate. The ability to adjust the pressure according to individual needs, and properly locate the clamp, are important for comfort and effectiveness, as individuals have different pain thresholds and sensitivities. Furthermore, many of the prior art hand clamps suffer from a lack of precision in that they generally target a broader area of the hand, including the webbing between the thumb and index finger. For example, the LI-4 point is a specific acupressure point within that area requiring specific targeting of the exact LI-4 point position, and likewise for the trigger points; otherwise the stimulation may not be effective. Additionally, many of the prior art hand clamps are limited in the direction that the force is applied. Many hand clamps are difficult to use for self-application. This is especially true if individuals have limited dexterity or hand strength.

SUMMARY

Described below are embodiments of a hand clamp configured to stimulate specific acupressure and trigger point therapy points of the hand and overcome the deficiencies found in prior art hand clamps. The foregoing and other objects, features, and advantages of the disclosed technology will become more apparent from the following detailed description, which proceeds with reference to the accompanying figures.

BRIEF DESCRIPTION OF THE DRAWINGS

The present invention is illustrated by way of example and not limitation in the figures of the accompanying drawings in which like references indicate similar elements.

Figure 1:
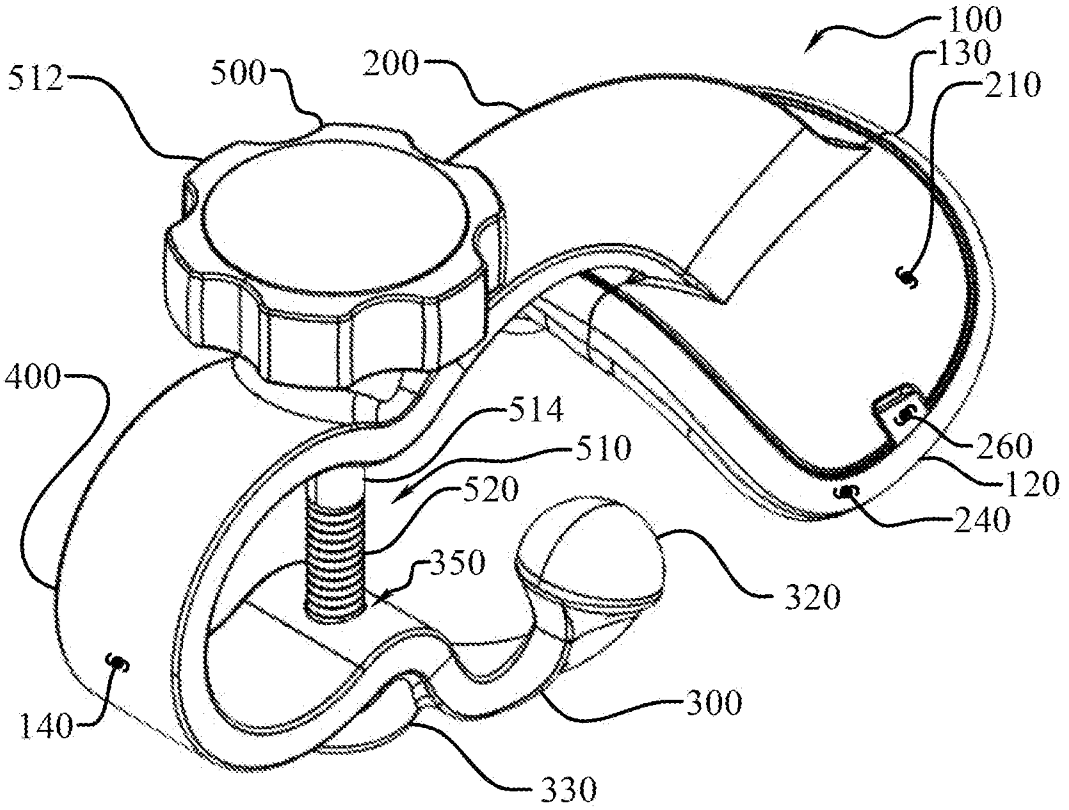
FIG. 1 is an isometric view of a hand clamp embodiment.

These illustrations are provided to assist in the understanding of the exemplary embodiments of the clamp as described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The hand clamp (100) enables a significant advance in the state of the art. The preferred embodiments of the clamp (100) accomplish this by new and novel arrangements of elements and methods that are configured in unique and novel ways and which demonstrate previously unavailable but preferred and desirable capabilities. The description set forth below in connection with the drawings is intended merely as a description of the presently preferred embodiments of the clamp (100), and is not intended to represent the only form in which the clamp (100) may be constructed or utilized. The description sets forth the designs, functions, means, and methods of implementing the clamp (100) in connection with the illustrated embodiments is to be understood, however, that the same or equivalent functions and features may be accomplished by different embodiments that are also intended to be encompassed within the spirit and scope of the claimed clamp (100).

The illustrated embodiments focus on a clamp configured to be used to stimulate the LI-4 pressure point and/or one, or more, of the hand trigger points, and overcome the deficiencies of prior art clamps, however the device is not limited to this application and may be used for other purposes. Embodiments of the clamp (100) offers adjustable bi-lateral compression to target the 6 specific trigger points of the hand that form in the specific muscles of the thenar eminence, specifically the abductor pollicis, adductor pollicis, opponens pollicis, and flexor pollicis brevis, located on the palmar surface of the hand. The three muscles that make up the thenar eminence are tightly bound together by fascia, and that fascia is tough. The opponens pollicis is covered by the abductor pollicis brevis and often partially fused with the flexor pollicis brevis. Palpation of the opponens pollicis is difficult, particularly when a user is attempting to do it without the assistance of another person.

Figure 2:
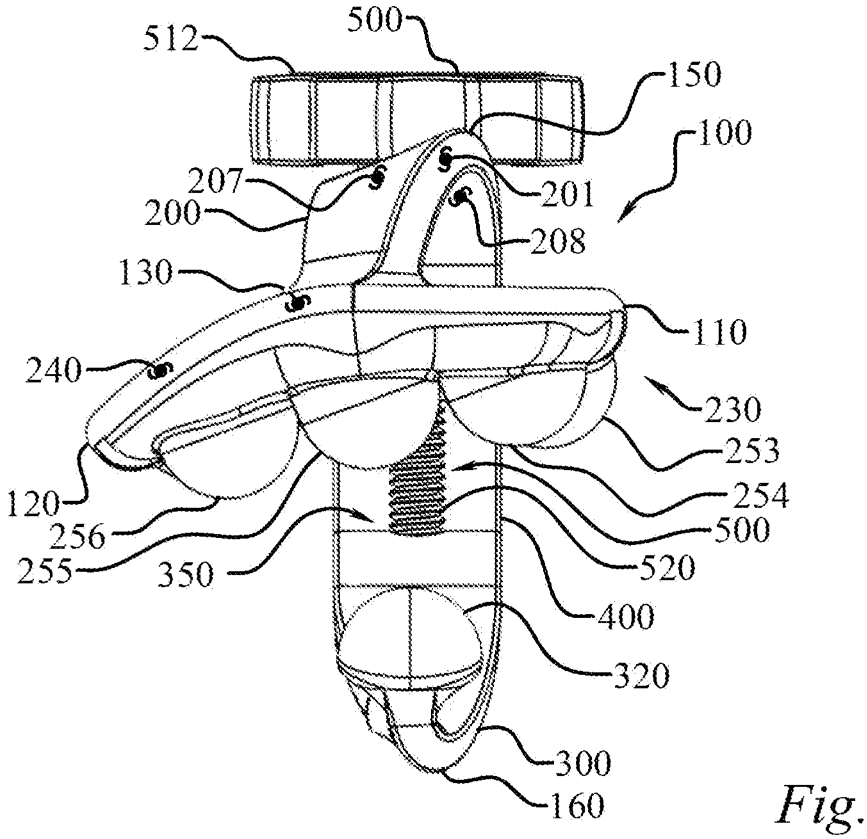
FIG. 2 is a proximal side view of a hand clamp embodiment.
Figure 3:
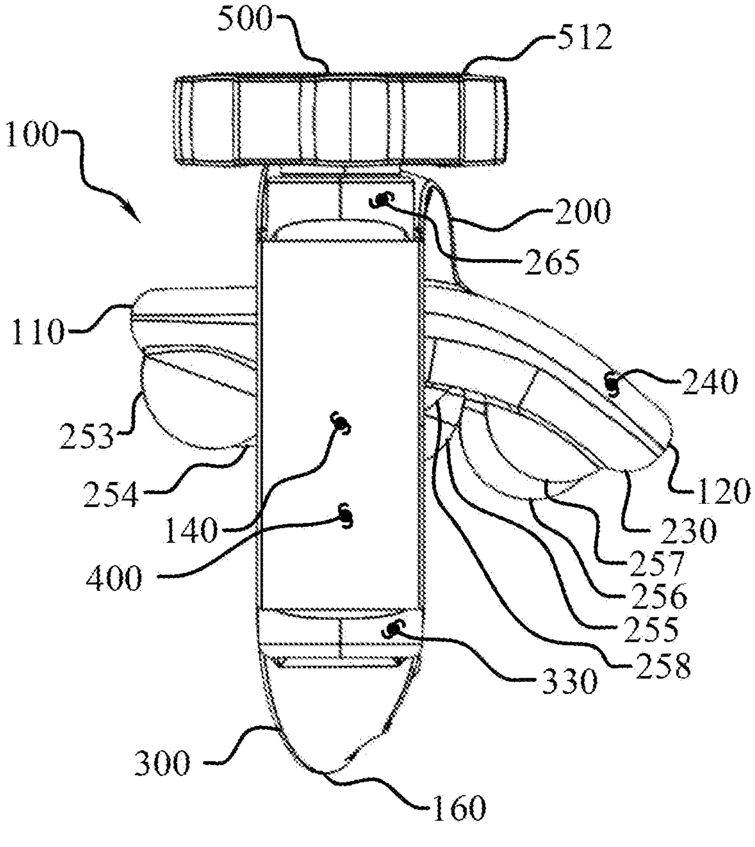
FIG. 3 is a distal side view of a hand clamp embodiment.

When a clamp (100) is used by a user, a palmer arm pressure bulge (320), seen in FIG. 1, applies pressure to the user's palm LI-4 pressure point, and at the same time, a dorsal arm pressure plate (DAPP) (230), seen in FIG. 2, applies a force to the back of the user's hand. The LI-4 pressure point, also known as Hegu in traditional Chinese medicine (TCM), is one of the most well-known and widely used acupressure points. It is located on the hand, between the thumb and index finger, in the webbing where the two fingers meet. LI-4 is an essential point in acupuncture and acupressure therapies and is believed to have numerous health benefits such as: pain relief, stress and anxiety reduction, digestive support, immune system support, headache relief, allergy relief, and labor induction. In traditional Chinese medicine theory, LI-4 is associated with the Large Intestine meridian, which is responsible for regulating the functions of the large intestine and promoting the flow of Qi (energy) throughout the body. Stimulating LI-4 is believed to have a balancing effect on the entire body and is often used to treat a wide range of physical and emotional conditions. When applying acupressure to LI-4, it is important to exert firm but gentle pressure for about 1-2 minutes, or until you feel a sensation of warmth or pulsation around the point. The amount of pressure that should be applied varies from one user to another, the common guideline is that pressure should be firm enough to feel a strong sensation or mild discomfort, but not strong enough to cause pain. In terms of human perception, the amount of pressure that's often suggested is similar to what you might apply if you were trying to gently depress a piece of ripe fruit without breaking the skin.

With reference generally to FIGS. 1-7, an embodiment of hand clamp (100) is shown. The clamp (100) is designed and configured to conveniently and reliably allow the user to apply pressure to an acupressure and/or trigger point on a treated hand by using only their free hand, without the assistance of a third party, to relieve various body issues such as headaches. For instance: practitioners reduce headaches and migraines by apply pressure to where the thumb and index finger join together, also known as the LI-4 (Hegu) pressure point, however it is extremely difficult for a person to achieve the same effectiveness on their own without the assistance of a third party. As seen in FIG. 2, the clamp (100) may have: a clamp dextral side (110), a clamp sinistral side (120), a clamp proximal side (130), a clamp distal side (140), a clamp upper side (150), and a clamp lower side (160). The clamp (100) may further have a dorsal arm (200), a palmer arm (300), and a resilient arm connector (400) that connects the dorsal arm (200) and the palmer arm (300) together, and a biasing mechanism (500), as seen in FIG. 1.

Figure 4:
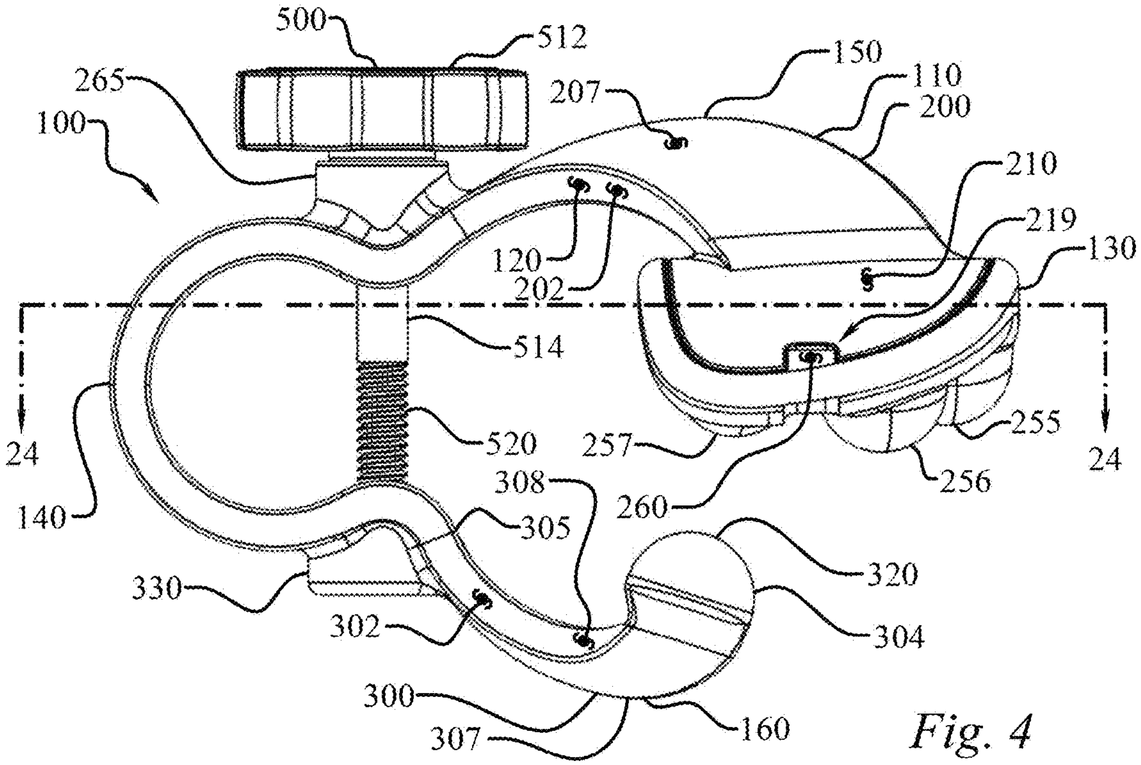
FIG. 4 is a sinistral side view of a hand clamp embodiment.
Figure 5:
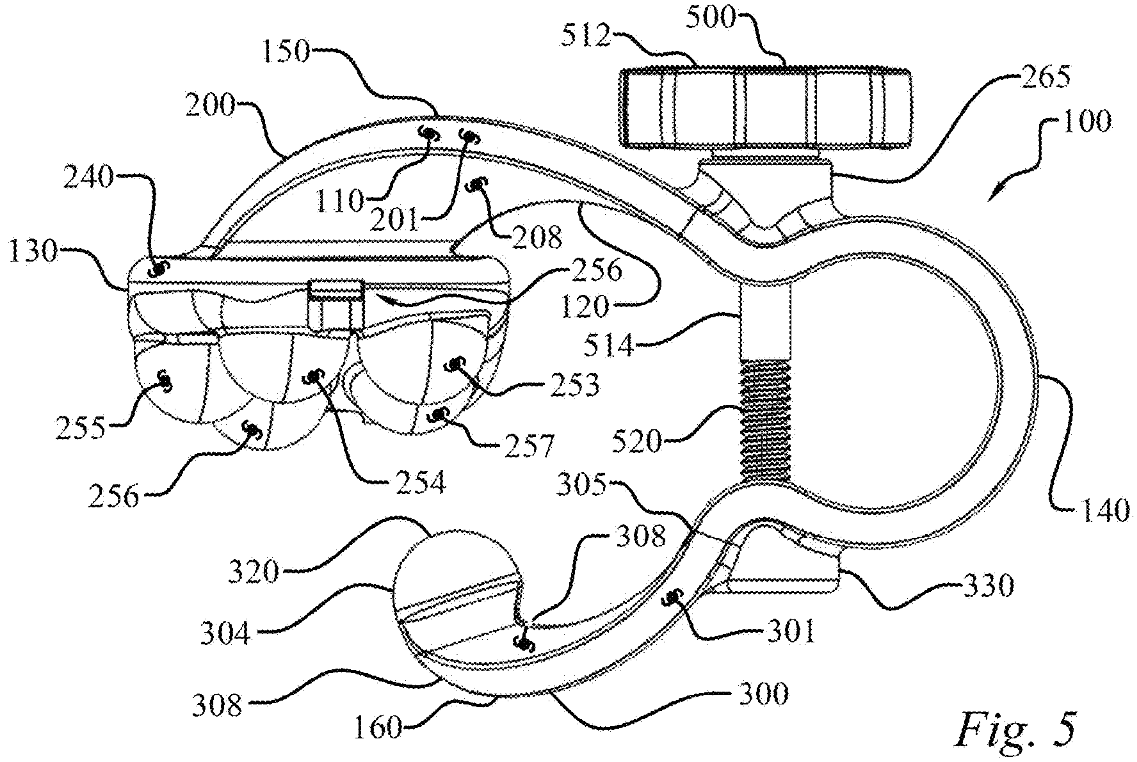
FIG. 5 is a dextral side view of a hand clamp embodiment.
Figure 6:
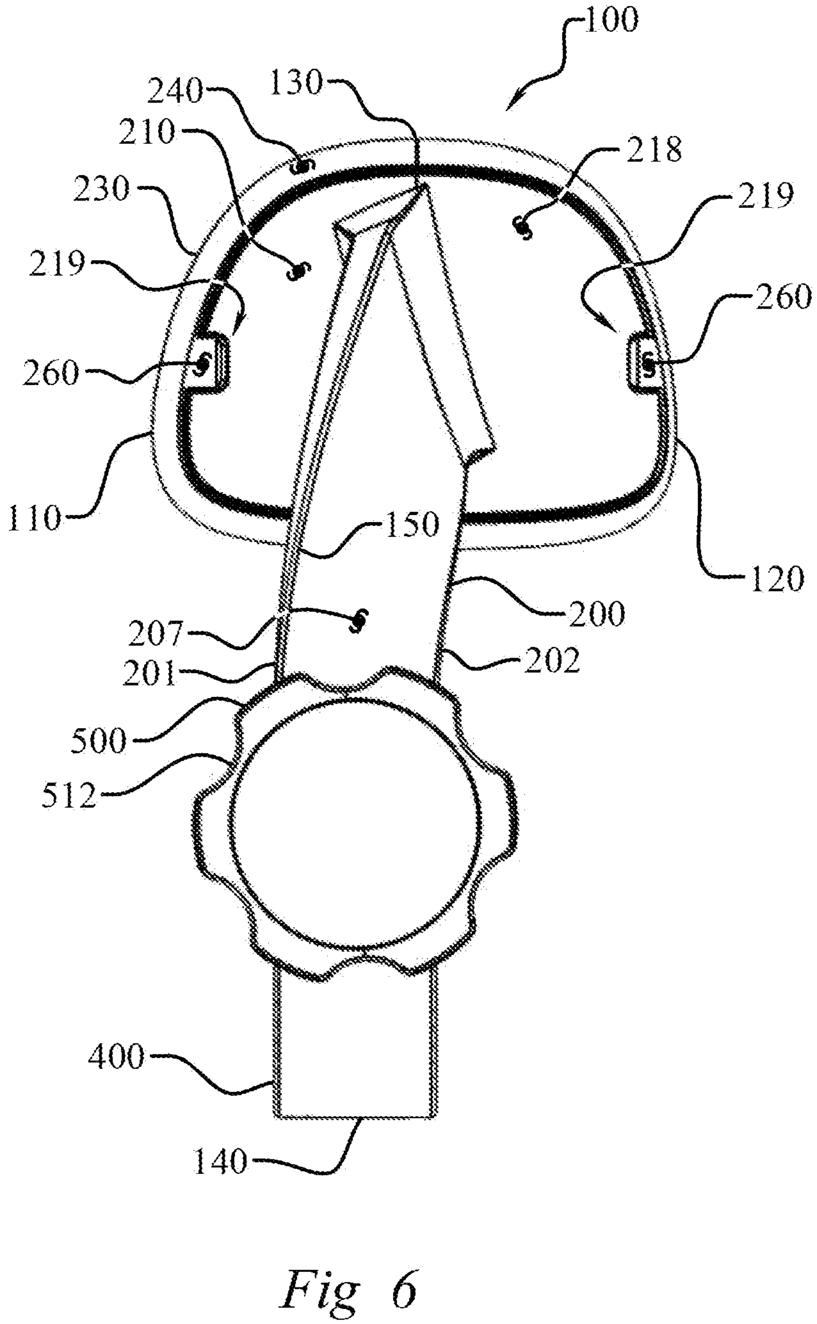
FIG. 6 is a dorsal side plan view of a hand clamp embodiment.
Figure 7:
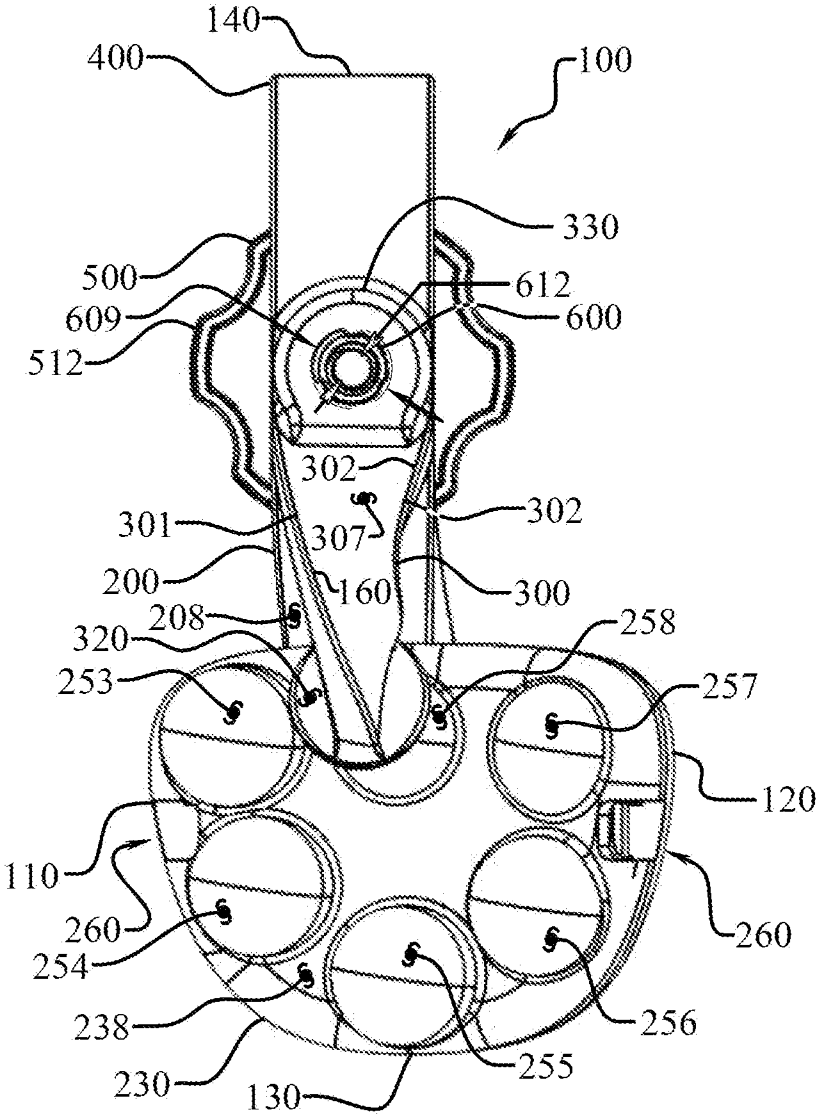
FIG. 7 is a palmer side plan view of a hand clamp embodiment.
Figure 8:
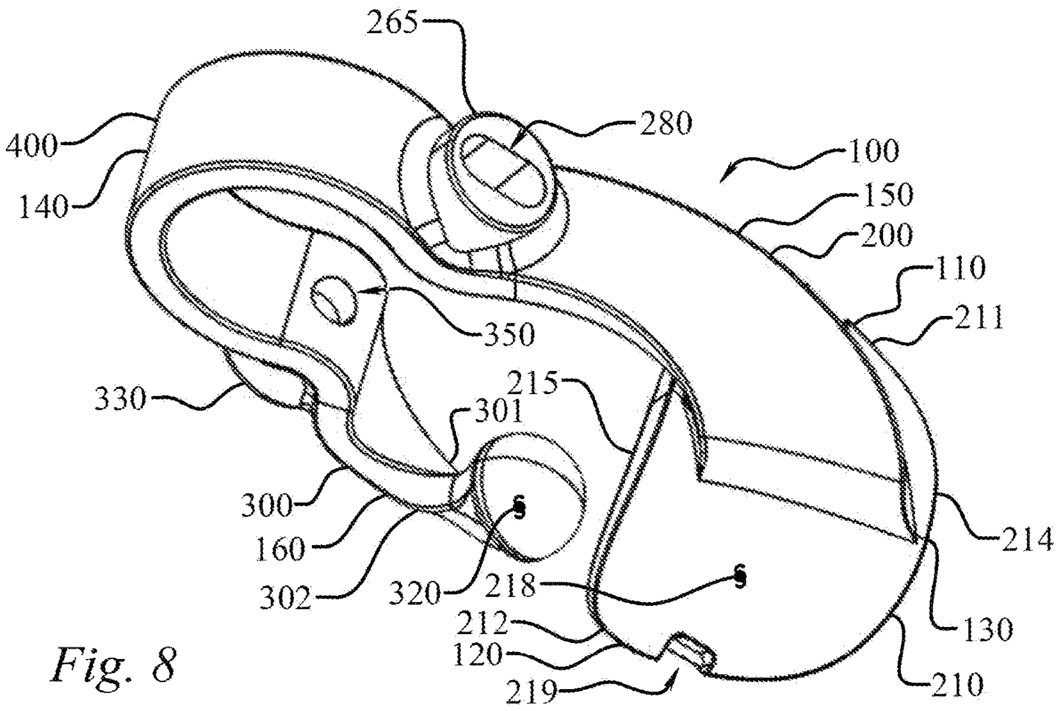
FIG. 8 is an isometric view of a hand clamp embodiment without an installed biasing mechanism.
Figure 9:
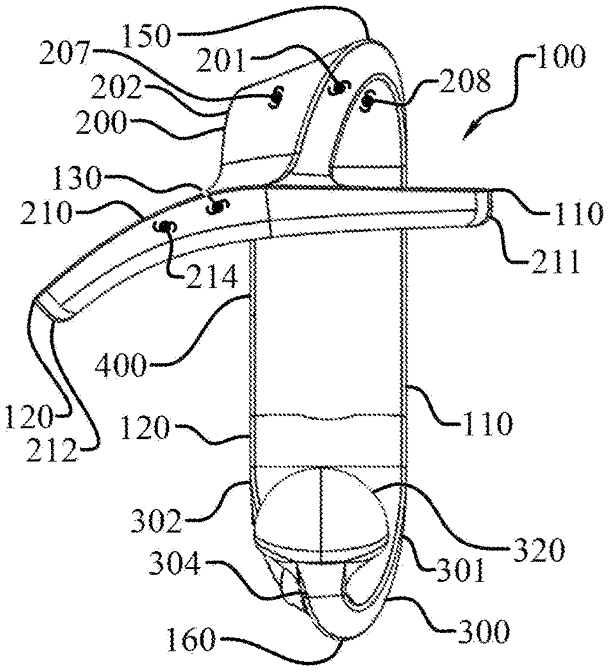
FIG. 9 is a proximal side view of a hand clamp embodiment without an installed biasing mechanism or a dorsal arm pressure plate.
Figure 10:
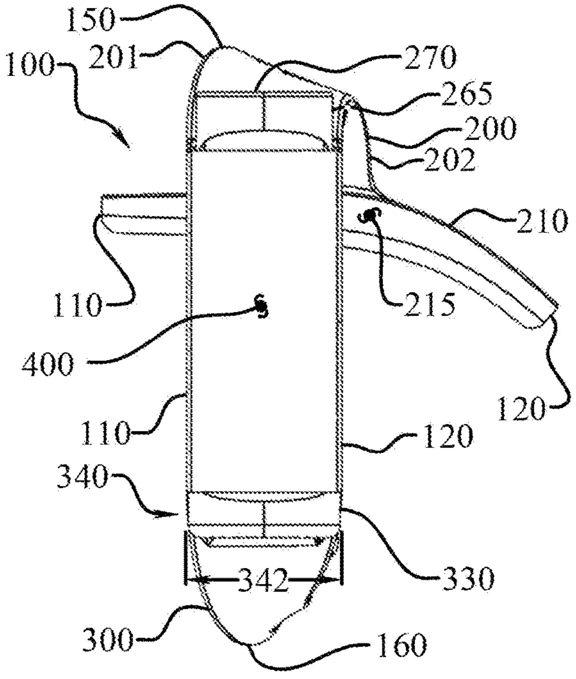
FIG. 10 is a distal side view of a hand clamp embodiment without an installed biasing mechanism or a dorsal arm pressure plate.
Figure 13:
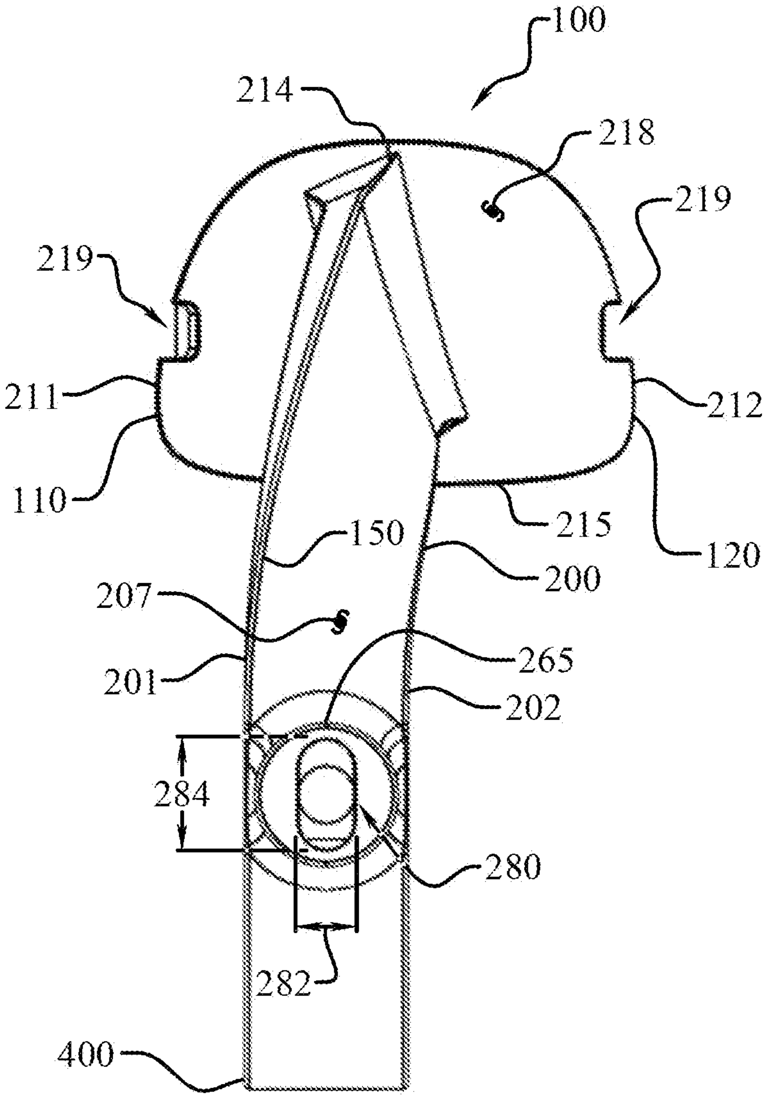
FIG. 13 is a dorsal side plan view of a hand clamp embodiment without an installed biasing mechanism or a dorsal arm pressure plate.
Figure 14:
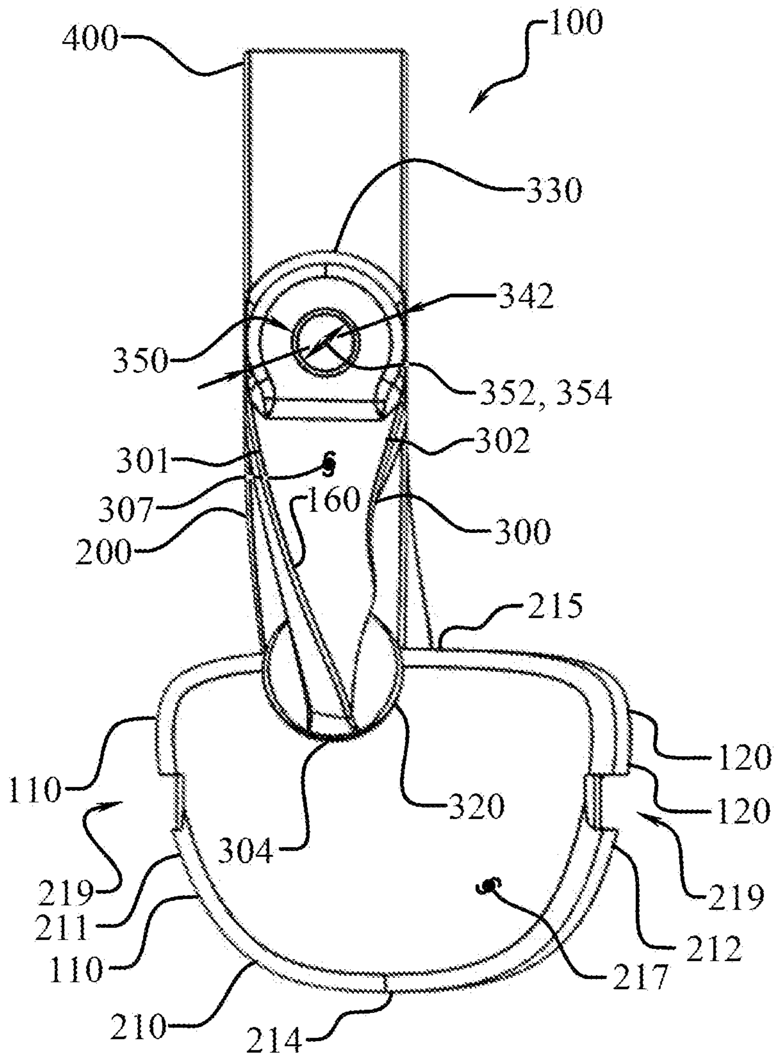
FIG. 14 is a palmer side plan view of a hand clamp embodiment without an installed biasing mechanism or a dorsal arm pressure plate.
Figure 15:
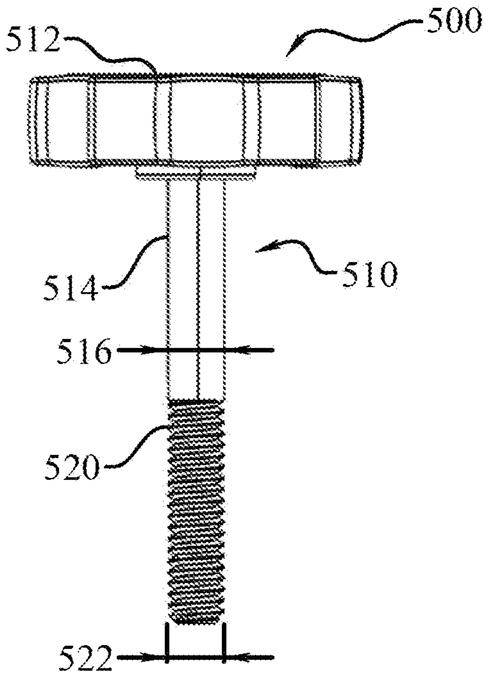
FIG. 15 is a side view of a biasing mechanism embodiment.
Figure 16:
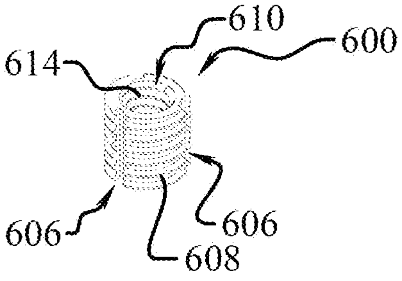
FIG. 16 is an isometric view of a threaded insert embodiment.
Figure 17:
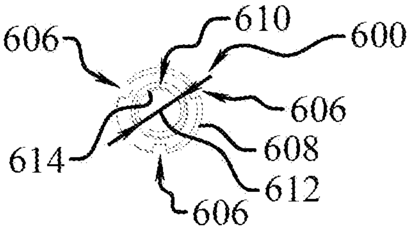
FIG. 17 is a dorsal side plan view of a threaded insert embodiment.
Figure 18:
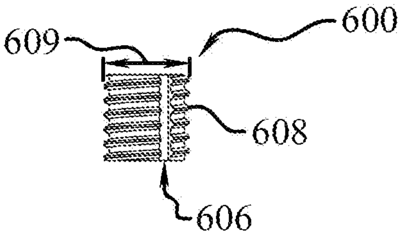
FIG. 18 is a side view of a threaded insert embodiment.
Figure 19:
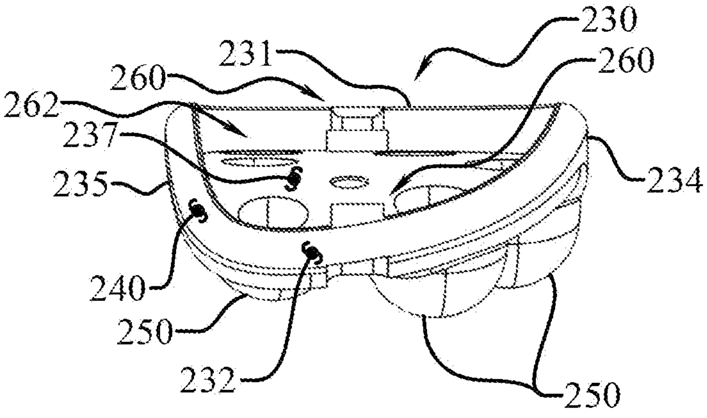
FIG. 19 is a sinistral side view of a dorsal arm pressure plate embodiment.
Figure 20:
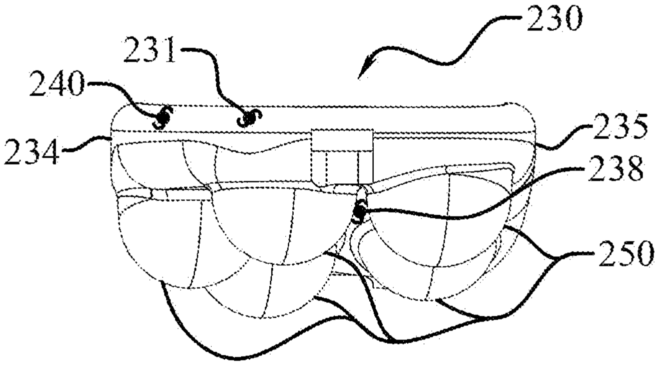
FIG. 20 is a dextral side view of a dorsal arm pressure plate embodiment.
Figure 21:
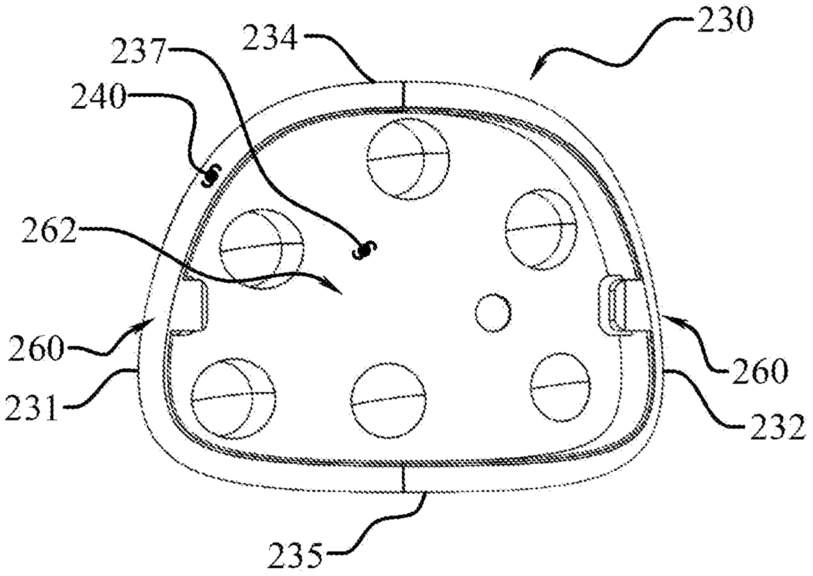
FIG. 21 is a dorsal side plan view of a dorsal arm pressure plate embodiment.

When in use, the clamp's (100) previously mentioned dorsal arm (200) is configured to transfer force to the back side of a user's hand, and the palmer arm (300) is configured to transfer force to the palm side of a user's hand, simply via activation with the user's free hand, or in some embodiments simply by placement on the hand to be treated without the need for the user's free hand to apply any force to the clamp (100). The dorsal arm (200) may have: a dorsal arm dextral side (201), a dorsal arm sinistral side (202), a dorsal arm proximal side (204), a dorsal arm distal side (205), a dorsal arm upper side (207), and a dorsal arm lower side (208), as seen in FIGS. 2-6. Additionally, the dorsal arm dextral side (201) corresponds with the clamp dextral side (110), and the dorsal arm sinistral side (202) corresponds with the clamp sinistral side (120). The dorsal arm upper side (207) is the side of the dorsal arm (200) that is located furthest away from the back of the user's hand and corresponds with the clamp upper side (150), and the dorsal arm lower side (208) is the side of the dorsal arm (200) closest to the back of the user's hand. Likewise, the dorsal arm proximal side (204) corresponds with the clamp proximal side (130), and the dorsal arm distal side (205) corresponds with the clamp distal side (140), as seen in FIGS. 4-5. The dorsal arm (200) may further include a dorsal arm pressure plate engaging insert (PEI) (210) which is inserted into a dorsal arm pressure plate (DAPP) (230), seen in FIG. 4, having a DAPP insert receptacle (262), best seen in FIG. 23, however in other embodiments any one, or more, of the components may be integrally formed, or even interchangeable to accommodate different sizes, quantities, and/or materials. The dorsal arm pressure plate engaging insert (PEI) (210) may further have: a dorsal arm PEI dextral side (211), a dorsal arm PEI sinistral side (212), a dorsal arm PEI proximal side (214), a dorsal arm PEI distal side (215), a dorsal arm PEI lower side (217), a dorsal arm PEI upper side (218) and a dorsal arm PEI DAPP lock tab receptacle (219), best seen in FIGS. 13 and 14. The dorsal arm PEI upper side (218) forms the upper surface of the dorsal arm pressure plate engaging insert (PEI) (210), as seen in FIG. 4. Additionally, the dorsal arm pressure plate (DAPP) (230) may have: a DAPP dextral side (231) which abuts the dorsal arm PEI dextral side (211), a DAPP sinistral side (232) which abuts the dorsal arm PEI sinistral side (212), a DAPP proximal side (234) which abuts the dorsal arm PEI proximal side (214), a DAPP distal side (235) which abuts the dorsal arm PEI distal side (215), a DAPP upper side (237) which abuts the dorsal arm PEI lower side (217) when the dorsal arm pressure plate (DAPP) (230) is positioned on the dorsal arm pressure plate engaging insert (PEI) (210), and a DAPP lower side (238) which abuts the back of a user hand while in use. The DAPP dextral side (231), the DAPP sinistral side (232), the DAPP proximal side (234) and the DAPP distal side (235) together form a rim (240) which surrounds the circumference of the dorsal arm pressure plate engaging insert (PEI) (210). Additionally, the dorsal arm pressure plate (DAPP) (230) may further have: a DAPP lock tab (260) that releasably, or fixedly, engages with the dorsal arm PEI DAPP lock tab receptacle (219), seen in FIG. 4, and one or more DAPP bulges (250), best seen in FIGS. 20 and 22. The dorsal arm pressure plate (DAPP) (230) may be curved, as seen in FIG. 2, to assist in achieving the disclosed relationships of one, or more, of the DAPP bulges 1-6 (253-258). The dorsal arm pressure plate (DAPP) (230) need not be a distinct separate piece or component, but may simply be a widening of the dorsal arm (200) to accommodate the disclosed desired relationships of one or more of the DAPP bulges 1-6 (253-258). In fact, in one embodiment the dorsal arm (200) is wide enough to achieve the desired relationships of one or more of the DAPP bulges 1-6 (253-258), and therefore does not need to widen to accommodate the DAPP bulges 1-6 (253-258) and in such a situation the dorsal arm pressure plate (DAPP) (230) is merely the portion of the dorsal arm (200) containing the desired number of DAPP bulges 1-6 (253-258).

Figure 22:
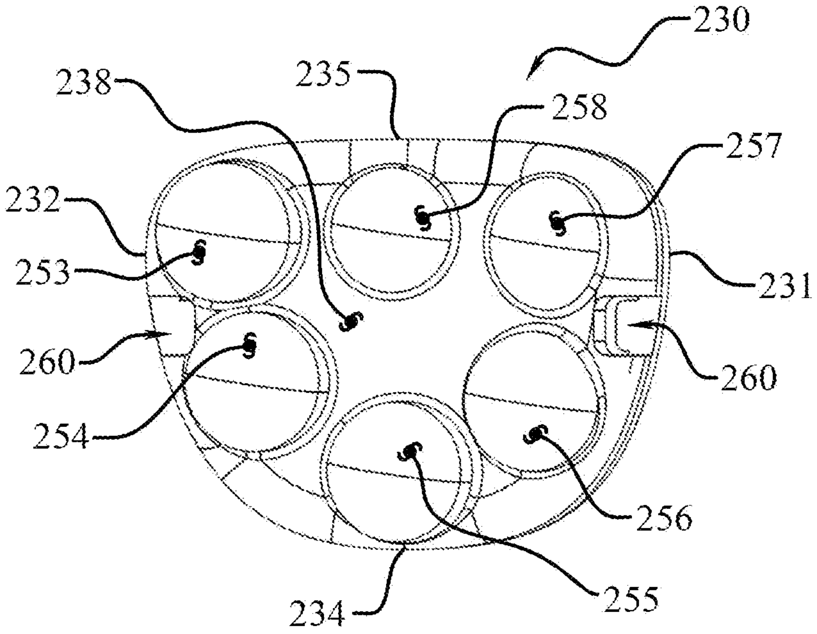
FIG. 22 is a palmer side plan view of a dorsal arm pressure plate embodiment.
Figure 24:
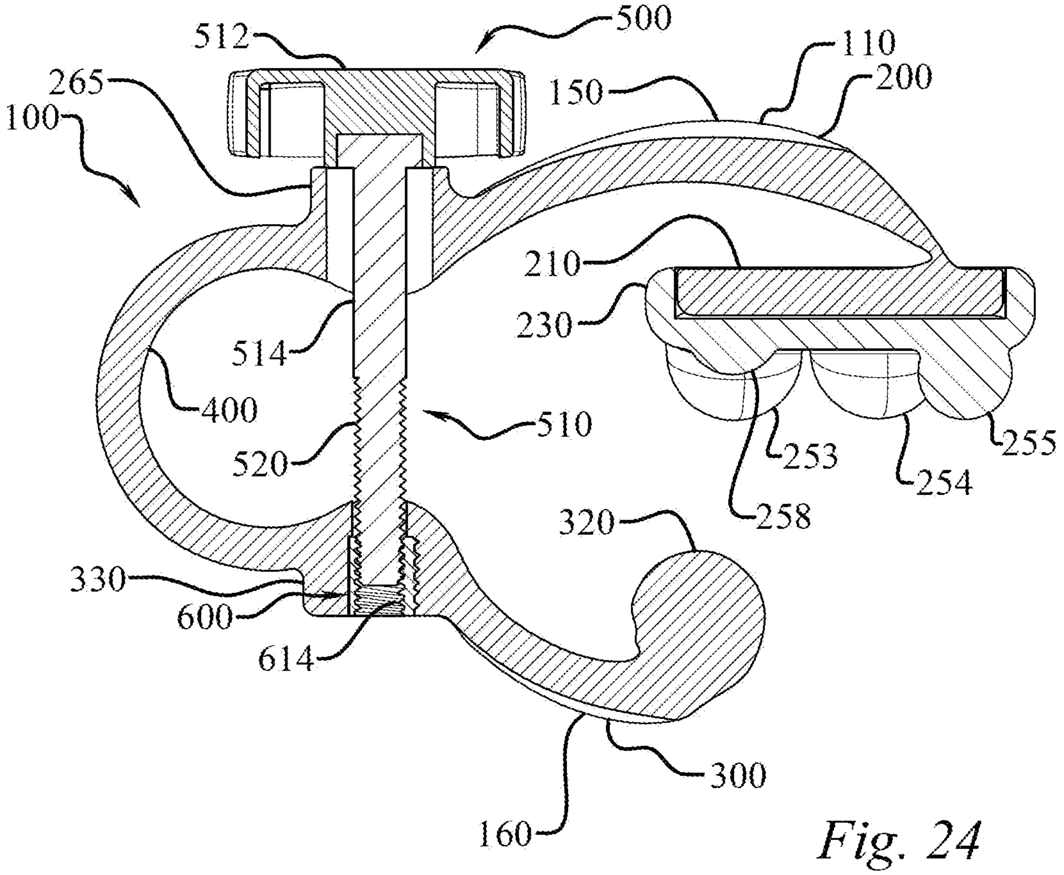
FIG. 24 is a cross sectional view of a hand clamp embodiment.

One embodiment of the dorsal arm pressure plate (DAPP) (230), seen in FIG. 22, has six DAPP bulges 1-6 (253-258) located on the DAPP lower side (238), however numerous embodiments disclose that the clamp (100) many incorporate many different quantities of DAPP bulges. It is important to note that the use of the term bulge is not limited to a particular shape, while in the illustrated embodiments the DAPP bulges, and the palmer arm pressure bulge (320), are illustrated as portions of a sphere, this is not required. Rather, in one embodiment the term bulge refers to a shape that has a cross-sectional area that varies from an apex to another point on the bulge having a different cross-sectional area. For example, FIG. 24 illustrates a cross-section in an origin Y-Z plane with reference to the axis illustrated in FIG.

44, with reference to the term origin because it passes through the apex of the palmer arm pressure bulge (320). A separate X-Y plane is orthogonal to the Y-Z plane, and the cross-sectional area of the DAPP bulge 3 (255) changes from just a point where the X-Y plane contacts the apex of DAPP bulge 3 (255) to a larger cross-sectional area as the section in the X-Y plane moves in the Z-direction away from the apex of DAPP bulge 3 (255). In one embodiment a first X-Y plane is located at least 1 mm away from the apex of DAPP bulge 3 (255) in the Z-direction and a section through the DAPP bulge 3 (255) in this first X-Y plane defines a first cross-sectional area of DAPP bulge 3 (255) in this first X-Y plane. Then a second X-Y plane is located at least 1 mm away from the second X-Y plane in the Z-direction and a section through the DAPP bulge 3 (255) in this second X-Y plane defines a second cross-sectional area of DAPP bulge 3 (255) in this second X-Y plane, and the second cross-sectional area is not equal to the first cross-sectional area and therefore constitutes a bulge in this embodiment. However, other embodiments may have bulges with constant cross-sectional area provided they achieve the goals and relationships disclosed later herein. In another embodiment, understood best with respect to FIG. 29, any, or all, of the bulges may taper from a base having a widest dimension, and/or largest cross-sectional area, to an apex; while in the illustrated embodiments the bulges are a portion of a sphere with a diameter of 5 mm to 25 mm in one embodiment, and a diameter of 7 mm to 23 mm in another embodiment, and 9-21 mm, 11-19 mm, and 13-17 mm in further embodiments. While the illustrated embodiments have bulges free of any flat surfaces, further embodiments may incorporate flat surfaces. Further, while in one embodiment at least one bulge is symmetric, in alternative embodiments at least one bulge is asymmetric. Further, in one embodiment one or more of the DAPP bulges 1-6 (253-258) may have different material properties from one or more of the other DAPP bulges 1-6 (253-258); while in a further embodiment the palmer arm pressure bulge (320) may have different material properties than one or more of the DAPP bulges 1-6 (253-258). It should be noted that any of the disclosure made with respect to one or more of the DAPP bulges 1-6 (253-258) may also be applied to the palmer arm pressure bulge (320).

Furthermore, in one embodiment at least two of the DAPP bulges 1-6 (253-258), and/or and the palmer arm pressure bulge (320), have the same radius, while in another embodiment at least one of the DAPP bulges 1-6 (253-258) has a radius that is at least 5%, 10%, or 15% larger than the radius of at least one of the DAPP bulges 1-6 (253-258) and/or the palmer arm pressure bulge (320). In yet a further embodiment, at least one of the DAPP bulges 1, 3, and 5 (253, 255, 256) have a radius which is at least 5% larger than DAPP bulge 2 (254), and/or at least 10% larger than DAPP bulge 5 (257), and/or at least 20% larger than DAPP bulge 6 (258). In another embodiment the DAPP bulges 1-6 (253-258) all have a radius within 35% of the radius of the palmer arm pressure bulge (320), and in further embodiments within 30%, 25%, or 20%. It should be understood that the invention is not limited to embodiments having six DAPP bulges (250), other embodiments, not illustrated, may have one to five DAPP bulges (250), and yet in other embodiments there may be up to ten DAPP bulges (250).

Figure 11:
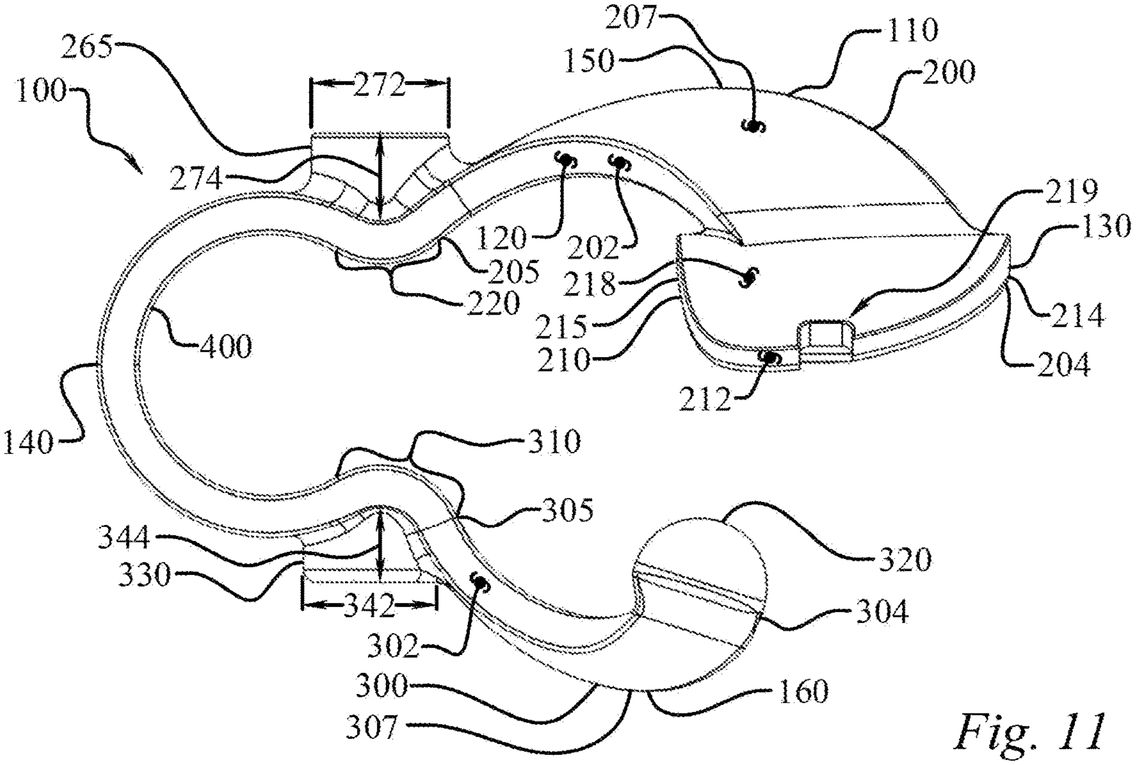
FIG. 11 is a sinistral side view of a hand clamp embodiment without an installed biasing mechanism or a dorsal arm pressure plate.
Figure 12:
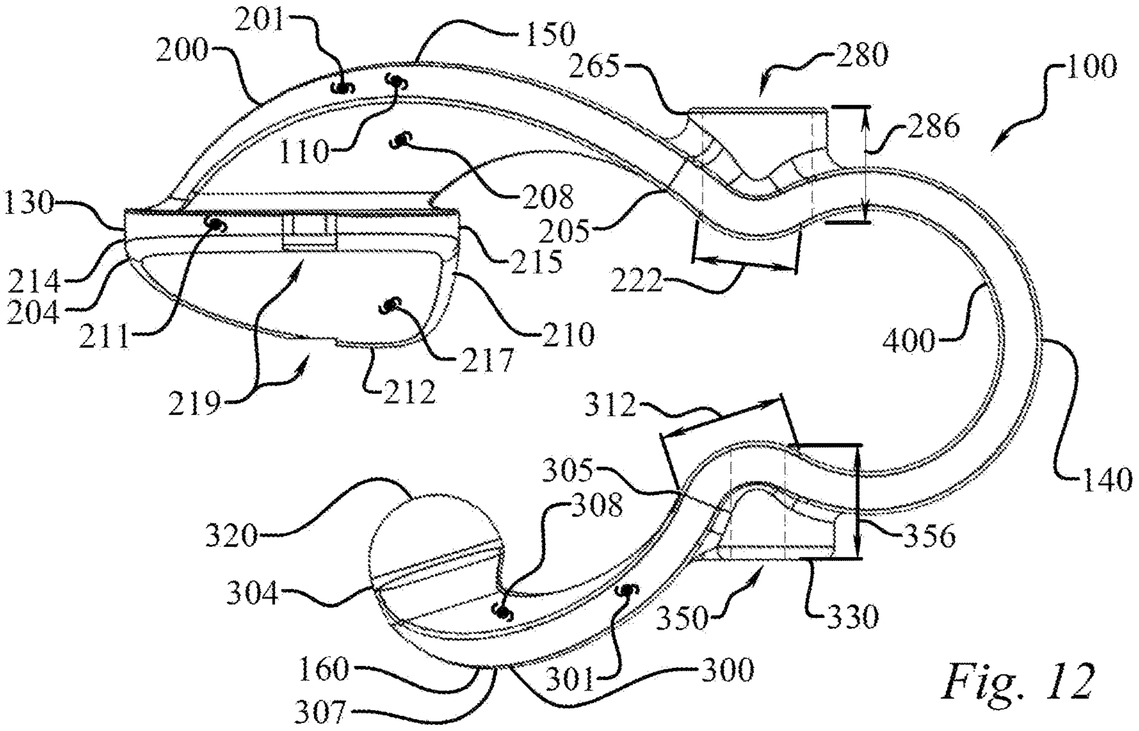
FIG. 12 is a dextral side view of a hand clamp embodiment without an installed biasing mechanism or a dorsal arm pressure plate.

One embodiment of the dorsal arm pressure plate (DAPP) (230) may utilize a heating mechanism, or electrical stimulator, to provide warmth to the user which may be generated by chemical or electrical means, not shown in drawings. In another embodiment, the dorsal arm pressure plate (DAPP) (230) may be permanently connected to the dorsal arm pressure plate engaging insert (PEI) (210) with an adhesive, not illustrated, or integrally formed therewith, while in other embodiments the dorsal arm pressure plate (DAPP) (230) may be releasably connected to the dorsal arm pressure plate engaging insert (PEI) (210), such as via hook-and-loop connector, magnets, quick-release connector(s), mechanical fasteners, and/or interlocking mechanical joint(s). In yet another embodiment, the dorsal arm pressure plate (DAPP) (230) and the dorsal arm (200) may be configured as one unified piece and lacks the previously mentioned dorsal arm pressure plate engaging insert (PEI) (210), dorsal arm PEI DAPP lock tab receptacle (219), DAPP lock tab (260), the DAPP insert receptacle (262) and rim (240), not illustrated. The dorsal arm (200) may also have a dorsal arm transition area (220) having a dorsal arm transition area length (222), and is located where the dorsal arm (200) transitions into the resilient arm connector (400), as seen in FIGS. 11 and 12. Furthermore, in one embodiment a dorsal arm adjustment biasing aperture section (DABAS) (265) may be positioned within the dorsal arm transition area (220) forming a part of the biasing mechanism (500), as seen in FIG. 11. Additionally, the dorsal arm adjustment biasing aperture section (DABAS) (265) may further have a DABAS pressure plate (270) having a DABAS pressure plate width (272) and a DABAS pressure plate height (274), and a DABAS aperture (280) having a DABAS aperture width (282), a DABAS aperture length (284) and a DABAS aperture height (286), illustrated in FIGS. 8, and 10-13.

The palmer arm (300) may have; a palmer arm dextral side (301), a palmer arm sinistral side (302), a palmer arm proximal side (304), a palmer arm distal side (305), a palmer arm lower side (307) and a palmer arm upper side (308), as seen in FIGS. 2-5 and 7. Additionally, the palmer arm dextral side (301) corresponds with the clamp dextral side (110), and the palmer arm sinistral side (302) corresponds with the clamp sinistral side (120). The palmer arm upper side (308) is the side of the palmer arm (300) closest to the user's palm, and the palmer arm lower side (307) is the side of the palmer arm (300) farthest away from the user's palm. Further, the palmer arm lower side (307) corresponds with the clamp lower side (160), the palmer arm proximal side (304) corresponds with the clamp proximal side (130), and the palmer arm distal side (305) corresponds with the clamp distal side (140), as seen in FIGS. 4 and 5. The palmer arm (300) may further include a palmer arm pressure bulge (320), also seen in FIGS. 4 and 5. The palmer arm pressure bulge (320) may incorporate any of the attributes and/or relationships disclosed herein with respect to the other bulges. In one embodiment, the palmer arm pressure bulge (320) may have a radius that is equal to, or ±5%, the DAPP bulge 6 (258) radius, while in another embodiment the palmer arm pressure bulge (320) radius may be 5 to 30% larger than the DAPP bulge 6 (258) radius, whereas in yet another embodiment the palmer arm pressure bulge (320) radius may be 50 to 90% of the DAPP bulge 6 (258) radius.

The palmer arm (300) may also have a palmer arm transition area (310) having a palmer arm transition area length (312), and is located where the palmer arm (300) transitions into the resilient arm connector (400), as seen in FIGS. 11 and 12, and may create an inflection point. Furthermore, in one embodiment a palmer arm adjustment biasing aperture section (PABAS) (330) may be positioned within the palmer arm transition area (310) forming a part of the biasing mechanism (500), as seen in FIGS. 11 and 12. Additionally, the palmer arm adjustment biasing aperture section (PABAS) (330) may further have a PABAS threaded insert mount (340) having a PABAS threaded insert mount width (342) and a PABAS threaded insert mount height (344), and a PABAS aperture (350) having a PABAS aperture width (352), a PABAS aperture length (354) and a PABAS aperture height (356), illustrated in FIGS. 10, 11 and 14. As one can see in the illustrations 11 and 12, the DABAS aperture (280) and the PABAS aperture (350) may be different from each. For instance, the DABAS aperture (280) may have a DABAS aperture length (284) that is greater than the DABAS aperture width (282), while the PABAS aperture width (352) and PABAS aperture length (354) and identical. In one embodiment, the DABAS aperture length (284) may be 25-150% larger than the DABAS aperture width (282), whereas in another embodiment the DABAS aperture length (284) may be 35-90% larger than the DABAS aperture width (282), in yet another embodiment the DABAS aperture length (284) is at least 25% larger than the DABAS aperture width (282). In similar fashion, in one embodiment the DABAS aperture height (286) and the PABAS aperture height (356) are substantially the same, in another embodiment the DABAS aperture height (286) may be 5-25% larger than the PABAS aperture height (356), and in another embodiment the DABAS aperture height (286) may be 10-15% larger than the PABAS aperture height (356), as seen in FIG. 12. As seen in FIG. 4, the location of the biasing mechanism (500) assists with proper positioning of the clamp (100) by limiting how far a hand may enter the clamp (100).

One embodiment of clamp (100) may utilize a threaded insert (600) that is permanently fixed within the PABAS aperture (350), as seen in FIGS. 16-18, 23 and 24. The threaded insert (600) may have: a threaded insert width (602), a threaded insert length (604), one or more threaded insert slots (606), threaded insert outside threads (608), a threaded insert aperture (610) having a threaded insert aperture width (612) and threaded insert aperture threads (614). Another embodiment of clamp (100) may forgo utilizing a threaded insert (600) and may utilize threads that are formed within the PABAS aperture (350) during the molding of the clamp (100), not shown in the drawings. The threaded insert width (602) is designed to be slightly smaller than the PABAS aperture width (352) and the threaded insert outside threads width (609) slightly larger than the PABAS aperture width (352) to allow rotational attachment within the PABAS aperture (350). Additionally, the one or more threaded insert anti-rotation slots (606) engage the material within the PABAS aperture (350) and reduce the likelihood of the threaded insert (600) from rotating loose. Another embodiment of clamp (100) may include a threaded insert (600) having concentric rings that is fixed in the PABAS threaded insert mount (340) during the molding process in lieu of the threaded insert (600) having threaded insert outside threads (606), not illustrated. In this embodiment, when the clamp (100) is molded material flows into grooves formed by the concentric rings thereby preventing the threaded insert (600) from being dislodged from the PABAS threaded insert mount (340). The previously mentioned threaded insert length (604) may be equal to the PABAS aperture length (356) in one embodiment, while in another embodiment the threaded insert length (604) may be 10-90% of the PABAS aperture length (356), in yet another embodiment the threaded insert length (604) may be 25-75% of the PABAS aperture length (356), and in still yet another embodiment the threaded insert length (604) is greater than 50% of the PABAS aperture length (356).

The clamp (100) may use a biasing mechanism (500) to adjust the clamp (100) to apply pressure to a user's hand, and/or biasing may be designed into the structure of the dorsal arm (200) and/or the palmer arm (300) and/or the resilient arm connector (400). In the embodiment illustrated in FIG. 5 the biasing mechanism (500) creates relative movement of the dorsal arm (200) and/or the palmer arm (300) thereby changing the distance between the palmer arm pressure bulge (320) and at least one of the DAPP bulges 1-6 (253-258). In one embodiment, seen in FIGS. 1-7, 15, 23, and 24, the biasing mechanism (500) may include: an adjustment screw (510), an adjustment screw knob (512), an adjustment screw shank (514) having an adjustment screw shank width (516), an adjustment screw threads (520) having an adjustment screw threads width (522); and a resilient arm connector (400). In some embodiments the resilient arm connector (400) may also be utilized to apply force on the dorsal arm (200) and/or palmer arm (300), or in other embodiments provide a spreading force on the dorsal arm (200) and/or palmer arm (300). In another embodiment a separate mechanism, such as a coil spring, leaf spring, an elastomeric spring, one or more elastomeric bands, or air bladder may be used to provide a force on the dorsal arm (200) and/or palmer arm (300), to bias them open or closed, not illustrated in the drawings. The biasing mechanism (500) may include a longitudinal axis, and a plane containing the longitudinal axis and the apex of the palmer arm pressure bulge (320) is referred to as a direction-of-motion plane, best visualized with reference to FIG. 2.

Figure 25:
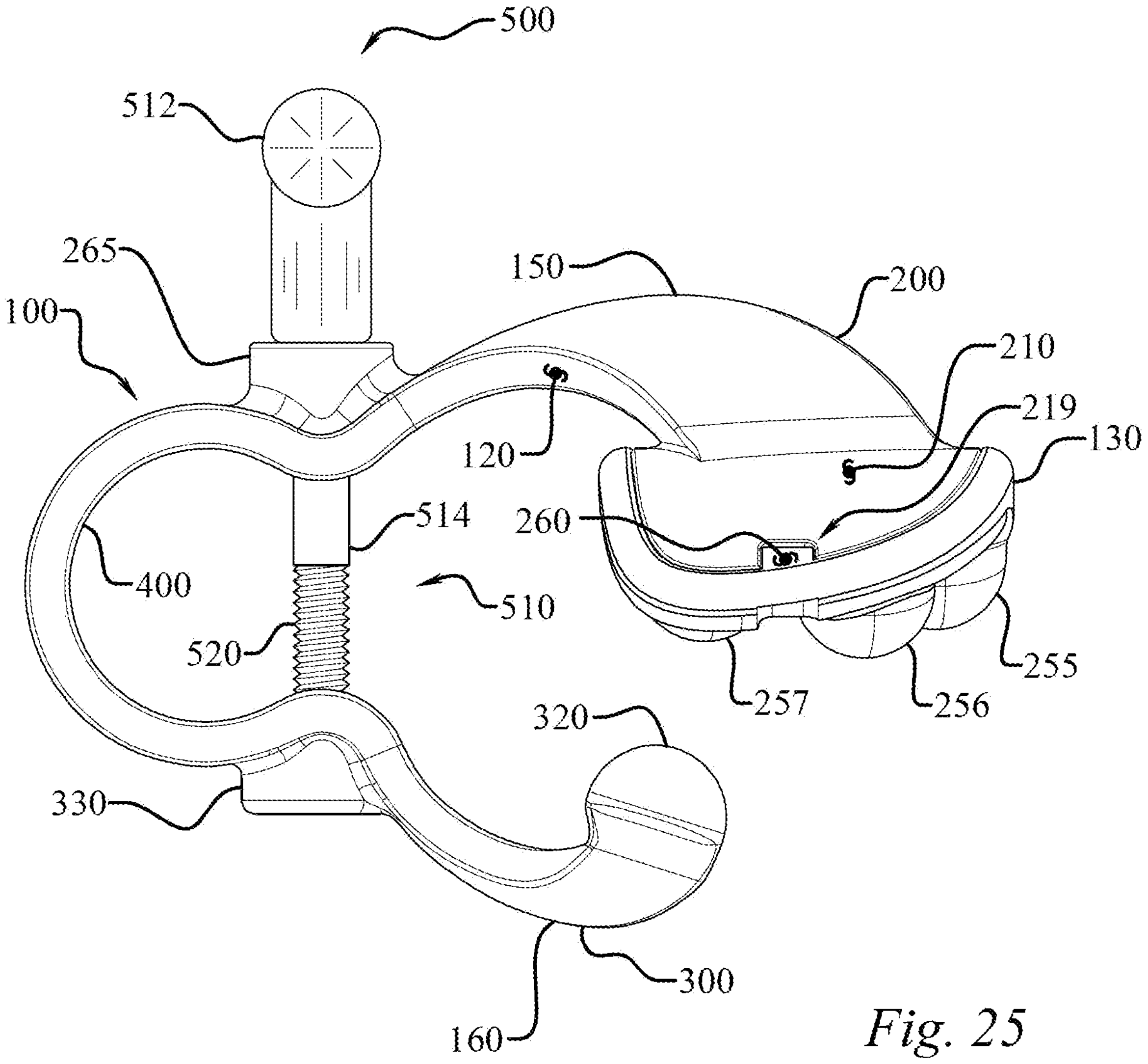
FIG. 25 is sinistral side view of a hand clamp embodiment.
Figure 26:
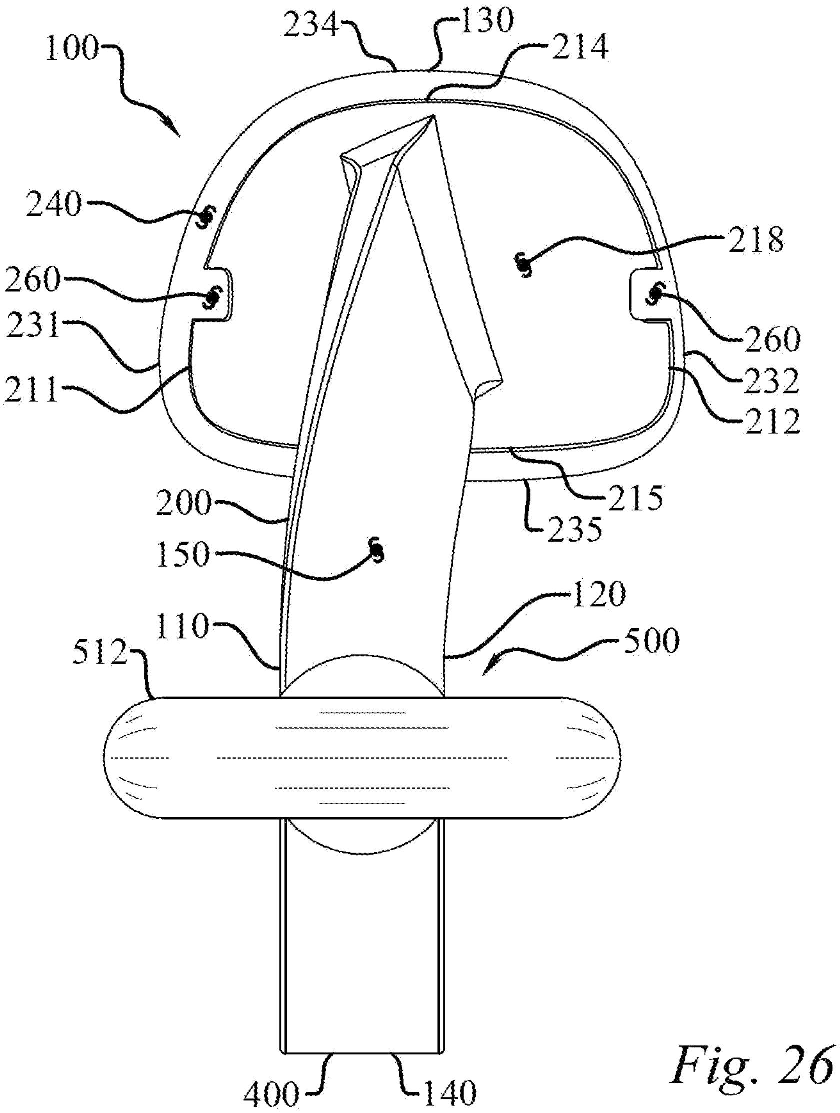
FIG. 26 is a dorsal side plan view of the hand clamp embodiment seen in FIG. 25.
Figure 27:
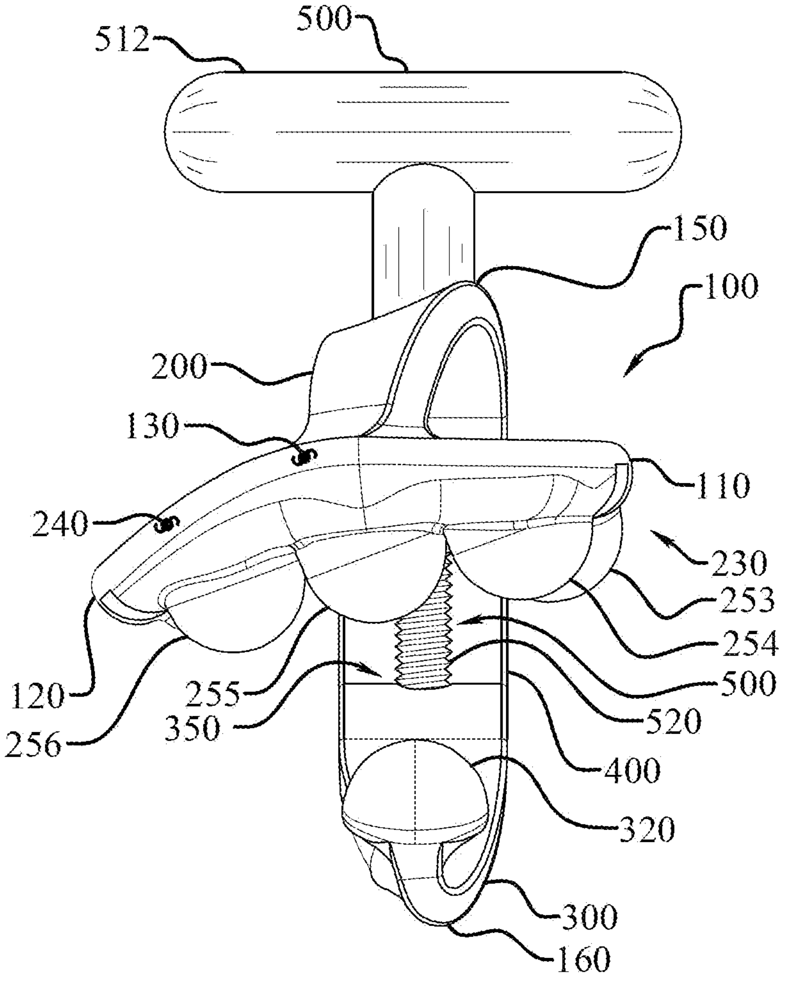
FIG. 27 is a proximal side view of the hand clamp embodiment seen in FIG. 25.
Figure 28:
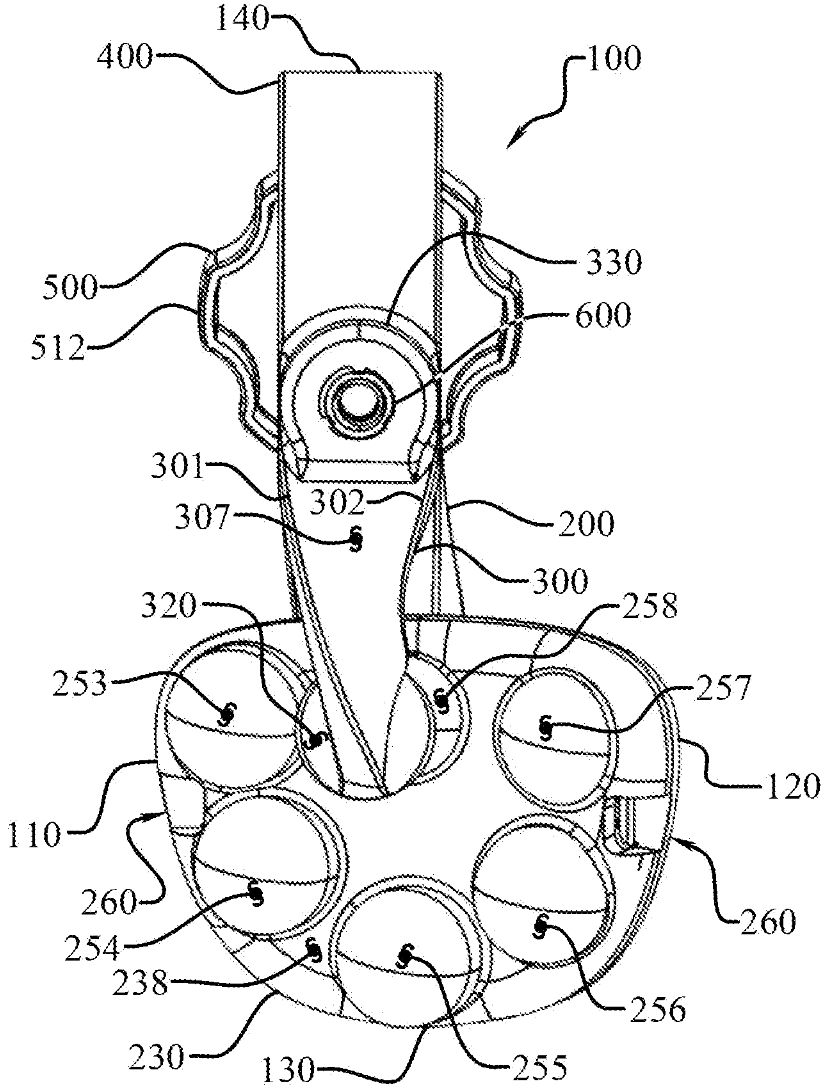
FIG. 28 is a palmer side plan view of a hand clamp embodiment.

In the embodiment illustrated in FIGS. 15-18, the adjustment screw thread width (522) is configured to be smaller than the threaded insert aperture width (612) to allow the adjustment screw threads (520) to rotationally and securely engage the threaded insert aperture threads (614). Additionally, FIGS. 1-7, 23 and 24 show embodiments of a clamp (100) having a biasing mechanism (500) using a round shaped adjustment screw knob (512). Another embodiment of clamp (100), shown in FIGS. 25-27, has a "T" shaped adjustment screw knob (512). In the embodiments shown in FIGS. 1-7, 23 and 24-27, the adjustment screw shank (514) passes through the DABAS aperture (280), having an adjustment screw shank width (516) smaller than the DABAS aperture width (282), from the dorsal arm upper side (207) to the dorsal arm lower side (208) and into the PABAS aperture (350) from the palmer arm upper side (308). Next, the adjustment screw threads (520) rotationally and securely engage the threaded insert aperture threads (614) located within the threaded insert aperture (610).

In other embodiments the biasing mechanism (500) may include other adjustable tensioning devices such as one or more latch, ratchet, ratchet strap, quick-release latch, quick-release clamp, bailing latch, horizontal clamp, band clamp with draw latch, cam latch such as quarter-turn latch, defeater handle, swing handle, actuator handle, folding T-handle, and/or cam lock, compression latch such as lift and turn compression latch, large T compression latch, draw compression latch, lever compression latch, panel compression latch, round compression latch, tool-activated compression latch, and/or trigger compression latch, lift and turn latch, spring panel latch, compression QT latch, compression folding T latch, lever latch, tension latch, toggle latch, draw latch such as spring claw toggle latch over-center latch, under center latch, twist latch (link lock, butterfly latch, wing latch), tubber T-handle latch, hood latch, living hinge latch, cane bolt latch, pawl latch, multi-point latch, trigger latch, twist latch or butterfly latch, rotary latch such as single rotor rotary latch, double rotor rotary latch, and spring-loaded rotary latch, releasable cable tie, releasable zip tie, releasable textile mechanism with hook-and-loop fastener or mechanical fastener such as snap, button, or belt attachment mechanism, elastic cinch strap, magnetic cable tie, rapstrap reusable cable tie, beaded cable tie, releasable elastomeric strap tie such as griplock tie, tension strap, cable/rope ratchet, and adjustable turnbuckle tensioner, just to name a few alternatives. In other embodiments the biasing mechanism (500) may include other tensioning devices such as elastomeric bands that are not adjustable, but may include a plurality of bands of different sizes and/or materials to adjust the forces applied by the clamp (100). Thus in one embodiment the clamp (100) consists of a kit that includes a plurality of biasing mechanisms (500), such as elastomeric bands, so that the user may select from the plurality of biasing mechanisms (500) to apply different forces and determine the most effective configuration. On such embodiment includes at least two elastomeric bands having different properties, which may include different lengths, thicknesses, and/or materials. In other embodiments the biasing mechanism (500) may include a hydraulic or pneumatic mechanism, either with a clamp-mounted actuation feature to actuate the mechanism, or a remote actuation feature such as a hand pump to actuate the mechanism.

The DABAS pressure plate (270) provides a surfaces for the adjustment screw knob (512) to abut, and the PABAS threaded insert mount (340) containing the threaded insert (600) interacts with the adjustment screw threads (520) and in concert draws the dorsal arm pressure plate (DAPP) (230) and the palmer arm pressure bulge (320) into closer proximity to one another. The palmer arm (300) may also have a palmer arm transition area (310) having a palmer arm transition area length (312), and is located where the palmer arm (300) transitions into the resilient arm connector (400), as seen in FIGS. 11 and 12. In one embodiment, the dorsal arm transition area length (222) is substantially equal to the palmer arm transition area length (312), while in another embodiment the palmer arm transition area length (312) may be 10-60% larger than the dorsal arm transition area length (222), in yet another embodiment the palmer arm transition area length (312) may be 20-40% larger than the dorsal arm transition area length (222), in still yet another embodiment the dorsal arm transition area length (222) may be up to 5% larger than the palmer arm transition area length (312). Furthermore, in one embodiment of clamp (100) the DABAS pressure plate width (272) and the PABAS threaded insert mount width (342) are substantially the same, whereas in another embodiment the DABAS pressure plate width (272) may be 2-15% larger than the PABAS threaded insert mount width (342), while in still yet another embodiment the PABAS threaded insert mount width (342) may be 2-15% larger than the DABAS pressure plate width (272). Similarly, in one embodiment of clamp (100) the DABAS pressure plate height (274) and the PABAS threaded insert mount height (344) are substantially the same, whereas in another embodiment the DABAS pressure plate height (274) may be 2-30% larger than the PABAS threaded insert mount height (344), while in still yet another embodiment the PABAS threaded insert mount height (344) may be 2-30% larger than the DABAS pressure plate height (274). This embodiment of clamp biasing mechanism (500) provides positive biasing in that is causes the dorsal arm (200) and palmer arm (300) to move closer together upon activating the biasing mechanism (500). Another embodiment of clamp (100) may use a negative biasing mechanism (500) that spreads a pre-biased dorsal arm (200) and palmer arm (300) away from each other upon activating the biasing mechanism (500), not illustrated. In this embodiment the user activates the biasing mechanism (500) which opens the clamp (100) and afterwards slides the clamp into position of their hand. Afterwards, the biasing mechanism (500) is deactivated allowing the clamp (100) to activate the hand's pressure point.

Figure 23:
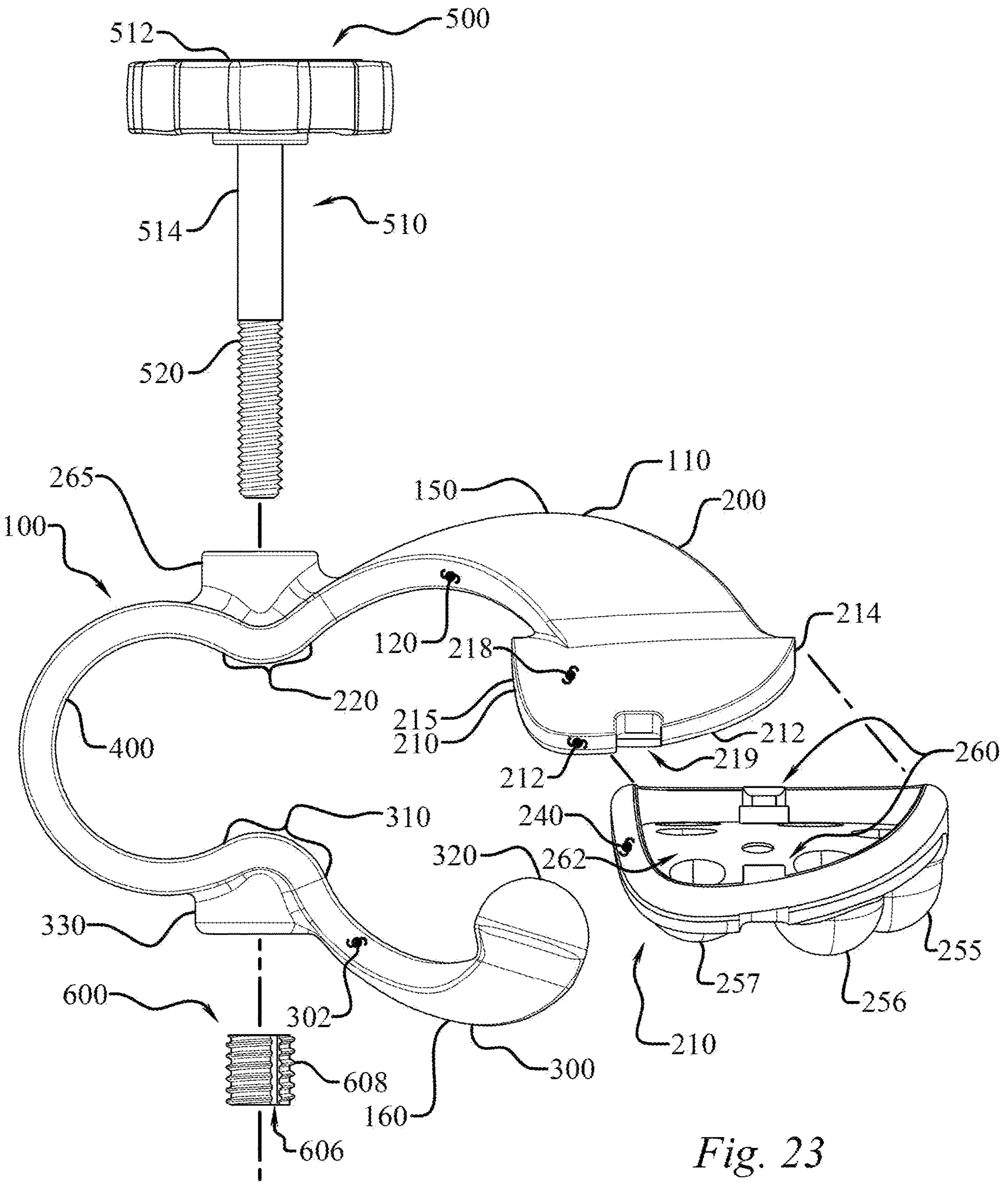
FIG. 23 is an exploded sinistral side view of a hand clamp embodiment.

FIG. 23 show and exploded view of an embodiment of clamp (100) and how it is assembled. FIG. 24 is a cross-section of the embodiment illustrated in FIG. 4 showing how the various components fit together in the assembled state.

Figure 29:
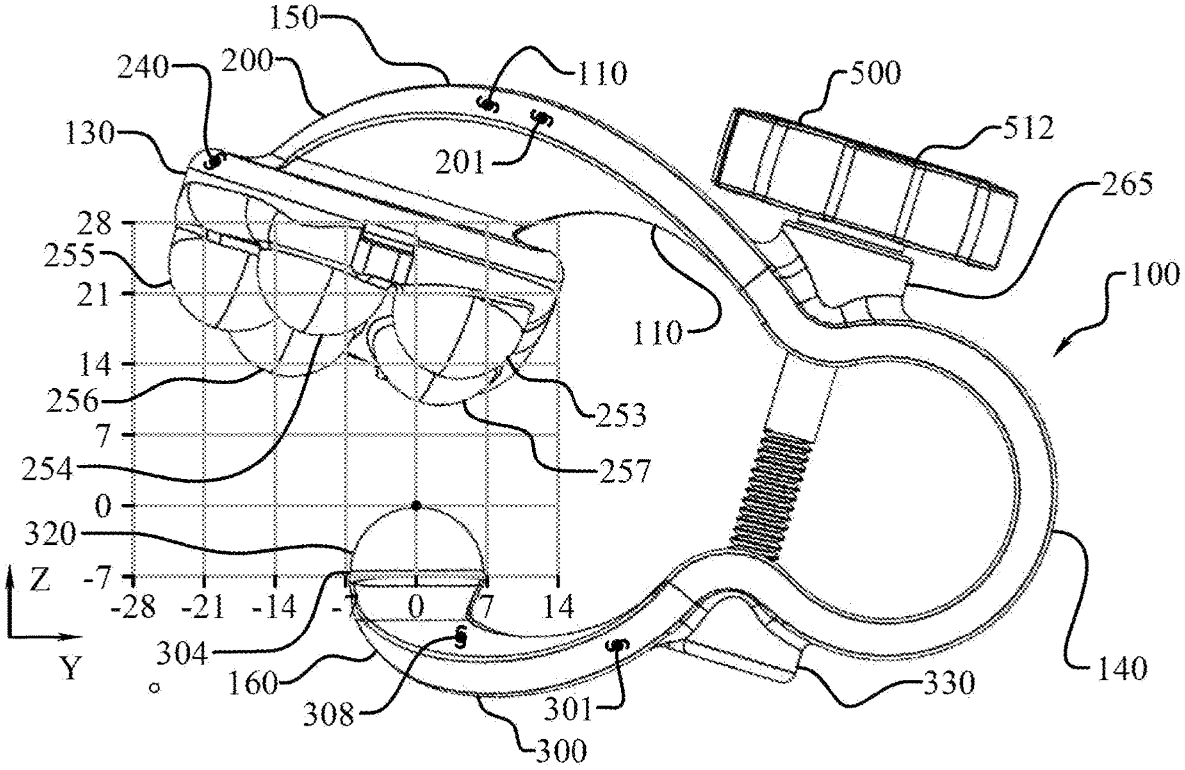
FIG. 29 is a dextral side view of a hand clamp embodiment having a (Y, Z) coordinate grid.
Figure 30:
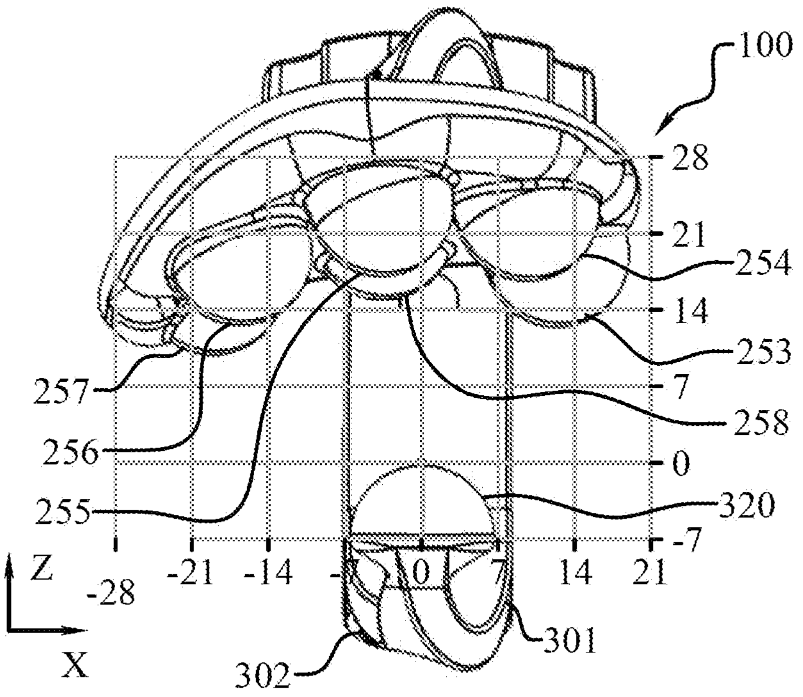
FIG. 30 is a proximal side view of a hand clamp embodiment having a (X, Z) coordinate grid.
Figure 31:
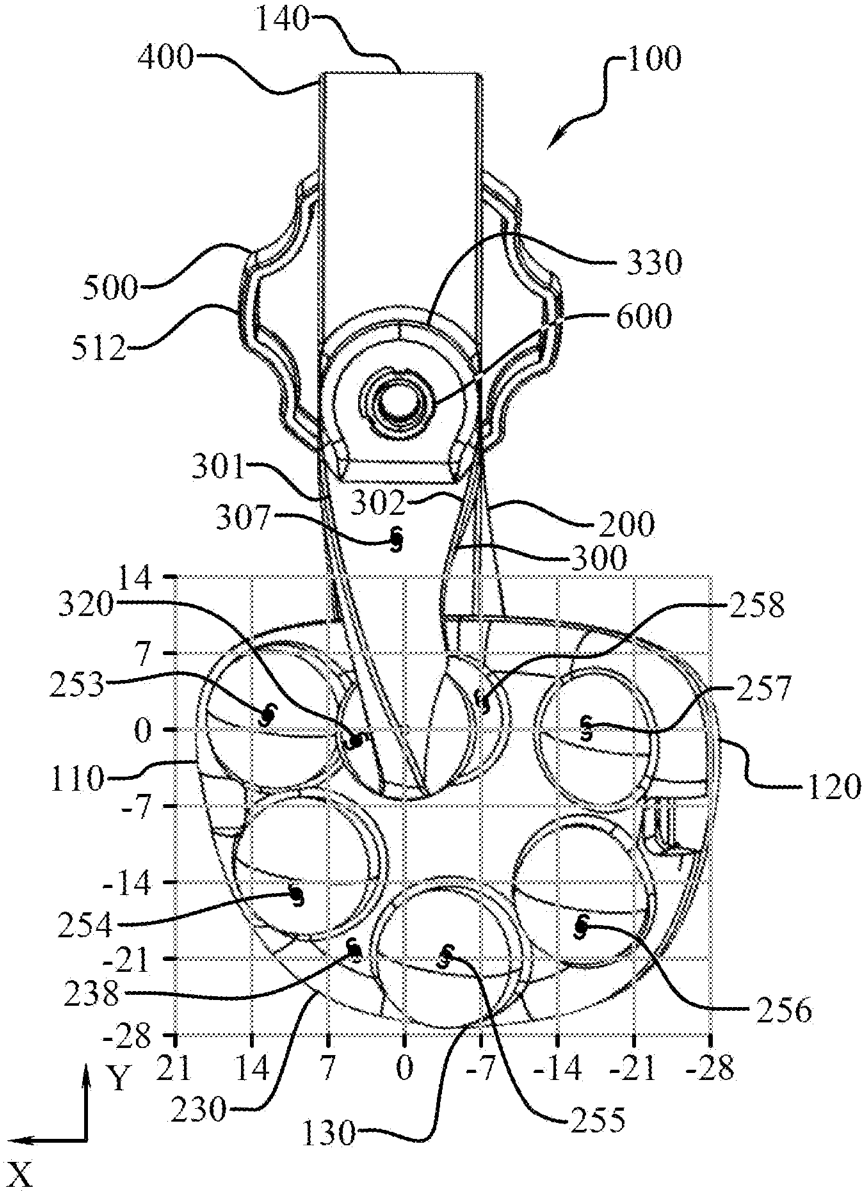
FIG. 31 is a palmer side plan view of a hand clamp embodiment having a (X, Y) coordinate grid.

Now referring to FIGS. 29-31, each of which has a coordinate grid imposed against the clamp (100) to allow measurements to be made in the Y-Z axes for FIG. 29, X-Z axes for FIG. 30, and X-Y axes for FIG. 31. In one embodiment the origin for each grid is defined at the apex of the palmer arm pressure bulge (320) with the clamp (100) oriented such that a plane tangent to the apex is horizontal. In another embodiment the origin for each grid is defined at point on apex of the palmer arm pressure bulge (320) nearest the reference bulge with the clamp (100) oriented such the direction-of-motion plane is vertical. In still a further embodiment the origin for each grid is defined at point on apex of the palmer arm pressure bulge (320) nearest the reference bulge with the clamp (100) oriented such the longitudinal axis is vertical.

The disclosure is going to reference the embodiment with the origin for each grid is defined at the apex of the palmer arm pressure bulge (320) with the clamp (100) oriented such that a plane tangent to the apex is horizontal, unless noted otherwise. Thus, in FIG. 29 the Z-axis zero line represents the plane tangent to the apex of the palmer arm pressure bulge (320). Furthermore in this embodiment, each of the vertical column lines on the grids are defined to be 7 mm from their neighboring vertical column lines, and each of the horizontal row lines are also defined as 7 mm from their neighboring horizontal row lines.

Figure 32:
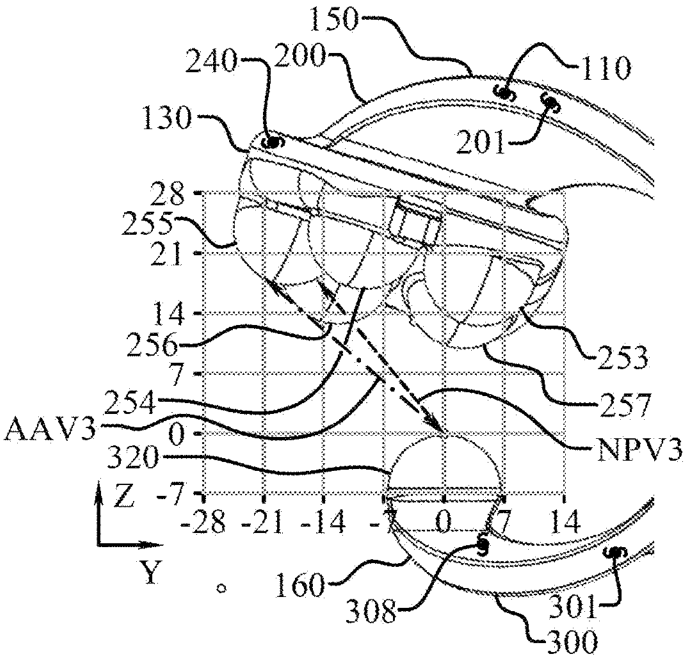
FIG. 32 is a dextral side view of a hand clamp embodiment having a (Y, Z) coordinate grid.
Figure 33:
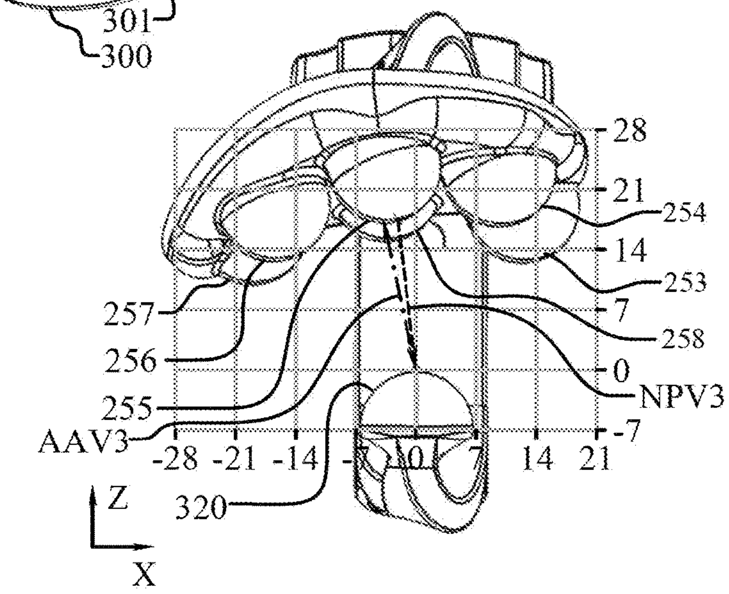
FIG. 33 is a proximal side view of a hand clamp embodiment having a (X, Z) coordinate grid.
Figure 34:
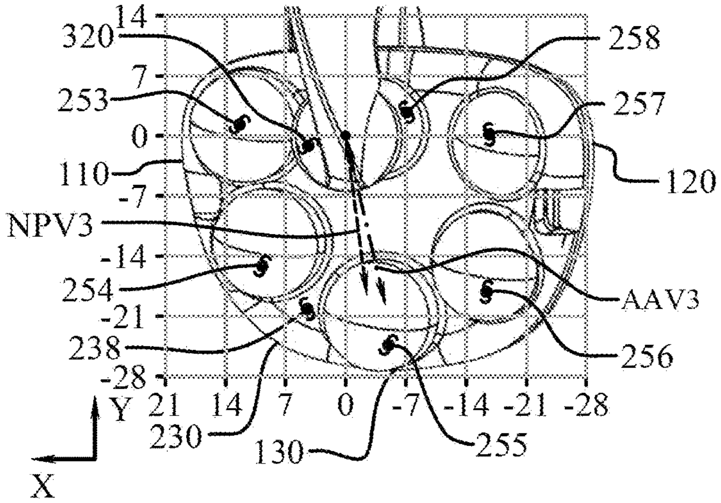
FIG. 34 is a palmer side plan view of a hand clamp embodiment having a (X, Y) coordinate grid.
Figure 35:
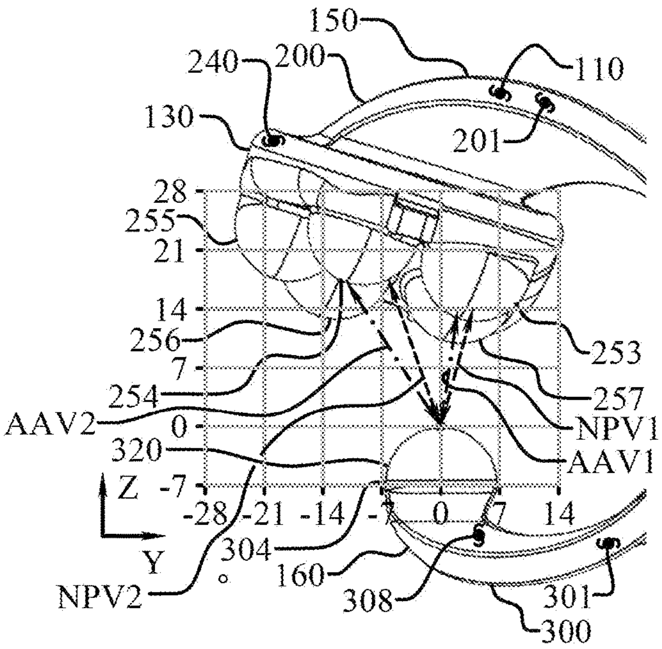
FIG. 35 is a dextral side view of a hand clamp embodiment having a (Y, Z) coordinate grid.

The embodiment in FIG. 29 shows the clamp in a deactivated relaxed state wherein: an apex of DAPP bulge 1 (253) is located in the Y-Z plane at (2 mm, 13 mm), an apex of DAPP bulge 2 (254) is located in the Y-Z plane at (−11.25 mm, 17.25 mm), an apex of DAPP bulge 3 (255) is located in the Y-Z plane at (−20 mm, 17.75 mm), an apex of DAPP bulge 4 (256) is located in the Y-Z plane at (−14.25 mm, 13.25 mm), the apex of DAPP bulge 5 (257) may be located in the Y-Z plane at (0.5 mm, 10.75 mm), and an apex of DAPP bulge 6 (258) is located in the Y-Z plane at (0.25 mm, 16.25 mm). When the clamp (100) embodiment in FIG. 29 is in an activated state, the apex of DAPP bulge 1 (253) may be located in the Y-Z plane at (1.5 mm, 10.5 mm) to (1.75 mm, 11.75 mm), the apex of DAPP bulge 2 (254) may be located in the Y-Z plane at (−12.25 mm, 14 mm) to (−11.75 mm, 15.75 mm), the apex of DAPP bulge 3 (255) may be located in the Y-Z plane at (−20.75 mm, 14.5 mm) to (−20.25 mm, 16 mm), the apex of DAPP bulge 4 (256) may be located in the Y-Z plane at (−15 mm, 9.75 mm) to (−14.75 mm, 11.5 mm), the apex of DAPP bulge 5 (257) may be located in the Y-Z plane at (0 mm, 8.75 mm) to (0.25 mm, 9.75 mm), and the apex of DAPP bulge 6 (258) may be located in the Y-Z plane at (−1.5 mm, 14.25 mm) to (0 mm, 16 mm). For the embodiments disclosed herein the apex of each of the DAPP bulges is defined as the furthest point away from and directly opposite the flat bottom of a hemisphere. Take for instance the palmer arm pressure bulge (320) seen in FIG. 32. An imaginary plane can be passed just below the palmer arm pressure bulge (320) hemisphere, thereby forming an imaginary flat bottom. Furthermore, the apex is the very topmost point where you would end up if you started at the flat base and moved straight up to the highest point.

Alternatively, the coordinates may be provided for the point on each of the DAPP bulges that is nearest to the origin and may therefore not correspond to the coordinates of the apex of the DAPP bulge; these are referred to as nearest-point coordinates. In one embodiment with the clamp in a deactivated relaxed state the nearest-point coordinates of the DAPP bulge 1 (253) is located in the Y-Z plane at (3 mm, 12.75 mm), the nearest-point coordinates of the DAPP bulge 2 (254) is located in the Y-Z plane at (−6 mm, 17 mm), the nearest-point coordinates of the DAPP bulge 3 (255) is located in the Y-Z plane at (−15 mm, 17.5 mm), the nearest-point coordinates of the DAPP bulge 4 (256) is located in the Y-Z plane at (−9 mm, 13.75 mm), the nearest-point coordinates of the DAPP bulge 5 (257) is located in the Y-Z plane at (0 mm, 13 mm), and the nearest-point coordinates of the DAPP bulge 6 (258) is located in the Y-Z plane at (1.25 mm, 16.25 mm). When the clamp (100) embodiment in FIG. 29 is in an activated state, the nearest-point coordinates of the DAPP bulge 1 (253) may be located in the Y-Z plane at (2 mm, 10.25 mm) to (2.75 mm, 11.5 mm), the nearest-point coordinates of the DAPP bulge 2 (254) may be located in the Y-Z plane at (−7.5 mm, 14.75 mm) to (−6.75 mm, 16 mm), the nearest-point coordinates of the DAPP bulge 3 (255) may be located in the Y-Z plane at (−14 mm, 15 mm) to (−12 mm, 16.5 mm), the nearest-point coordinates of the DAPP bulge 4 (256) may be located in the Y-Z plane at (−8.75 mm, 12.5 mm) to (−8 mm, 11 mm), the nearest-point coordinates of the DAPP bulge 5 (257) may be located in the Y-Z plane at (0.75 mm, 11.75 mm) to (0.5 mm, 12.25 mm), and the nearest-point coordinates of the DAPP bulge 6 (258) may be located in the Y-Z plane at (1 mm 9 mm) to (0.75 mm, 9.75 mm).

FIG. 30 shows a proximal side view of an embodiment of clamp (100) which has a coordinate grid imposed against the clamp (100) to allow measurements to be made in the X-Z axes. As stated earlier, the origin for each grid is defined at the apex of the palmer arm pressure bulge (320). Additionally, each of the vertical column lines on the grids are defined to be 7 mm from their neighboring vertical column lines, and each of the horizontal row lines are also defined as 7 mm from their neighboring horizontal row lines. The embodiment in FIG. 30 shows the clamp in a deactivated relaxed state wherein: the apex of DAPP bulge 1 (253) is located in the X-Z plane at (13.75 mm, 13 mm), the apex of DAPP bulge 2 (254) is located in the X-Z plane at (9.25 mm, 17.25 mm), the apex of DAPP bulge 3 (255) is located in the X-Z plane at (−2.75 mm, 17.75 mm), the apex of DAPP bulge 4 (256) is located in the X-Z plane at (−14.25 mm, 13.25 mm), and the apex of DAPP bulge 5 (257) is located in the X-Z plane at (−15.75 mm, 10.75 mm), and the DAPP bulge 6 (258) is located in the X-Z plane at (−3.75 mm, 16.25 mm). When the clamp (100) embodiment in FIG. 29 is in an activated state, the apex of DAPP bulge 1 (253) may be located in the X-Z plane at (13.75 mm, 10.5 mm) to (13.75 mm, 11.75 mm), the apex of DAPP bulge 2 (254) may be located in the X-Z plane at (9.25 mm, 14 mm) to (9.25 mm, 15.75 mm), the apex of DAPP bulge 3 (255) may be located in the X-Z plane at (−2 mm, 14.5 mm) to (−2 mm, 16 mm), the apex of DAPP bulge 4 (256) may be located in the X-Z plane at (−14.25 mm, 9.75 mm) to (−14.25 mm, 11.5 mm), the apex of DAPP bulge 5 (257) may be located in the X-Z plane at (−15.75 mm, 8.75 mm) to (−15.75 mm, 9.75 mm) and the apex of DAPP bulge 6 (258) may be located in the X-Z plane at (−3.75 mm, 14.75 mm) to (−3.75 mm, 16 mm).

Alternatively, the coordinates may be provided for the point on each of the DAPP bulges that is nearest to the origin and may therefore not correspond to the coordinates of the apex of the DAPP bulge; these are referred to as nearest-point coordinates, illustrated by a nearest-point vector, labeled NPV, in FIGS. 32-43, while an apex-apex vector is labeled AAV. NPV3 is the nearest-point vector for DAPP bulge 3 (255), while NPV1 is the nearest-point vector for DAPP bulge 1 (253), NPV2 is the nearest-point vector for DAPP bulge 2 (254), NPV4 is the nearest-point vector for DAPP bulge 4 (256), NPV5 is the nearest-point vector for DAPP bulge 5 (257), and NPV6 is the nearest-point vector for DAPP bulge 6 (258). Likewise, AAV3 is the apex-apex vector for DAPP bulge 3 (255), while AAV1 is the apex-apex vector for DAPP bulge 1 (253), AAV2 is the apex-apex vector for DAPP bulge 2 (254), AAV4 is the apex-apex vector for DAPP bulge 4 (256), AAV5 is the apex-apex vector for DAPP bulge 5 (257), and AAV6 is the apex-apex vector for DAPP bulge 6 (258). In one embodiment with the clamp in a deactivated relaxed state the nearest-point coordinates of the DAPP bulge 1 (253) is located in the X-Z plane at (7.75 mm, 14.25 mm), the nearest-point coordinates of the DAPP bulge 2 (254) is located in the X-Z plane at (8 mm, 17 mm), the nearest-point coordinates of the DAPP bulge 3 (255) is located in the X-Z plane at (2 mm, 17.5 mm), the nearest-point coordinates of the DAPP bulge 4 (256) is located in the X-Z plane at (−11 mm, 13.75 mm), the nearest-point coordinates of the DAPP bulge 5 (257) is located in the X-Z plane at (−14 mm, 13 mm), and the nearest-point coordinates of the DAPP bulge 6 (258) is located in the X-Z plane at (2 mm, 16.25 mm). When the clamp (100) embodiment in FIG. 29 is in an activated state, the nearest-point coordinates of the DAPP bulge 1 (253) may be located in the X-Z plane at (7.75 mm, 10.25 mm) to (7.75 mm, 11.5 mm), the nearest-point coordinates of the DAPP bulge 2 (254) may be located in the X-Z plane at (8 mm, 14.75 mm) to (8 mm, 16 mm), the nearest-point coordinates of the DAPP bulge 3 (255) may be located in the X-Z plane at (−4 mm, 15 mm) to (−4 mm, 16.5 mm), the nearest-point coordinates of the DAPP bulge 4 (256) may be located in the X-Z plane at (−11 mm, 11 mm) to (−11 mm, 11.25 mm), the nearest-point coordinates of the DAPP bulge 5 (257) may be located in the X-Z plane at (−14 mm, 11.75 mm) to (−14 mm, 12.25 mm), and the nearest-point coordinates of the DAPP bulge 6 (258) may be located in the X-Z plane at (0 mm, 9 mm) to (0 mm, 9.75 mm).

FIG. 31 shows a bottom plan view of an embodiment of clamp (100) which has a coordinate grid imposed against the clamp (100) to allow measurements to be made in the X-Y axes. As stated earlier, the origin for each grid is defined at the apex of the palmer arm pressure bulge (320). Additionally, each of the vertical column lines on the grids are defined to be 7 mm from their neighboring vertical column lines, and each of the horizontal row lines are also defined as 7 mm from their neighboring horizontal row lines. The embodiment in FIG. 31 shows the clamp in a deactivated relaxed state wherein: the apex of DAPP bulge 1 (253) is located in the X-Y plane at (13.75 mm, 2 mm), the apex of DAPP bulge 2 (254) is located in the X-Y plane at (9.25 mm, −11.25 mm), the apex of DAPP bulge 3 (255) is located in the X-Y plane at (−2.75 mm, −20 mm), the apex of DAPP bulge 4 (256) is located in the X-Y plane at (−14.25 mm, −14.25 mm), the apex of DAPP bulge 5 (257) is located in the X-Y plane at (−15.75 mm, 0.5 mm), and the apex of DAPP bulge 6 (258) is located in the X-Y plane at (−3.75 mm, 0.25 mm). When the clamp (100) embodiment in FIG. 31 is in an activated state, the apex of DAPP bulge 1 (253) may be located in the X-Y plane at (13.75 mm, 1.5 mm) to (13.75 mm, 1.75 mm), the apex of DAPP bulge 2 (254) may be located in the X-Y plane at (9.25 mm, −12.25 mm) to (9.25 mm, −11.75 mm), the apex of DAPP bulge 3 (255) may be located in the X-Y plane at (−2 mm, −20.75 mm) to (−2 mm, −20.25 mm), the apex of DAPP bulge 4 (256) may be located in the X-Y plane at (−14.25 mm, −15 mm) to (−14.25 mm, −14.75 mm), the apex of DAPP bulge 5 (257) is located in the X-Y plane at (−15.75 mm, 0 mm) to (−15.75 mm, 0.25 mm), and the apex of DAPP bulge 6 (258) may be located in the X-Y plane at (−3.75 mm, 0 mm) to (−3.75 mm, −1.5 mm).

Alternatively, the coordinates may be provided for the point on each of the DAPP bulges that is nearest to the origin and may therefore not correspond to the coordinates of the apex of the DAPP bulge; these are referred to as nearest-point coordinates. In one embodiment with the clamp in a deactivated relaxed state the nearest-point coordinates of the DAPP bulge 1 (253) is located in the X-Y plane at (−7.75 mm, 3 mm), the nearest-point coordinates of the DAPP bulge 2 (254) is located in the X-Y plane at (8 mm, −6 mm), the nearest-point coordinates of the DAPP bulge 3 (255) is located in the X-Y plane at (2 mm, −15 mm), the nearest-point coordinates of the DAPP bulge 4 (256) is located in the X-Y plane at (−11 mm, −9 mm), the nearest-point coordinates of the DAPP bulge 5 (257) is located in the X-Y plane at (−14 mm, 0 mm), and the nearest-point coordinates of the DAPP bulge 6 (258) is located in the X-Y plane at (2 mm, 1.25 mm). When the clamp (100) embodiment in FIG. 29 is in an activated state, the nearest-point coordinates of the DAPP bulge 1 (253) may be located in the X-Y plane at (−7.75 mm, 2 mm) to (−7.75 mm, 2.75 mm), the nearest-point coordinates of the DAPP bulge 2 (254) may be located in the X-Y plane at (8 mm, −7.5 mm) to (8 mm, −6.75 mm), the nearest-point coordinates of the DAPP bulge 3 (255) may be located in the X-Y plane at (−2 mm, −14 mm) to (−2 mm, −12 mm), the nearest-point coordinates of the DAPP bulge 4 (256) may be located in the X-Y plane at (−11 mm, −8.75 mm) to (−11 mm, −8 mm), the nearest-point coordinates of the DAPP bulge 5 (257) may be located in the X-Y plane at (−14 mm, 0.75 mm) to (−14 mm, 0.5 mm), and the nearest-point coordinates of the DAPP bulge 6 (258) may be located in the X-Y plane at (0 mm, 1.5 mm) to (0 mm, 0.25 mm).

Therefore, the above paragraphs have disclosed the apex bulge coordinates for the Y-Z plane, the X-Z plane, and the X-Y plane, for both a deactivated state, or position, and an activated state, or position. Similarly, the above paragraphs have disclosed the nearest-point coordinates for the Y-Z plane, the X-Z plane, and the X-Y plane, for both a deactivated state, or first position, and an activated state, or second position. The above example is set forth in table form in Tables 1-4 below.

TABLE 1

| deactivated relaxed state apex coordinates (in mm) of DAPP: | | | | | | |
|---|---|---|---|---|---|---|
| PLANE | bulge 1 (253) | bulge 2 (254) | bulge 3 (255) | bulge 4 (256) | bulge 5 (257) | bulge 6 (258) |
| Y − Z (y, z) | 2, 13 | −11.25, 17.25 | −20, 17.75 | −14.25, 13.25 | 0.5, 10.75 | 0.25, 16.25 |
| X − Z (x, z) | 13.75, 13 | 9.25, 17.25 | −2.75, 17.75 | −14.25, 13.25 | −15.75, 10.75 | −3.75, 16.25 |
| X − Y (x, y) | 13.75, 2 | 9.25, −11.25 | −2.75, −20 | −14.25, −14.25 | −15.75, 0.5 | −3.75, 0.25 |

TABLE 2

| activated state apex coordinates (in mm) of DAPP: | | | | | | |
|---|---|---|---|---|---|---|
| PLANE | bulge 1 (253) | bulge 2 (254) | bulge 3 (255) | bulge 4 (256) | bulge 5 (257) | bulge 6 (258) |
| Y − Z (y, z) | 1.5, 10.5 to 1.75, 11.75 | −12.25, 14 to −11.75, 15.75 | −20.75, 14.5 to −20.25, 16 | −15, 9.75 to −14.75, 11.5 | 0, 8.75 to 0.25, 9.75 | 0,1 6 to −1.5, 14.75 |
| X − Z (x, z) | 13.75, 10.5 to 13.75, 11.75 | 9.25, 14 to 9.25, 15.75 | −2, 14.5 to −2, 16 | −14.25, 9.75 to −14.25, 11.5 | −15.75, 8.75 to −15.75, 9.75 | −3.75, 16 to −3.75, 14.75 |
| X − Y (x, y) | 13.75, 1.5 to 13.75, 1.75 | 9.25, −12.25 To 9.25, −11.75 | −2, −20.75 to −2, −20.25 | −14.25, −15 to −14.25, −14.75 | −15.75, 0 to −15.75, 0.25 | −3.75, 0 to −3.75, 1.5 |

TABLE 3

| deactivated relaxed state nearest-point coordinates (in mm) of DAPP: | | | | | | |
|---|---|---|---|---|---|---|
| PLANE | bulge 1 (253) | bulge 2 (254) | bulge 3 (255) | bulge 4 (256) | bulge 5 (257) | bulge 6 (258) |
| Y − Z (y, x) | 3, 14.25 | −6, 17 | −15, 17.5 | −9, 13.75 | 0, 13 | 1.25, 16.25 |
| X − Z (x, z) | 7.75, 14.25 | 8, 17 | −2, 17.5 | −11, 13.75 | −14, 13 | 2, 16.25 |
| X − Y (x, y) | 7.75, 3 | 8, −6 | −2, −15 | −11, −9 | −14, 0 | 2,1.25 |

TABLE 4

| activated state nearest-point coordinates (in mm) of DAPP: | | | | | | |
|---|---|---|---|---|---|---|
| PLANE | bulge 1 (253) | bulge 2 (254) | bulge 3 (255) | bulge 4 (256) | bulge 5 (257) | bulge 6 (258) |
| Y - Z (y, z) | 2, 10.25 to 2.75, 11.5 | −7.5, 14.75 to −6.75, 16 | −14, 15 to −12, 16.5 | −8.75, 12.5 to −8, 11 | 0.75, 11.75 to 0.5, 12.25 | 1, 9 to 0.75, 9.75 |
| X - Z (x, z) | 6, 10.25 to 6, 11.5 | 8, 14.75 to 8, 16 | −4, 15 to −4, 16.5 | −11, 12.5 to −11, 11 | −14, 11.75 to −14, 12.25 | 0, 9 to 0, 9.75 |
| X - Y (x, y) | 6, 2 to 6, 2.75 | 8, −7.5 to 8, −6.75 | −4, −14 to −4, −12 | −11, −8.75 to −11, −8 | −14, 0.75 to −14, 0.5 | 0, 1 to 0, 0.75 |

One skilled in the art will recognize that the positions of the deactivated state and the activated state is not particularly significant, rather it is the coordinates of one bulge in relation to at least one other bulge and the change in coordinates from a first position to a second position that are essential to the performance of the clamp.

Therefore, in a first apex coordinate example a first position is the deactivated relaxed state is defined by setting the apex coordinates of DAPP bulge 3 (255) in the Y-Z plane to (−20 mm, 17.75 mm), in the X-Z plane to (−2.75 mm, 17.75 mm), and in the X-Y plane to (−2.75 mm, −20 mm), thus establishing x, y, and z coordinates of (−2.75, −20, 17.75), and thus the AAV3 has a length of 26.88 mm, as seen in Table 5 below in the left side of the bulge 3 (255) column representing the deactivated relaxed state. Likewise, in a second position the activated state is defined by setting the apex coordinates of DAPP bulge 3 (255) in the Y-Z plane to (−20.75 mm, 14.5 mm), in the X-Z plane to (−2 mm, 14.5 mm), and in the X-Y plane to (−2 mm, −20.75 mm), thus establishing x, y, and z coordinates of (−2, −20.75, 14.5), and thus the second position AAV3 has a length of 25.39 mm, as seen in Table 5 below in the right side of the bulge 3 (255) column representing the activated state. Then, with these 2 positions of DAPP bulge 3 (255) fixed with respect to the origin, the coordinates of any one or more of the other DAPP bulges may also be established.

TABLE 5

| apex coordinates (in mm) of DAPP: | | | | | | | | | | | | |
|---|---|---|---|---|---|---|---|---|---|---|---|---|
| | bulge 1 (253) | | bulge 2 (254) | | bulge 3 (255) | | bulge 4 (256) | | bulge 5 (257) | | bulge 6 (258) | |
| State | deact | activ | deact | activ | deact | activ | deact | activ | deact | activ | deact | activ |
| X | 13.75 | 13.75 | 9.25 | 9.25 | −2.75 | −2 | −14.25 | −14.25 | −15.75 | −15.75 | −3.75 | −3.75 |
| Y | 2 | 1.5 | −11.25 | −12.25 | −20 | −20.75 | −14.25 | −15 | 0.5 | 0 | 0.25 | 0 |
| Z | 13 | 10.5 | 17.25 | 14 | 17.75 | 14.5 | 13.25 | 9.75 | 10.75 | 8.75 | 16.25 | 16 |
| AAV | 19.03 | 17.37 | 22.58 | 20.78 | 26.88 | 25.39 | 24.12 | 22.87 | 19.08 | 18.02 | 16.68 | 16.43 |
| AAV delta | 1.66 | | 1.8 | | 1.49 | | 1.25 | | 1.06 | | 0.25 | |

The first apex coordinate example above describes two precise locations of bulge 3 (255) including the x, y, and z coordinates at the first and second position, thereby facilitating the disclosed relationships of any one or more of the other bulges relative to bulge 3 (255), and/or the origin. Thus, in these examples bulge 3 (255) is a reference bulge with coordinates in two defined locations from which the other relationships may be defined. However, one skilled in the art will appreciate that any of the disclosed bulges, and the disclosed coordinates, may serve as the reference bulge for relationships with any one, or more, of the other bulges. Further, all three of the x, y, and z coordinates are not needed to define the first and second positions; any one or more of the coordinates may be used to define the reference bulge and the first and second position. For example, in a second apex coordinate example the z-coordinate of bulge 3 (255) is set at 17.75 mm for the first position, and the z-coordinate of bulge 3 (255) is set at 14.5 mm for the second position, and the x-coordinate and y-coordinate of bulge 3 (255) may be at any distance ±7 mm from the exact coordinates disclosed in any of the Tables, and in further embodiments ±6 mm, ±5 mm, ±4 mm, ±3 mm, ±2 mm, or ±1 mm. Thus, in this second apex coordinate example the x-coordinate and/or y-coordinate of bulge 3 (255) may remain constant, or may change, as the z-coordinate changes from 17.75 mm in the first position to 14.5 mm in the second position. However in a third apex coordinate example the y-coordinate of bulge 3 (255) becomes more negative as the z-coordinate changes from 17.75 mm in the first position to 14.5 mm in the second position. Further, in a fourth apex coordinate example the second position AAV3 length is within 3 mm of the first position AAV3 length, and in further embodiments within 2.5 mm, 2.0 mm, or 1.5 mm, which is referred to as the AAV3 P1-P2 delta, seen in the last row of Table 5. In a fifth apex coordinate example at least one bulge has an AAV P1-P2 delta that is at least 2 times a AAV P1-P2 delta of at least one other bulge, and in further embodiments at least 3 times, 4 times, 5 times, or 6 times. In a sixth apex coordinate example one bulge establishes a maximum AAV P1-P2 delta, and another bulge establishes a minimum AAV P1-P2 delta, and the maximum AAV P1-P2 delta is no more than 15 times the minimum AAV P1-P2 delta, and in further embodiments no more than 13 times, 11 times, or 9 times.

A seventh apex coordinate example includes bulge 3 (255) and at least two additional bulges in close proximity to bulge 3 (255), namely bulge 2 (254) and bulge 4 (256). In one embodiment of this example, in the first position the x-coordinate of bulge 2 (254) is within 18 mm of the x-coordinate of bulge 3 (255), and the x-coordinate of bulge 4 (256) is within 18 mm of the x-coordinate of bulge 3 (255); while in further embodiments the 18 mm is narrowed to 16 mm, 14 mm, or 12 mm. In another embodiment of this example, in the first position the y-coordinate of bulge 2 (254) is at least 4 mm, 6 mm, or 8 mm greater than the y-coordinate of bulge 3 (255), and the y-coordinate of bulge 4 (256) is at least 2 mm, 3 mm, 4 mm, or 5 mm greater than the y-coordinate of bulge 3 (255). In another embodiment of this example, in the first position the y-coordinate of bulge 2 (254) is at least 4 mm, 6 mm, or 8 mm greater than the y-coordinate of bulge 3 (255), and the y-coordinate of bulge 4 (256) is at least 2 mm, 3 mm, 4 mm, or 5 mm greater than the y-coordinate of bulge 3 (255). In another embodiment of this example, in the first position the y-coordinate of bulge 2 (254) is greater than the y-coordinate of bulge 4 (256); and in another embodiment in the first position the y-coordinate of bulge 2 (254) is at least 1 mm, 2 mm, or 3 mm greater than the y-coordinate of bulge 4 (256); while in still a further embodiment in the first position the y-coordinate of bulge 2 (254) is no more than 7 mm, 6 mm, 5 mm, or 4 mm greater than the y-coordinate of bulge 4 (256). In one embodiment of this example, in the first position the z-coordinate of bulge 2 (254) is greater than the z-coordinate of bulge 4 (256); while in further embodiments in the first position the z-coordinate of bulge 2 (254) is at least 1 mm, 2 mm, or 3 mm greater than the z-coordinate of bulge 4 (256); and in yet another embodiment the first position the z-coordinate of bulge 2 (254) is less than the z-coordinate of bulge 3 (255).

An eighth apex coordinate example includes bulge 3 (255) and at least two additional distant bulges, namely bulge 1 (253), bulge 5 (257), and/or bulge 6 (258). In one embodiment of this example, in the first position a bulge 1 (253) x-coordinate differential is the x-coordinate of bulge 1 (253) minus the x-coordinate of bulge 3 (255), which in Table 5 is 13.75 minus −2.75 and thus 16.5, and a bulge 5 (257) x-coordinate differential is the x-coordinate of bulge 5 (257) minus the x-coordinate of bulge 3 (255), which in Table 5 is −15.75 minus −2.75 and thus −13. In one embodiment of this example, in the first position the bulge 1 (253) x-coordinate differential and/or the bulge 5 (257) x-coordinate differential is at least 8 mm, 10 mm, or 12 mm; while in another embodiment of this example, in the first position the bulge 1 (253) x-coordinate differential and/or the bulge 5 (257) x-coordinate differential is no more than 24 mm, 22 mm, 20 mm, 18 mm, or 16 mm. In another embodiment of this example, in the first position the z-coordinate of bulge 3 (255) is greater than the z-coordinate of bulge 1 (253), bulge 5 (257), and/or bulge 6 (258); and at least 1 mm, 2 mm, or 3 mm greater in further embodiments. In another embodiment of this example, in the first position the z-coordinate of bulge 1 (253), bulge 5 (257), and/or bulge 6 (258) is within 12 mm, 11 mm, 10 mm, 9 mm, or 8 mm of the z-coordinate of bulge 3 (255). In another embodiment of this example, in the first position the y-coordinate of bulge 1 (253), bulge 5 (257), and/or bulge 6 (258) is at least 15 mm, 16 mm, 17 mm, 18 mm, or 19 mm greater than the y-coordinate of bulge 3 (255). In another embodiment of this example, in the first position the y-coordinate of bulge 1 (253), bulge 5 (257), and/or bulge 6 (258) is no more than 34 mm, 32 mm, 30 mm, or 28 mm greater than the y-coordinate of bulge 3 (255). In another embodiment of this example, in the first position the x-coordinate of bulge 6 (258) is within ±5 mm of the x-coordinate of bulge 3 (255), and in further embodiments is within ±4 mm, ±3 mm, ±2 mm, or ±1 mm. In another embodiment of this example, in the first position the x-coordinate of bulge 6 (258) is negative and the x-coordinate of bulge 3 (255) is also negative.

A ninth apex coordinate example includes bulge 3 (255), bulge 2 (254), bulge 4 (256), bulge 1 (253), and bulge 5 (257), and as with all examples and embodiments, any of the disclosed relationships may apply. Similarly, any of the disclosed relationships of this embodiment, or any other embodiments or example, may apply to any of the other examples or embodiments. Just as bulge 1 (253) and bulge 5 (257) have x-coordinate differentials, so to do bulge 2 (254) and bulge 4 (256). Thus, in one embodiment of this example, in the first position a bulge 2 (254) x-coordinate differential is the x-coordinate of bulge 2 (254) minus the x-coordinate of bulge 3 (255), which in Table 5 is 9.25 minus −2.75 and thus 13, and a bulge 4 (256) x-coordinate differential is the x-coordinate of bulge 4 (256) minus the x-coordinate of bulge 3 (255), which in Table 5 is −14.25 minus −2.75 and thus −11.5. In one embodiment the absolute value of the bulge 2 (254) x-coordinate differential is greater than the absolute value of the bulge 4 (256) x-coordinate differential. In another embodiment the bulge 2 (254) x-coordinate differential is less than the bulge 1 (253) x-coordinate differential, and in further embodiments the bulge 2 (254) x-coordinate differential is less than the bulge 1 (253) x-coordinate differential by at least 1 mm, 2 mm, or 3 mm. In one embodiment the absolute value of the bulge 4 (256) x-coordinate differential is less than the absolute value of the bulge 5 (257) x-coordinate differential, and in further embodiments the absolute value of the bulge 4 (256) x-coordinate differential is less than the absolute value of the bulge 5 (257) x-coordinate differential by at least 1 mm, 2 mm, or 3 mm.

In a tenth apex coordinate example, in the first position the z-coordinate of bulge 3 (255) is greater than the z-coordinate of all of the other bulges. While in another embodiment the z-coordinate of bulge 5 (257) is less than all of the other bulges. In a further embodiment, in the first position the y-coordinate of bulge 3 (255) is less than the y-coordinate of all other bulges. In a further embodiment, in the first position the absolute value of the x-coordinate of bulge 3 (255) is less than the absolute value of the x-coordinate of all other bulges. In another embodiment, in the first position the y-coordinate of at least one of bulge 1 (253), bulge 5 (257), or bulge 6 (258) is positive. In another embodiment, in the first position the y-coordinate of at least two of bulge 1 (253), bulge 5 (257), or bulge 6 (258) are positive. In another embodiment, in the first position the y-coordinate of bulge 2 (254), bulge 3 (254), and bulge 4 (256) are negative. In another embodiment in the first position the apex-apex vector is labeled AAV, of bulge 3 (255), and thus AAV3, is greater than the AAV of all other bulges. In another embodiment in the first position the apex-apex vector is labeled AAV, of bulge 6 (258), and thus AAV6, is less than the AAV of all other bulges. Again, to be explicit, any of the relationships disclosed in one example or embodiment may be combined with any other relationship disclosed in other examples or embodiments.

Similarly, in a first nearest-point example a first position is the deactivated relaxed state is defined by setting the nearest-point coordinates of DAPP bulge 3 (255) to x, y, and z coordinates of (−2, −15, 17.5), and thus the NPV3 has a length of 23.14 mm, as seen in Table 6 below in the left side of the bulge 3 (255) column representing the deactivated relaxed state. Likewise, in a second position the activated state is defined by setting the nearest-point coordinates of DAPP bulge 3 (255) to x, y, and z coordinates of (−4, −14.75, 15), and thus the second position NPV3 has a length of 20.90 mm, as seen in Table 6 below in the right side of the bulge 3 (255) column representing the activated state. Then, with these 2 positions of DAPP bulge 3 (255) fixed with respect to the origin, the coordinates of any one or more of the other DAPP bulges may also be established.

position. Further, in a fourth nearest-point coordinate example the second position NPV3 length is within 3 mm of the first position NPV3 length, and in further embodiments within 2.5 mm, 2.0 mm, or 1.5 mm, which is referred to as the NPV3 P1-P2 delta, seen in the last row of Table 6. In a fifth nearest-point coordinate example at least one bulge has an NPV P1-P2 delta that is at least 2 times a NPV P1-P2 delta of at least one other bulge, and in further embodiments at least 3 times, 4 times, 5 times, or 6 times. In a sixth nearest-point coordinate example one bulge establishes a maximum NPV P1-P2 delta, and another bulge establishes a minimum NPV P1-P2 delta, and the maximum NPV P1-P2 delta is no more than 15 times the minimum NPV P1-P2 delta, and in further embodiments no more than 13 times, 11 times, or 9 times.

A seventh nearest-point coordinate example includes bulge 3 (255) and at least two additional bulges in close proximity to bulge 3 (255), namely bulge 2 (254) and bulge 4 (256). As previously explained, nearest-point coordinates are the coordinates for the point on each of the DAPP bulges that is nearest to the origin and may therefore not correspond to the coordinates of the apex of the DAPP bulge. In one embodiment of this example, in the first position the nearest-

TABLE 6

| nearest-point coordinates (in mm) of DAPP: | | | | | | | | | | | | |
|---|---|---|---|---|---|---|---|---|---|---|---|---|
| | bulge 1 (253) | | bulge 2 (254) | | bulge 3 (255) | | bulge 4 (256) | | bulge 5 (257) | | bulge 6 (258) | |
| State | deact | activ | deact | activ | deact | activ | deact | activ | deact | activ | deact | activ |
| X | 7.75 | 6 | 8 | 8 | −2 | −4 | −11 | −11 | −14 | −14 | 2 | 0 |
| Y | 3 | 2 | −6 | −7.5 | −15 | −14 | −9 | −8.75 | 0 | 0.75 | 1.25 | 1 |
| Z | 14.25 | 10.25 | 17 | 14.75 | 17.5 | 15 | 13.75 | 12.5 | 13 | 11.75 | 16.25 | 9 |
| NPV | 16.50 | 12.04 | 19.72 | 18.38 | 23.14 | 20.90 | 19.78 | 18.81 | 19.10 | 18.29 | 16.42 | 9.06 |
| NPV delta | 4.46 | | 1.34 | | 2.24 | | 0.97 | | 0.81 | | 7.36 | |

The first nearest-point coordinate example above describes two precise locations of bulge 3 (255) including the x, y, and z coordinates at the first and second position, thereby facilitating the disclosed relationships of any one or more of the other bulges relative to bulge 3 (255), and/or the origin. Thus, in these examples bulge 3 (255) is a reference bulge with coordinates in two defined locations from which the other relationships may be defined. However, one skilled in the art will appreciate that any of the disclosed bulges, and the disclosed coordinates, may serve as the reference bulge for relationships with any one, or more, of the other bulges. Further, all three of the x, y, and z coordinates are not needed to define the first and second positions; any one or more of the coordinates may be used to define the reference bulge and the first and second position. For example, in a second nearest-point coordinate example the z-coordinate of bulge 3 (255) is set at 17.5 mm for the first position, and the z-coordinate of bulge 3 (255) is set at 15 mm for the second position, and the x-coordinate and y-coordinate of bulge 3 (255) may be at any distance ±7 mm from the exact coordinates disclosed in any of the Tables, and in further embodiments ±6 mm, ±5 mm, ±4 mm, ±3 mm, ±2 mm, or ±1 mm. Thus, in this second nearest-point coordinate example the x-coordinate and/or y-coordinate of bulge 3 (255) may remain constant, or may change, as the z-coordinate changes from 17.5 mm in the first position to 15 mm in the second position. However in a third nearest-point coordinate example the y-coordinate of bulge 3 (255) becomes more negative as the z-coordinate changes from 17.5 mm in the first position to 15 mm in the second point x-coordinate of bulge 2 (254) is within 18 mm of the nearest-point x-coordinate of bulge 3 (255), and the nearest-point x-coordinate of bulge 4 (256) is within 18 mm of the nearest-point x-coordinate of bulge 3 (255); while in further embodiments the 18 mm is narrowed to 16 mm, 14 mm, or 12 mm. In another embodiment of this example, in the first position the nearest-point y-coordinate of bulge 2 (254) is at least 4 mm, 6 mm, or 8 mm greater than the nearest-point y-coordinate of bulge 3 (255), and the nearest-point y-coordinate of bulge 4 (256) is at least 2 mm, 3 mm, 4 mm, or 5 mm greater than the nearest-point y-coordinate of bulge 3 (255). In another embodiment of this example, in the first position the nearest-point y-coordinate of bulge 2 (254) is at least 4 mm, 6 mm, or 8 mm greater than the y-coordinate of bulge 3 (255), and the y-coordinate of bulge 4 (256) is at least 2 mm, 3 mm, 4 mm, or 5 mm greater than the nearest-point y-coordinate of bulge 3 (255). In another embodiment of this example, in the first position the nearest-point y-coordinate of bulge 2 (254) is greater than the nearest-point y-coordinate of bulge 4 (256); and in another embodiment in the first position the nearest-point y-coordinate of bulge 2 (254) is at least 1 mm, 2 mm, or 3 mm greater than the nearest-point y-coordinate of bulge 4 (256); while in still a further embodiment in the first position the nearest-point y-coordinate of bulge 2 (254) is no more than 7 mm, 6 mm, 5 mm, or 4 mm greater than the nearest-point y-coordinate of bulge 4 (256). In one embodiment of this example, in the first position the nearest-point z-coordinate of bulge 2 (254) is greater than the nearest-point z-coordinate of bulge 4 (256); while in further embodiments in the first position the nearest-point z-coordinate of bulge 2 (254) is at least 1 mm, 2 mm, or 3 mm greater than the nearest-point z-coordinate of bulge 4 (256); and in yet another embodiment the first position the nearest-point z-coordinate of bulge 2 (254) is less than the nearest-point z-coordinate of bulge 3 (255).

An eighth nearest-point coordinate example includes bulge 3 (255) and at least two additional distant bulges, namely bulge 1 (253), bulge 5 (257), and/or bulge 6 (258). In one embodiment of this example, in the first position a bulge 1 (253) nearest-point x-coordinate differential is the nearest-point x-coordinate of bulge 1 (253) minus the nearest-point x-coordinate of bulge 3 (255), which in Table 6 is 7.75 minus −2 and thus 9.75, and a bulge 5 (257) nearest-point x-coordinate differential is the nearest-point x-coordinate of bulge 5 (257) minus the nearest-point x-coordinate of bulge 3 (255), which in Table 5 is −14 minus −2 and thus −12. In one embodiment of this example, in the first position the bulge 1 (253) nearest-point x-coordinate differential and/or the bulge 5 (257) nearest-point x-coordinate differential is at least 6 mm, 8 mm, 10 mm, or 12 mm; while in another embodiment of this example, in the first position the bulge 1 (253) nearest-point x-coordinate differential and/or the bulge 5 (257) nearest-point x-coordinate differential is no more than 24 mm, 22 mm, 20 mm, 18 mm, or 16 mm. In the another embodiment of this example, in the first position the nearest-point z-coordinate of bulge 3 (255) is greater than the nearest-point z-coordinate of bulge 1 (253), bulge 5 (257), and/or bulge 6 (258); and at least 1 mm, 2 mm, or 3 mm greater in further embodiments. In another embodiment of this example, in the first position the nearest-point z-coordinate of bulge 1 (253), bulge 5 (257), and/or bulge 6 (258) is within 12 mm, 11 mm, 10 mm, 9 mm, or 8 mm of the nearest-point z-coordinate of bulge 3 (255). In another embodiment of this example, in the first position the nearest-point y-coordinate of bulge 1 (253), bulge 5 (257), and/or bulge 6 (258) is at least 10 mm, 12 mm, 14 mm, or 16 mm greater than the nearest-point y-coordinate of bulge 3 (255). In another embodiment of this example, in the first position the nearest-point y-coordinate of bulge 1 (253), bulge 5 (257), and/or bulge 6 (258) is no more than 34 mm, 32 mm, 30 mm, or 28 mm greater than the nearest-point y-coordinate of bulge 3 (255). In another embodiment of this example, in the first position the nearest-point x-coordinate of bulge 6 (258) is within ±8 mm of the nearest-point x-coordinate of bulge 3 (255), and in further embodiments is within ±7 mm, ±6 mm, ±5 mm, or ±4 mm. In another embodiment of this example, in the first position the nearest-point x-coordinate of bulge 6 (258) is positive and the nearest-point x-coordinate of bulge 3 (255) is negative.

A ninth nearest-point coordinate example includes bulge 3 (255), bulge 2 (254), bulge 4 (256), bulge 1 (253), and bulge 5 (257), and as with all examples and embodiments, any of the disclosed relationships may apply. Similarly, any of the disclosed relationships of this embodiment, or any other embodiments or example, may apply to any of the other examples or embodiments. Just as bulge 1 (253) and bulge 5 (257) have nearest-point x-coordinate differentials, so to do bulge 2 (254) and bulge 4 (256). Thus, in one embodiment of this example, in the first position a bulge 2 (254) nearest-point x-coordinate differential is the nearest-point x-coordinate of bulge 2 (254) minus the nearest-point x-coordinate of bulge 3 (255), which in Table 6 is 8 minus −2 and thus 10, and a bulge 4 (256) nearest-point x-coordinate differential is the nearest-point x-coordinate of bulge 4 (256) minus the nearest-point x-coordinate of bulge 3 (255), which in Table 6 is −11 minus −2 and thus −9. In one embodiment the bulge 2 (254) nearest-point x-coordinate differential is greater than the absolute value of the bulge 4 (256) nearest-point x-coordinate differential. In another embodiment the bulge 2 (254) nearest-point x-coordinate differential is greater than the bulge 1 (253) nearest-point x-coordinate differential, and in further embodiments the bulge 2 (254) nearest-point x-coordinate differential is within 3 mm, 2 mm, or 1 mm of the bulge 1 (253) nearest-point x-coordinate differential. In one embodiment the absolute value of the bulge 4 (256) nearest-point x-coordinate differential is less than the absolute value of the bulge 5 (257) nearest-point x-coordinate differential, and in further embodiments the absolute value of the bulge 4 (256) nearest-point x-coordinate differential is less than the absolute value of the bulge 5 (257) nearest-point x-coordinate differential by at least 1 mm, 2 mm, or 3 mm.

In a tenth nearest-point coordinate example, in the first position the nearest-point z-coordinate of bulge 3 (255) is greater than the nearest-point z-coordinate of all of the other bulges. While in another embodiment the nearest-point z-coordinate of bulge 5 (257) is less than all of the other bulges. In a further embodiment, in the first position the nearest-point y-coordinate of bulge 3 (255) is less than the nearest-point y-coordinate of all other bulges. In a further embodiment, in the first position the absolute value of the x-coordinate of bulge 3 (255) is less than the absolute value of the nearest-point x-coordinate of at least three, four, or five other bulges. In another embodiment, in the first position the nearest-point y-coordinate of at least one of bulge 1 (253), bulge 5 (257), or bulge 6 (258) is positive. In another embodiment, in the first position the nearest-point y-coordinate of at least two of bulge 1 (253), bulge 5 (257), or bulge 6 (258) are positive. In another embodiment, in the first position the nearest-point y-coordinate of bulge 2 (254), bulge 3 (254), and bulge 4 (256) are negative. In another embodiment in the first position the nearest-point vector is labeled NPV, of bulge 3 (255), and thus NPV3, is greater than the NPV of all other bulges. In another embodiment in the first position the nearest-point vector is labeled NPV, of bulge 6 (258), and thus NPV6, is less than the NPV of all other bulges. Again, to be explicit, any of the relationships disclosed in one example or embodiment may be combined with any other relationship disclosed in other examples or embodiments. Further, all the coordinate relationships (both apex-apex and nearest-point), AAV relationships, and NPV relationships disclosed with respect to the first position apply equally to the second position, indicated by the right "active" state columns in Tables 5 and 6, and won't be repeated herein for the sake of brevity.

The location, shape, and configuration of the components all contribute to the disclosed coordinates, differentials, deltas, AAVs, NPVs, and MDVs which play a key role in the effectiveness of the clamp, particularly as it is moved from the first position to the second position. Further, any of the disclosed relationships, including disclosed coordinates differentials, more effectively stimulate acupressure and trigger points than methods without the disclosed relationships, and allow a user to more effectively use one hand to activate the clamp and target the acupressure and triggers points on the other hand, and the relationships are not solely related to the geometry of the hand, and are in fact directed to effectively targeting the acupressure and trigger points, while not merely optimizing, maximizing, or minimizing one characteristic or variable, but carefully considering tradeoffs to most effectively activate multiple points of the hand, which have varying sensitivities, locations, and most-effective angles of attack. This is most easily appreciated by observing the unique variations of AAV delta and NPV delta values of Tables 5 and 6, and the MDV delta values of Table 11. One skilled in the art will appreciate that the effectiveness of the overall device lies in part in the ability of the user to easily use the device while having predetermined relationships tailored to the distinct acupressure and trigger points, all while simply activating the device with a user's free hand, yet obtaining differing levels of compression, application of force, and angles of attack for preferred activation for the different acupressure and trigger points points afforded by the unique design and relationships. The disclosed attributes and relationships are often contrary to conventional design thinking yet have been found to achieve a unique balance of the trade-offs associated with competing criteria such as durability, case of use with a single free hand, engagement with multiple point with a simple compression of the clamp (100). The aforementioned balance requires trade-offs among the competing characteristics recognizing key points of diminishing returns. Additionally, many embodiments have identified unique upper and/or lower limits ranges. For embodiments outside these ranges or relationships, the performance may suffer and adversely impact the goals of the design. Such relationships and discoveries have not even been explored by prior art devices directed to a single point.

Tables 7 and 8 relate the apex coordinates of DAPP bulges 1, 2, 4, 5, and 6 to the apex coordinates of DAPP bulge 3 (255). Table 7 illustrates the deactivated related state, also referred to as the first position and/or position 1, and thus the "p1" at the end of each coordinate reference. For instance, in position 1 the x, y, and z coordinates of bulge 3 are x3p1, y3p1, and z3p1, and so on for the other bulges. Similarly, Table 8 illustrates the activated related state, also referred to as the second position and/or position 2, and thus the "p2" at the end of each coordinate reference. For instance, in position 2 the x, y, and z coordinates of bulge 3 are x3p2, y3p2, and z3p2, and so on for the other bulges. Similarly, Tables 9 and 10 relate the nearest-point coordinates of DAPP bulges 1, 2, 4, 5, and 6 to the nearest-point coordinates of DAPP bulge 3 (255). Table 9 illustrates the deactivated related state, also referred to as the first position and/or position 1, and thus the "p1" at the end of each coordinate reference. For instance, in position 1 the x, y, and z coordinates of bulge 3 are x3p1, y3p1, and z3p1, and so on for the other bulges. Similarly, Table 10 illustrates the activated related state, also referred to as the second position and/or position 2, and thus the "p2" at the end of each coordinate reference. For instance, in position 2 the x, y, and z coordinates of bulge 3 are x3p2, y3p2, and z3p2, and so on for the other bulges,

TABLE 7

| deactivated relaxed state apex coordinates (in mm) of DAPP: | | | | | | |
|---|---|---|---|---|---|---|
| | bulge 1 (253) | bulge 2 (254) | bulge 3 (255) | bulge 4 (256) | bulge 5 (257) | bulge 6 (258) |
| x coord | x1p1 ≥ α1 + x3p1 | x2p1 ≥ α2 + x3p1 | x3p1 | x4p1 ≤ x3p1 − α4 | x5p1 ≤ x3p1 − α5 | x6p1 ≤ x3p1 + α6 |
| y coord | y1p1 ≥ β1 + y3p1 | y2p1 ≥ β2 + y3p1 | y3p1 | y4p1 ≥ β4 + y3p1 | y5p1 ≥ β5 + y3p1 | y6p1 ≥ β6 + y3p1 |
| z coord | z1p1 ≤ γ1 + z3p1 | z2p1 ≤ γ2 + z3p1 | z3p1 | z4p1 ≤ γ4 + z3p1 | z5p1 ≤ γ5 + z3p1 | z6p1 ≤ γ6 + z3p1 |

TABLE 8

| activated relaxed state apex coordinates (in mm) of DAPP: | | | | | | |
|---|---|---|---|---|---|---|
| | bulge 1 (253) | bulge 2 (254) | bulge 3 (255) | bulge 4 (256) | bulge 5 (257) | bulge 6 (258) |
| x coord | x1p2 ≥ α1 + x3p2 | x2p2 ≥ α2 + x3p2 | x3p2 | x4p2 ≤ x3p2 − α4 | x5p2 ≤ x3p2 − α5 | x6p2 ≤ x3p2 + α6 |
| y coord | y1p2 ≥ β1 + y3p2 | y2p2 ≥ β2 + y3p2 | y3p2 | y4p2 ≥ β4 + y3p2 | y5p2 ≥ β5 + y3p2 | y6p2 ≥ β6 + y3p2 |
| z coord | z1p2 ≤ γ1 + z3p2 | z2p2 ≤ γ2 + z3p2 | z3p2 | z4p2 ≤ γ4 + z3p2 | z5p2 ≤ γ5 + z3p2 | z6p2 ≤ γ6 + z3p2 |

In one embodiment α1 is at least 7 mm, and in further embodiments at least 8 mm, 9 mm, 10 mm, 11 mm, 12 mm, 13 mm, 14 mm, or 15 mm. In one embodiment α2 is at least 3 mm, and in further embodiments at least 4 mm, 5 mm, 6 mm, 7 mm, 8 mm, 9 mm, 10 mm, or 11 mm. In one embodiment α4 is at least 4 mm, and in further embodiments at least 5 mm, 6 mm, 7 mm, 8 mm, 9 mm, 10 mm, 11 mm, or 12 mm. In one embodiment α5 is at least 5 mm, and in further embodiments at least 6 mm, 7 mm, 8 mm, 9 mm, 10 mm, 11 mm, 12 mm, or 13 mm. In one embodiment α6 is no more than 8 mm, and in further embodiments no more than 7 mm, 6 mm, 5 mm, 4 mm, 3 mm, 2 mm, 1 mm, or 0 mm.

In another embodiment α1 is no more than 24 mm, and in further embodiments no more than 23 mm, 22 mm, 21 mm, 20 mm, 19 mm, 18 mm, or 17 mm. In one embodiment α2 is no more than 20 mm, and in further embodiments no more than 19 mm, 18 mm, 17 mm, 16 mm, 15 mm, 14 mm, or 13 mm. In one embodiment α4 is no more than 20 mm, and in further embodiments no more than 19 mm, 18 mm, 17 mm, 16 mm, 15 mm, or 14 mm. In one embodiment α5 is no more than 21 mm, and in further embodiments no more than 20 mm, 19 mm, 18 mm, 17 mm, 16 mm, 15 mm, or 14 mm. In one embodiment α6 is at least −8 mm, and in further embodiments at least-7 mm, −6 mm, −5 mm, −4 mm, −3 mm, or −2 mm. In another embodiment α1 is 11-21 mm, and 12-20 mm in another embodiment, and 13-19 mm in a further embodiment. In another embodiment α2 is 6-16 mm, and 8-14 mm in another embodiment, and 9-13 mm in a further embodiment. In another embodiment α4 is 7-17 mm, and 9-15 mm in another embodiment, and 10-14 mm in a further embodiment. In another embodiment α5 is 9-19 mm, and 10-18 mm in another embodiment, and 11-17 mm in a further embodiment. In another embodiment α6 is −4 to 6 mm, and −2 to 4 mm in another embodiment, and −1 to 3 mm in a further embodiment.

In one embodiment β1 is at least 12 mm, and in further embodiments at least 13 mm, 14 mm, 15 mm, 16 mm, 17 mm, 18 mm, 19 mm, 20 mm, 21 mm, or 22 mm. In one embodiment β2 is at least 1 mm, and in further embodiments at least 2 mm, 3 mm, 4 mm, 5 mm, 6 mm, 7 mm, or 8 mm. In one embodiment β4 is at least 1 mm, and in further embodiments at least 2 mm, 3 mm, 4 mm, 5 mm, 6 mm, 7 mm, or 8 mm. In one embodiment β5 is at least 12 mm, and in further embodiments at least 13 mm, 14 mm, 15 mm, 16 mm, 17 mm, 18 mm, 19 mm, 20 mm, 21 mm, or 22 mm. In one embodiment β6 is at least 12 mm, and in further embodiments at least 13 mm, 14 mm, 15 mm, 16 mm, 17 mm, 18 mm, 19 mm, 20 mm, 21 mm, or 22 mm.

In another embodiment β1 is no more than 32 mm, and in further embodiments no more than 31 mm, 30 mm, 29 mm, 28 mm, 27 mm, 26 mm, 25 mm, or 24 mm. In one embodiment β2 is no more than 16 mm, and in further embodiments no more than 15 mm, 14 mm, 13 mm, 12 mm, 11 mm, or 10 mm. In one embodiment β4 is no more than 16 mm, and in further embodiments no more than 15 mm, 14 mm, 13 mm, 12 mm, 11 mm, or 10 mm. In one embodiment β5 is no more than 32 mm, and in further embodiments no more than 31 mm, 30 mm, 29 mm, 28 mm, 27 mm, 26 mm, 25 mm, or 24 mm. In one embodiment β6 is no more than 32 mm, and in further embodiments no more than 31 mm, 30 mm, 29 mm, 28 mm, 27 mm, 26 mm, 25 mm, or 24 mm. In one embodiment β1 is 17-27 mm, and 19-25 mm in another embodiment, and 20-24 mm in a further embodiment. In one embodiment β2 is 3-13 mm, and 5-11 mm in another embodiment, and 6-10 mm in a further embodiment. In one embodiment β4 is 1-11 mm, and 3-9 mm in another embodiment, and 4-8 mm in a further embodiment. In one embodiment β5 is 15-25 mm, and 17-23 mm in another embodiment, and 18-22 mm in a further embodiment. In one embodiment β6 is 15-25 mm, and 17-23 mm in another embodiment, and 18-22 mm in a further embodiment.

In one embodiment γ1 is no more than 4 mm, and in further embodiments no more than 3 mm, 2 mm, 1 mm, 0 mm, −1 mm, −2 mm, −3 mm, or −4 mm. In one embodiment γ2 is no more than 8 mm, and in further embodiments no more than 7 mm, 6 mm, 5 mm, 4 mm, 3 mm, 2 mm, 1 mm, or 0 mm. In one embodiment γ4 is no more than 4 mm, and in further embodiments no more than 3 mm, 2 mm, 1 mm, 0 mm, −1 mm, −2 mm, −3 mm, or −4 mm. In one embodiment γ5 is no more than 2 mm, and in further embodiments no more than 1 mm, 0 mm, −1 mm, −2 mm, −3 mm, −4 mm, −5 mm, or −6 mm. In one embodiment γ6 is no more than 2 mm, and in further embodiments no more than 1 mm, 0 mm, −1 mm, −2 mm, −3 mm, −4 mm, −5 mm, or −6 mm.

In another embodiment γ1 is −10 to 0 mm, and −8 to −2 mm in another embodiment, and −7 to −3 mm in a further embodiment. In another embodiment γ2 is −5 to 5 mm, and −4 to 4 mm in another embodiment, and −2 to 2 mm in a further embodiment. In another embodiment γ4 is −9 to 1 mm, and −7 to −1 mm in another embodiment, and −6 to −2 mm in a further embodiment. In another embodiment γ5 is −12 to −2 mm, and −10 to −4 mm in another embodiment, and −9 to −5 mm in a further embodiment. In another embodiment γ6 is −12 to 0 mm, and −10 to −0.5 mm in another embodiment, and −9 to −1 mm in a further embodiment.

With respect to the apex coordinates of Tables 7 & 8, in one embodiment the x-coordinate x3p2 is within ±2 mm of the x-coordinate x3p1, and in further embodiments ±1.5 mm, ±1.0 mm, ±0.5 mm, or in a final embodiment the x-coordinate x3p2 is equal to the x-coordinate x3p1. In one embodiment the x-coordinate x1p2 is within ±2 mm of the x-coordinate x1p1, and in further embodiments ±1.5 mm, =1.0 mm, ±0.5 mm, or in a final embodiment the x-coordinate x1p2 is equal to the x-coordinate x1p1. In one embodiment the x-coordinate x2p2 is within ±2 mm of the x-coordinate x2p1, and in further embodiments ±1.5 mm, ±1.0 mm, ±0.5 mm, or in a final embodiment the x-coordinate x2p2 is equal to the x-coordinate x2p1. In one embodiment the x-coordinate x4p2 is within ±2 mm of the x-coordinate x4p1, and in further embodiments ±1.5 mm, ±1.0 mm, ±0.5 mm, or in a final embodiment the x-coordinate x4p2 is equal to the x-coordinate x4p1. In one embodiment the x-coordinate x5p2 is within ±2 mm of the x-coordinate x5p1, and in further embodiments ±1.5 mm, ±1.0 mm, ±0.5 mm, or in a final embodiment the x-coordinate x5p2 is equal to the x-coordinate x5p1. In one embodiment the x-coordinate x6p2 is within ±2 mm of the x-coordinate x6p1, and in further embodiments ±1.5 mm, ±1.0 mm, ±0.5 mm, or in a final embodiment the x-coordinate x6p2 is equal to the x-coordinate x6p1.

With respect to the apex coordinates of Tables 7 & 8, in one embodiment the y-coordinate y3p2 is less than, i.e. more negative, the y-coordinate y3p1, while in a further embodiment the y-coordinate y3p2 is at least 0.25 mm less, i.e. more negative, than the y-coordinate y3p1, and in further embodiments at least 0.50 mm less, or 0.75 mm less than the y-coordinate y3p1. A y3p2-y3p1 differential is the absolute value of the difference between the y-coordinate y3p2 and the y-coordinate y3p1. In one embodiment the y-coordinate y1p2 is less than the y-coordinate y1p1, while in a further embodiment the y-coordinate y1p2 is at least 0.25 mm less than the y-coordinate y1p1, and in a further embodiment at least 0.50 mm less than the y-coordinate y1p1. A y1p2-y1p1 differential is the absolute value of the difference between the y-coordinate y1p2 and the y-coordinate y1p1. In one embodiment the y-coordinate y2p2 is less than the y-coordinate y2p1, while in a further embodiment the y-coordinate y2p2 is at least 0.25 mm less than the y-coordinate y2p1, and in further embodiments at least 0.50 mm less, 0.75 mm less, or 1.0 mm less than the y-coordinate y2p1. A y2p2-y2p1 differential is the absolute value of the difference between the y-coordinate y2p2 and the y-coordinate y2p1. In one embodiment the y-coordinate y4p2 is less than the y-coordinate y4p1, while in a further embodiment the y-coordinate y4p2 is at least 0.25 mm less than the y-coordinate y4p1, and in further embodiments at least 0.50 mm less, or 0.75 mm less than the y-coordinate y4p1. A y4p2-y4p1 differential is the absolute value of the difference between the y-coordinate y4p2 and the y-coordinate y4p1. In one embodiment the y-coordinate y5p2 is less than the y-coordinate y5p1, while in a further embodiment the y-coordinate y5p2 is at least 0.25 mm less than the y-coordinate y5p1, and in a further embodiment at least 0.50 mm less than the y-coordinate y5p1. A y5p2-y5p1 differential is the absolute value of the difference between the y-coordinate y5p2 and the y-coordinate y5p1. In one embodiment the y-coordinate y6p2 is less than the y-coordinate y6p1, while in a further embodiment the y-coordinate y6p2 is at least 0.25 mm less than the y-coordinate y6p1, and in a further embodiment at least 0.50 mm less than the y-coordinate y6p1. A y6p2-y6p1 differential is the absolute value of the difference between the y-coordinate y6p2 and the y-coordinate y6p1.

With respect to the apex coordinates of Tables 7 & 8, in one embodiment at least two of the y3p2-y3p1 differential, the y1p2-y1p1 differential, the y2p2-y2p1 differential, the y4p2-y4p1 differential, the y5p2-y5p1 differential, and the y6p2-y6p1 differential, are not equal. In another embodiment at least three of the y3p2-y3p1 differential, the y1p2-y1p1 differential, the y2p2-y2p1 differential, the y4p2-y4p1 differential, the y5p2-y5p1 differential, and the y6p2-y6p1 differential, are not equal. In one embodiment at least two of the y3p2-y3p1 differential, the y1p2-y1p1 differential, the y2p2-y2p1 differential, the y4p2-y4p1 differential, the y5p2-y5p1 differential, and the y6p2-y6p1 differential, are equal. In another embodiment at least three of the y3p2-y3p1 differential, the y1p2-y1p1 differential, the y2p2-y2p1 differential, the y4p2-y4p1 differential, the y5p2-y5p1 differential, and the y6p2-y6p1 differential, are equal. In one embodiment at least two of the y3p2-y3p1 differential, the y1p2-y1p1 differential, the y2p2-y2p1 differential, the y4p2-y4p1 differential, the y5p2-y5p1 differential, and the y6p2-y6p1 differential, are at least 0.5 mm, and at least 0.75 mm in a further embodiment. In another embodiment at least one of the y3p2-y3p1 differential, the y1p2-y1p1 differential, the y2p2-y2p1 differential, the y4p2-y4p1 differential, the y5p2-y5p1 differential, and the y6p2-y6p1 differential, is at least 1.0 mm. In another embodiment none of the y3p2-y3p1 differential, the y1p2-y1p1 differential, the y2p2-y2p1 differential, the y4p2-y4p1 differential, the y5p2-y5p1 differential, and the y6p2-y6p1 differential, are more than 3.0 mm, and in further embodiments 2.5 mm, 2.0 mm, or 1.5 mm. In another embodiment the y2p2-y2p1 differential is greater than the y1p2-y1p1 differential, the y3p2-y3p1 differential, the y4p2-y4p1 differential, the y5p2-y5p1 differential, and/or the y6p2-y6p1 differential. In another embodiment the y2p2-y2p1 differential is at least 50% greater, 75% greater, or 100% greater than at least one of the y1p2-y1p1 differential, the y3p2-y3p1 differential, the y4p2-y4p1 differential, the y5p2-y5p1 differential, or the y6p2-y6p1 differential.

With respect to the apex coordinates of Tables 7 & 8, in one embodiment the z-coordinate z3p1 is Ω mm greater than at least one of the z-coordinates z1p1, z2p1, z4p1, z5p1, and/or z6p1; while in another embodiment the z-coordinate z3p1 is Ω mm greater than at least two, three, four, or five of the z-coordinates z1p1, z2p1, z4p1, z5p1, and/or z6p1. In one embodiment Ω is at least 1 mm, and in further embodiments at least 1.5 mm, 2.0 mm, 2.5 mm, 3.0 mm, 3.5 mm, or 4 mm. In another embodiment the z-coordinate z3p1 is no more than Ψ mm greater than at least one of the z-coordinates z1p1, z2p1, z4p1, z5p1, and/or z6p1; while in another embodiment the z-coordinate z3p1 is no more than Ψ mm greater than at least two, three, four, or five of the z-coordinates z1p1, z2p1, z4p1, z5p1, and/or z6p1. In one embodiment Ψ is 12 mm, and in further embodiments is 11 mm, 10 mm, 9 mm, or 8.0 mm. In another embodiment the z-coordinate z3p1 is within ±2 mm of at least one of the z-coordinates z1p1, z2p1, z4p1, z5p1, and/or z6p1, while the z-coordinate z3p1 is at least 4 mm greater than at least two of the z-coordinates z1p1, z2p1, z4p1, z5p1, and/or z6p1. In a further embodiment the z-coordinate z3p1 is within ±1 mm of at least one of the z-coordinates z1p1, z2p1, z4p1, z5p1, and/or z6p1, while the z-coordinate z3p1 is at least 5 mm greater than at least two of the z-coordinates z1p1, z2p1, z4p1, z5p1, and/or z6p1. Similarly, in one embodiment the z-coordinate z3p2 is Ω mm greater than at least one of the z-coordinates z1p2, z2p2, z4p2, z5p2, and/or z6p2; while in another embodiment the z-coordinate z3p2 is Ω mm greater than at least two, three, four, or five of the z-coordinates z1p2, z2p2, z4p2, z5p2, and/or z6p2. In one embodiment Ω is at least 1 mm, and in further embodiments at least 1.5 mm, 2.0 mm, 2.5 mm, 3.0 mm, 3.5 mm, or 4 mm. In another embodiment the z-coordinate z3p2 is no more than Ψ mm greater than at least one of the z-coordinates z1p2, z2p2, z4p2, z5p2, and/or z6p2; while in another embodiment the z-coordinate z3p2 is no more than Ψ mm greater than at least two, three, four, or five of the z-coordinates z1p2, z2p2, z4p2, z5p2, and/or z6p2. In one embodiment Ψ is 12 mm, and in further embodiments is 11 mm, 10 mm, 9 mm, or 8.0 mm. In another embodiment the z-coordinate z3p2 is within ±2 mm of at least one of the z-coordinates z1p2, z2p2, z4p2, z5p2, and/or z6p2, while the z-coordinate z3p2 is at least 4 mm greater than at least two of the z-coordinates z1p2, z2p2, z4p2, z5p2, and/or z6p2. In a further embodiment the z-coordinate z3p2 is within ±1 mm of at least one of the z-coordinates z1p2, z2p2, z4p2, z5p2, and/or z6p2, while the z-coordinate z3p2 is at least 5 mm greater than at least two of the z-coordinates z1p2, z2p2, z4p2, z5p2, and/or z6p2.

TABLE 9

| | deactivated relaxed state nearest-point coordinates (in mm) of DAPP: | | | | | |
|---|---|---|---|---|---|---|
| | bulge 1 (253) | bulge 2 (254) | bulge 3 (255) | bulge 4 (256) | bulge 5 (257) | bulge 6 (258) |
| x coord | x1p1 ≥ δ1 + x3p1 | x2p1 ≥ δ2 + x3p1 | x3p1 | x4p1 ≤ x3p1 − δ4 | x5p1 ≤ x3p1 − δ5 | x6p1 ≤ x3p1 + δ6 |
| y coord | y1p1 ≥ ε1 + y3p1 | y2p1 ≥ ε2 + y3p1 | y3p1 | y4p1 ≥ ε4 + y3p1 | y5p1 ≥ ε5 + y3p1 | y6p1 ≥ ε6 + y3p1 |
| z coord | z1p1 ≤ ζ1 + z3p1 | z2p1 ≤ ζ2 + z3p1 | z3p1 | z4p1 ≤ ζ4 + z3p1 | z5p1 ≤ ζ5 + z3p1 | z6p1 ≤ ζ6 + z3p1 |

TABLE 10

| | activated relaxed state nearest-point coordinates (in mm) of DAPP: | | | | | |
|---|---|---|---|---|---|---|
| | bulge 1 (253) | bulge 2 (254) | bulge 3 (255) | bulge 4 (256) | bulge 5 (257) | bulge 6 (258) |
| x coord | x1p2 ≥ δ1 + x3p2 | x2p2 ≥ δ2 + x3p2 | x3p2 | x4p2 ≤ x3p2 − δ4 | x5p2 ≤ x3p2 − δ5 | x6p2 ≤ x3p2 + δ6 |
| y coord | y1p2 ≥ ε1 + y3p2 | y2p2 ≥ ε2 + y3p2 | y3p2 | y4p2 ≥ ε4 + y3p2 | y5p2 ≥ ε5 + y3p2 | y6p2 ≥ ε6 + y3p2 |
| z coord | z1p2 ≤ ζ1 + z3p2 | z2p2 ≤ ζ2 + z3p2 | z3p2 | z4p2 ≤ ζ4 + z3p2 | z5p2 ≤ ζ5 + z3p2 | z6p2 ≤ ζ6 + z3p2 |

In one embodiment δ1 is at least 4 mm, and in further embodiments at least 5 mm, 6 mm, 7 mm, or 8 mm. In one embodiment δ2 is at least 4 mm, and in further embodiments at least 5 mm, 6 mm, 7 mm, or 8 mm. In one embodiment δ4 is at least 3 mm, and in further embodiments at least 4 mm, 5 mm, 6 mm, 7 mm, 8 mm, or 9 mm. In one embodiment δ5 is at least 5 mm, and in further embodiments at least 6 mm, 7 mm, 8 mm, 9 mm, 10 mm, or 11 mm. In one embodiment δ6 is no more than 8 mm, and in further embodiments no more than 7 mm, 6 mm, 5 mm, or 4 mm.

In another embodiment δ1 is no more than 16 mm, and in further embodiments no more than 15 mm, 14 mm, 13 mm, 12 mm, or 10 mm. In one embodiment δ2 is no more than 16 mm, and in further embodiments no more than 15 mm, 14 mm, 13 mm, 12 mm, or 10 mm. In one embodiment δ4 is no more than 18 mm, and in further embodiments no more than 17 mm, 16 mm, 15 mm, 14 mm, 13 mm, or 12 mm. In one embodiment δ5 is no more than 21 mm, and in further embodiments no more than 20 mm, 19 mm, 18 mm, 17 mm, 16 mm, 15 mm, or 14 mm. In one embodiment δ1 is 5-15 mm, and 6-14 mm in another embodiment, and 7-13 mm in a further embodiment. In one embodiment δ2 is 5-15 mm, and 6-14 mm in another embodiment, and 7-13 mm in a further embodiment. In one embodiment δ4 is 5-15 mm, and 6-14 mm in another embodiment, and 7-13 mm in a further embodiment. In one embodiment δ5 is 6-18 mm, and 7-17 mm in another embodiment, and 8-16 mm in a further embodiment.

In one embodiment ε1 is at least 8 mm, and in further embodiments at least 9 mm, 10 mm, 11 mm, 12 mm, 13 mm, 14 mm, 15 mm, or 16 mm. In one embodiment ε2 is at least 1 mm, and in further embodiments at least 2 mm, 3 mm, 4 mm, 5 mm, 6 mm, 7 mm, or 8 mm. In one embodiment ε4 is at least 1 mm, and in further embodiments at least 2 mm, 3 mm, 4 mm, 5 mm, or 6 mm. In one embodiment ε5 is at least 7 mm, and in further embodiments at least 8 mm, 9 mm, 10 mm, 11 mm, 12 mm, 13 mm, 14 mm, or 15 mm. In one embodiment ε6 is at least 7 mm, and in further embodiments at least 8 mm, 9 mm, 10 mm, 11 mm, 12 mm, 13 mm, 14 mm, 15 mm, or 16 mm.

In another embodiment ε1 is no more than 28 mm, and in further embodiments no more than 27 mm, 26 mm, 25 mm, 24 mm, 23 mm, 22 mm, 21 mm, or 20 mm. In one embodiment ε2 is no more than 16 mm, and in further embodiments no more than 15 mm, 14 mm, 13 mm, 12 mm, 11 mm, or 10 mm. In one embodiment ε4 is no more than 13 mm, and in further embodiments no more than 12 mm, 11 mm, 10 mm, or 9 mm. In one embodiment ε5 is no more than 28 mm, and in further embodiments no more than 27 mm, 26 mm, 25 mm, 24 mm, 23 mm, 22 mm, 21 mm, or 20 mm. In one embodiment ε6 is no more than 28 mm, and in further embodiments no more than 29 mm, 28 mm, 27 mm, 26 mm, 25 mm, 24 mm, 23 mm, or 22 mm. In one embodiment ε1 is 13-23 mm, and 14-22 mm in another embodiment, and 15-21 mm in a further embodiment. In one embodiment ε2 is 4-14 mm, and 5-13 mm in another embodiment, and 6-12 mm in a further embodiment. In one embodiment ε4 is 1-11 mm, and 2-10 mm in another embodiment, and 3-9 mm in a further embodiment. In one embodiment ε5 is 10-20 mm, and 12-18 mm in another embodiment, and 13-17 mm in a further embodiment. In one embodiment ε6 is 12-22 mm, and 13-21 mm in another embodiment, and 14-20 mm in a further embodiment.

In one embodiment ζ1 is no more than 4 mm, and in further embodiments no more than 3 mm, 2 mm, 1 mm, 0 mm, −1 mm, −2 mm, −3 mm, or −4 mm. In one embodiment ζ2 is no more than 8 mm, and in further embodiments no more than 7 mm, 6 mm, 5 mm, 4 mm, 3 mm, 2 mm, 1 mm, or 0 mm. In one embodiment ζ4 is no more than 4 mm, and in further embodiments no more than 3 mm, 2 mm, 1 mm, 0 mm, −1 mm, −2 mm, −3 mm, or −4 mm. In one embodiment ζ5 is no more than 3 mm, and in further embodiments no more than 2 mm, 1 mm, 0 mm, −1 mm, −2 mm, −3 mm, or −4 mm. In one embodiment ζ6 is no more than 2 mm, and in further embodiments no more than 1 mm, 0 mm, −1 mm, −2 mm, −3 mm, or −4 mm.

In another embodiment ζ1 is −2 to 8 mm, and −1 to 7 mm in another embodiment, and 0 to 6 mm in a further embodiment. In another embodiment ζ2 is −5 to 5 mm, and −4 to 4 mm in another embodiment, and −3 to 3 mm in a further embodiment. In another embodiment ζ4 is −9 to 1 mm, and −7 to −1 mm in another embodiment, and −6 to −2 mm in a further embodiment. In another embodiment ζ5 is −9 to 1 mm, and −8 to 0 mm in another embodiment, and −7 to −1 mm in a further embodiment. In another embodiment ζ6 is −6 to 4 mm, and −5 to 3 mm in another embodiment, and −4 to 2 mm in a further embodiment.

With respect to the apex coordinates of Tables 9 & 10, in one embodiment the x-coordinate x3p2 is within ±4 mm of the x-coordinate x3p1, and in further embodiments ±3.5 mm, ±3.0 mm, ±2.5 mm, or ±2.0 mm. In one embodiment the x-coordinate x1p2 is within ±4 mm of the x-coordinate x1p1, and in further embodiments ±3.5 mm, ±3.0 mm, ±2.5 mm, or ±2.0 mm. In one embodiment the x-coordinate x2p2 is within ±2 mm of the x-coordinate x2p1, and in further embodiments ±1.5 mm, ±1.0 mm, ±0.5 mm, or in a final embodiment the x-coordinate x2p2 is equal to the x-coordinate x2p1. In one embodiment the x-coordinate x4p2 is within ±2 mm of the x-coordinate x4p1, and in further embodiments ±1.5 mm, ±1.0 mm, ±0.5 mm, or in a final embodiment the x-coordinate x4p2 is equal to the x-coordinate x4p1. In one embodiment the x-coordinate x5p2 is within ±2 mm of the x-coordinate x5p1, and in further embodiments ±1.5 mm, ±1.0 mm, ±0.5 mm, or in a final embodiment the x-coordinate x5p2 is equal to the x-coordinate x5p1. In one embodiment the x-coordinate x6p2 is within ±4 mm of the x-coordinate x6p1, and in further embodiments ±3.5 mm, ±3.0 mm, ±2.5 mm, or ±2.0 mm.

With respect to the apex coordinates of Tables 9 & 10, in one embodiment the y-coordinate y3p2 is greater than, i.e. more positive, the y-coordinate y3p1, while in a further embodiment the y-coordinate y3p2 is at least 0.25 mm greater, i.e. more positive, than the y-coordinate y3p1, and in further embodiments at least 0.50 mm greater, or 0.75 mm greater than the y-coordinate y3p1. A y3p2-y3p1 differential is the absolute value of the difference between the y-coordinate y3p2 and the y-coordinate y3p1. In one embodiment the y-coordinate y1p2 is less than the y-coordinate y1p1, while in a further embodiment the y-coordinate y1p2 is at least 0.25 mm less than the y-coordinate y1p1, and in a further embodiment at least 0.50 mm less than the y-coordinate y1p1. A y1p2-y1p1 differential is the absolute value of the difference between the y-coordinate y1p2 and the y-coordinate y1p1. In one embodiment the y-coordinate y2p2 is less than the y-coordinate y2p1, while in a further embodiment the y-coordinate y2p2 is at least 0.25 mm less than the y-coordinate y2p1, and in further embodiments at least 0.50 mm less, 0.75 mm less, or 1.0 mm less than the y-coordinate y2p1. A y2p2-y2p1 differential is the absolute value of the difference between the y-coordinate y2p2 and the y-coordinate y2p1. In one embodiment the y-coordinate y4p2 is less than the y-coordinate y4p1, while in a further embodiment the y-coordinate y4p2 is at least 0.25 mm less than the y-coordinate y4p1, and in further embodiments at least 0.50 mm less, or 0.75 mm less than the y-coordinate y4p1. A y4p2-y4p1 differential is the absolute value of the difference between the y-coordinate y4p2 and the y-coordinate y4p1. In one embodiment the y-coordinate y5p2 is greater than the y-coordinate y5p1, while in a further embodiment the y-coordinate y5p2 is at least 0.25 mm greater than the y-coordinate y5p1, and in a further embodiment at least 0.50 mm greater than the y-coordinate y5p1. A y5p2-y5p1 differential is the absolute value of the difference between the y-coordinate y5p2 and the y-coordinate y5p1. In one embodiment the y-coordinate y6p2 is less than the y-coordinate y6p1, while in a further embodiment the y-coordinate y6p2 is at least 0.25 mm less than the y-coordinate y6p1, and in a further embodiment at least 0.50 mm less than the y-coordinate y6p1. A y6p2-y6p1 differential is the absolute value of the difference between the y-coordinate y6p2 and the y-coordinate y6p1.

With respect to the apex coordinates of Tables 9 & 10, in one embodiment at least two of the y3p2-y3p1 differential, the y1p2-y1p1 differential, the y2p2-y2p1 differential, the y4p2-y4p1 differential, the y5p2-y5p1 differential, and the y6p2-y6p1 differential, are not equal. In another embodiment at least three of the y3p2-y3p1 differential, the y1p2-y1p1 differential, the y2p2-y2p1 differential, the y4p2-y4p1 differential, the y5p2-y5p1 differential, and the y6p2-y6p1 differential, are not equal. In one embodiment at least two of the y3p2-y3p1 differential, the y1p2-y1p1 differential, the y2p2-y2p1 differential, the y4p2-y4p1 differential, the y5p2-y5p1 differential, and the y6p2-y6p1 differential, are equal. In another embodiment at least three of the y3p2-y3p1 differential, the y1p2-y1p1 differential, the y2p2-y2p1 differential, the y4p2-y4p1 differential, the y5p2-y5p1 differential, and the y6p2-y6p1 differential, are equal. In one embodiment at least two of the y3p2-y3p1 differential, the y1p2-y1p1 differential, the y2p2-y2p1 differential, the y4p2-y4p1 differential, the y5p2-y5p1 differential, and the y6p2-y6p1 differential, are at least 0.5 mm, and at least 0.75 mm in a further embodiment. In another embodiment at least one of the y3p2-y3p1 differential, the y1p2-y1p1 differential, the y2p2-y2p1 differential, the y4p2-y4p1 differential, the y5p2-y5p1 differential, and the y6p2-y6p1 differential, is at least 1.0 mm. In another embodiment none of the y3p2-y3p1 differential, the y1p2-y1p1 differential, the y2p2-y2p1 differential, the y4p2-y4p1 differential, the y5p2-y5p1 differential, and the y6p2-y6p1 differential, are more than 3.0 mm, and in further embodiments 2.5 mm, 2.0 mm, or 1.5 mm. In another embodiment the y2p2-y2p1 differential is greater than the y1p2-y1p1 differential, the y3p2-y3p1 differential, the y4p2-y4p1 differential, the y5p2-y5p1 differential, and/or the y6p2-y6p1 differential. In another embodiment the y2p2-y2p1 differential is at least 50% greater, 75% greater, or 100% greater than at least one of the y1p2-y1p1 differential, the y3p2-y3p1 differential, the y4p2-y4p1 differential, the y5p2-y5p1 differential, or the y6p2-y6p1 differential.

With respect to the apex coordinates of Tables 7 & 8, in one embodiment the z-coordinate z3p1 is Ω mm greater than at least one of the z-coordinates z1p1, z2p1, z4p1, z5p1, and/or z6p1; while in another embodiment the z-coordinate z3p1 is Ω mm greater than at least two, three, four, or five of the z-coordinates z1p1, z2p1, z4p1, z5p1, and/or z6p1. In one embodiment Ω is at least 1 mm, and in further embodiments at least 1.5 mm, 2.0 mm, 2.5 mm, 3.0 mm, 3.5 mm, or 4 mm. In another embodiment the z-coordinate z3p1 is no more than Ψ mm greater than at least one of the z-coordinates z1p1, z2p1, z4p1, z5p1, and/or z6p1; while in another embodiment the z-coordinate z3p1 is no more than Ψ mm greater than at least two, three, four, or five of the z-coordinates z1p1, z2p1, z4p1, z5p1, and/or z6p1. In one embodiment Ψ is 12 mm, and in further embodiments is 11 mm, 10 mm, 9 mm, or 8.0 mm. In another embodiment the z-coordinate z3p1 is within ±2 mm of at least one of the z-coordinates z1p1, z2p1, z4p1, z5p1, and/or z6p1, while the z-coordinate z3p1 is at least 4 mm greater than at least one of the z-coordinates z1p1, z2p1, z4p1, z5p1, and/or z6p1. In a further embodiment the z-coordinate z3p1 is within ±1 mm of at least one of the z-coordinates z1p1, z2p1, z4p1, z5p1, and/or z6p1, while the z-coordinate z3p1 is at least 3 mm greater than at least two of the z-coordinates z1p1, z2p1, z4p1, z5p1, and/or z6p1. Similarly, in one embodiment the z-coordinate z3p2 is Ω mm greater than at least one of the z-coordinates z1p2, z2p2, z4p2, z5p2, and/or z6p2; while in another embodiment the z-coordinate z3p2 is Ω mm greater than at least two, three, four, or five of the z-coordinates z1p2, z2p2, z4p2, z5p2, and/or z6p2. In one embodiment Ω is at least 1 mm, and in further embodiments at least 1.5 mm, 2.0 mm, 2.5 mm, 3.0 mm, 3.5 mm, or 4 mm. In another embodiment the z-coordinate z3p2 is no more than Ψ mm greater than at least one of the z-coordinates z1p2, z2p2, z4p2, z5p2, and/or z6p2; while in another embodiment the z-coordinate z3p2 is no more than Ψ mm greater than at least two, three, four, or five of the z-coordinates z1p2, z2p2, z4p2, z5p2, and/or z6p2. In one embodiment Ψ is 12 mm, and in further embodiments is 11 mm, 10 mm, 9 mm, or 8.0 mm. In another embodiment the z-coordinate z3p2 is within ±2 mm of at least one of the z-coordinates z1p2, z2p2, z4p2, z5p2, and/or z6p2, while the z-coordinate z3p2 is at least 3 mm greater than at least two of the z-coordinates z1p2, z2p2, z4p2, z5p2, and/or z6p2. In a further embodiment the z-coordinate z3p2 is within ±1 mm of at least one of the z-coordinates z1p2, z2p2, z4p2, z5p2, and/or z6p2, while the z-coordinate z3p2 is at least 3 mm greater than at least two of the z-coordinates z1p2, z2p2, z4p2, z5p2, and/or z6p2.

In one embodiment y1p1 is greater than y5p1 and/or y6p1, while in further embodiments y1p1 is at least 0.25 mm, 0.5 mm, 0.75 mm, 1 mm, or 1.25 mm greater than y5p1 and/or y6p1. A further embodiment caps the relationships wherein y1p1 is no more than 6 mm greater than y5p1 and/or y6p1, while in further embodiments y1p1 is no more than 5.5 mm greater, 5 mm greater, 4.5 mm greater, 4 mm greater, 3.5 mm greater, 3 mm greater, 2.5 mm greater, or 2 mm greater than y5p1 and/or y6p1. In another embodiment y2p1 is greater than y4p1, while in further embodiments y2p1 is at least 1 mm, 2 mm, or 3 mm greater than y4p1. A further embodiment caps the relationships wherein y2p1 is no more than 9 mm greater than y4p1, while in further embodiments y2p1 is no more than 8 mm, 7 mm, 6 mm, 5 mm, or 4 mm greater than y4p1. In still a further embodiment y5p1 is greater than y6p1, while in another embodiment y5p1 is no more than 6 mm, 5 mm, 4 mm, 3 mm, 2 mm, or 1 mm greater than y6p1. In one embodiment z2p1 is greater than z1p1 and/or z4p1. In another embodiment z5p1 is greater than z6p1, while in another embodiment z5p1 is no more than 6 mm, 5 mm, 4 mm, 3 mm, 2 mm, or 1 mm greater than z6p1. In another embodiment z4p1 is greater than z1p1, while in another embodiment z4p1 is no more than 6 mm, 5 mm, 4 mm, 3 mm, 2 mm, or 1 mm greater than z1p1. In another embodiment z3p1 is greater than z1p1, z2p1, z4p1, z5p1, and/or z6p1.

As already disclosed in detail, the coordinates may be provided for the point on each of the DAPP bulges that is nearest to the origin and may therefore not correspond to the coordinates of the apex of the DAPP bulge; these are referred to as nearest-point coordinates, illustrated by a nearest-point vector, labeled NPV, in FIGS. 32-43, while an apex-apex vector is labeled AAV. While the NPV and AAV measurements are from the origin, which is the apex of palmer arm pressure bulge (320), a minimum distance vector, or MDV, is not dependent on the apex of the palmer arm pressure bulge (320), but rather is a vector that is the shortest distance between any point on the apex of palmer arm pressure bulge (320) and any point on the respective DAPP bulges 1-6 (253-258) being analyzed. MDV3 is the minimum distance vector for DAPP bulge 3 (255), while MDV1 is the minimum distance vector for DAPP bulge 1 (253), MDV2 is the minimum distance vector for DAPP bulge 2 (254), MDV4 is the minimum distance vector for DAPP bulge 4 (256), MDV5 is the minimum distance vector for DAPP bulge 5 (257), and MDV6 is the minimum distance vector for DAPP bulge 6 (258). Table 11 illustrates the MDV values and MDV delta's for one embodiment.

TABLE 11

| | minimum distance vector | | | | | | | | | | | |
|---|---|---|---|---|---|---|---|---|---|---|---|---|
| | bulge 1 (253) | | bulge 2 (254) | | bulge 3 (255) | | bulge 4 (256) | | bulge 5 (257) | | bulge 6 (258) | |
| State | deact | activ | deact | activ | deact | activ | deact | activ | deact | activ | deact | activ |
| MDV | 13.50 | 9 | 17.7 | 16.4 | 20 | 18 | 17.7 | 16.8 | 16 | 15 | 16.3 | 9 |
| MDV delta | 4.5 | | 1.3 | | 2 | | 0.9 | | 1 | | 7.3 | |

Just as with the previously disclosed apex coordinate examples and embodiments, and the nearest-point coordinate examples and embodiments, the MDVs may be used to establish a first position and a second position, as well as relative bulge relationships in the two positions. As before, this disclosure will utilize bulge 3 (255) as the reference bulge, however, one skilled in the art will appreciate that any of the disclosed bulges, and the disclosed MDVs, may serve as the reference bulge for relationships with any one, or more, of the other bulges.

Thus, in a first minimum distance example a first position is the deactivated relaxed state is defined by setting the MDV of DAPP bulge 3 (255) to 20, as seen in Table 11 above in the left side of the bulge 3 (255) column representing the deactivated relaxed state. Likewise, in a second position the activated state is defined by setting the MDV of DAPP bulge 3 (255) to 18, as seen in Table 11 above in the right side of the bulge 3 (255) column representing the activated state. Then, with these 2 positions of DAPP bulge 3 (255) fixed, the placement and movement of any one or more of the other DAPP bulges may also be established. Further, any of the coordinates of the apex coordinate disclosure and/or the nearest-point coordinate disclosure may be combined with any of the disclosure relating to the minimum distance vectors.

For example, in a second minimum distance example, in the first position, namely the deactivated relaxed state, the MDV of DAPP bulge 3 (255), MDV3 is greater than at least one, two, three, four, or all five of MDV1, MDV2, MDV4, MDV5, and MDV6. Further, in a third minimum distance example the bulge 1 (253) has a first position MDV1 P1 of 13.5, and a second position MDV1 P2 of 9, and therefore the MDV delta for bulge 1 (253) is MDV1 P1-P2 delta, seen in the last row of Table 11, and is 4.5; and likewise bulge 2 (254) has a first position MDV2 P1 of 17.7, and a second position MDV2 P2 of 16.4, and therefore the MDV delta for bulge 2 (254) is MDV2 P1-P2 delta, and is 1.3; and likewise bulge 4 (256) has a first position MDV4 P1 of 17.7, and a second position MDV4 P2 of 16.8, and therefore the MDV delta for bulge 4 (256) is MDV4 P1-P2 delta, and is 0.9; and likewise bulge 5 (257) has a first position MDV5 P1 of 16, and a second position MDV5 P2 of 15, and therefore the MDV delta for bulge 5 (257) is MDV5 P1-P2 delta, and is 1; and likewise bulge 6 (258) has a first position MDV6 P1 of 16.3, and a second position MDV6 P2 of 9, and therefore the MDV delta for bulge 6 (258) is MDV6 P1-P2 delta, and is 7.3.

Further, in a third minimum distance example at least one bulge has an MDV P1-P2 delta that is at least 2 times a MDV P1-P2 delta of at least one other bulge, and in further embodiments at least 3 times, 4 times, 5 times, or 6 times. In a fourth minimum distance example one bulge establishes a maximum MDV P1-P2 delta, and another bulge establishes a minimum MDV P1-P2 delta, and the maximum MDV P1-P2 delta is no more than 15 times the minimum MDV P1-P2 delta, and in further embodiments no more than 13 times, 11 times, or 9 times.

A fifth minimum distance example includes bulge 3 (255) and at least two additional bulges in close proximity to bulge 3 (255), namely bulge 2 (254) and bulge 4 (256), either of which may be referred to as a close proximity bulge. In one embodiment close proximity means that in the first position a straight line distance between (a) the point at which MDV3 touches bulge 3 (255), referred to as the MDV3 contact point, and (b) the point at which MDV2 touches bulge 2 (254), referred to as the MDV2 contact point, is no more than 25 mm, and no more than 23 mm, 21 mm, 19 mm, 17 mm, 15 mm, 13.5 mm, and 12 mm in further embodiments; and a straight line distance between (a) the MDV3 contact point, and (b) the point at which MDV4 touches bulge 4 (256), referred to as the MDV4 contact point, is no more than 25 mm, and no more than 23 mm, 21 mm, 19 mm, 17 mm, 15 mm, 13.5 mm, and 12 mm in further embodiments. The aforementioned straight line distances are referred to as a straight-line reference-close distance, which as described above is a straight line distance from the reference bulge first position contact point to the close proximity bulge first position contact point.

In one embodiment of this example, in the first position with the clamp (100) positioned as shown in FIGS. 29-31 the x-coordinate of the MDV3 contact point is negative. In another embodiment the x-coordinate of the MDV3 contact point is no more than 15 mm, and in further embodiments no more than 14 mm, 13 mm, 12 mm, 11 mm, or 10 mm. Stated another way, a distance from the direction-of-motion plane to the MDV3 contact point is no more than 15 mm, and in further embodiments no more than 14 mm, 13 mm, 12 mm, 11 mm, or 10 mm. In another embodiment the x-coordinate of the MDV4 contact point is no more than −8 mm, and in further embodiments no more than −9 mm, −10 mm, −11 mm, or −12 mm. In another embodiment of this example, in the first position the y-coordinate of the MDV2 contact point is at least 4 mm, 6 mm, or 8 mm greater than the y-coordinate of the MDV3 contact point, and the y-coordinate of the MDV4 contact point is at least 2 mm, 3 mm, 4 mm, or 5 mm greater than the y-coordinate of MDV3 contact point. In another embodiment of this example, in the first position the y-coordinate of the MDV2 contact point is greater than the y-coordinate of MDV4 contact point; and in another embodiment in the first position the y-coordinate of MDV2 contact point is at least 1 mm, 2 mm, or 3 mm greater than the y-coordinate of MDV4 contact point; while in still a further embodiment in the first position the y-coordinate of the MDV2 contact point is no more than 7 mm, 6 mm, 5 mm, or 4 mm greater than the y-coordinate of MDV4 contact point. In one embodiment of this example, in the first position the z-coordinate of the MDV2 contact point is greater than the z-coordinate of the MDV4 contact point; while in further embodiments in the first position the z-coordinate of MDV2 contact point is at least 1 mm, 2 mm, or 3 mm greater than the z-coordinate of the MDV4 contact point; and in yet another embodiment the first position the z-coordinate of the MDV2 contact point is less than the z-coordinate of MDV3 contact point. In one embodiment the MDV2 contact point and the MDV4 contact point are located on opposite sides of the direction-of-motion plane. In another embodiment a distance from the direction-of-motion plane to the MDV2 contact point is no more than 15 mm, and in further embodiments no more than 14 mm, 13 mm, 12 mm, 11 mm, or 10 mm. In another embodiment a distance from the direction-of-motion plane to the MDV4 contact point is no more than 15 mm, and in further embodiments no more than 14 mm, 13 mm, 12 mm, 11 mm, or 10 mm. In another embodiment a distance from the direction-of-motion plane to the MDV2 contact point is at least 3 mm, and in further embodiments at least 4 mm, 5 mm, 6 mm, or 7 mm. In another embodiment a distance from the direction-of-motion plane to the MDV4 contact point is at least 7 mm, and in further embodiments at least 8 mm, 9 mm, or 10 mm. In another embodiment a distance from the direction-of-motion plane to the MDV4 contact point is greater than a distance from the direction-of-motion plane to the MDV2 contact point.

A sixth minimum distance example includes bulge 3 (255) and at least two additional distant bulges, namely bulge 1 (253), bulge 5 (257), and/or bulge 6 (258), any of which may be referred to as a distant bulge. In one embodiment of this example, in the first position a bulge 1 (253) minimum distance x-coordinate differential is the x-coordinate of the MDV1 contact point minus the x-coordinate of the MDV3 contact point, and a bulge 5 (257) minimum distance x-coordinate differential is the x-coordinate of the MDV5 contact point minus the x-coordinate of the MDV3 contact point. In one embodiment of this example, in the first position the bulge 1 (253) minimum distance x-coordinate differential and/or the bulge 5 (257) minimum distance x-coordinate differential is at least 6 mm, 8 mm, 10 mm, or 12 mm; while in another embodiment of this example, in the first position the bulge 1 (253) minimum distance x-coordinate differential and/or the bulge 5 (257) minimum distance x-coordinate differential is no more than 24 mm, 22 mm, 20 mm, 18 mm, or 16 mm. In another embodiment of this example, in the first position the z-coordinate of the MDV3 contact point is greater than the z-coordinate of the MDV1 contact point, the MDV5 contact point, and/or MDV6 contact point; and at least 1 mm, 2 mm, or 3 mm greater in further embodiments. In another embodiment of this example, in the first position the z-coordinate of the MDV1 contact point, MDV5 contact point, and/or the MDV6 contact point is within 12 mm, 11 mm, 10 mm, 9 mm, or 8 mm of the z-coordinate of the MMDV3 contact point. In another embodiment of this example, in the first position the y-coordinate of MDV1 contact point, the MDV5 contact point, and/or the MDV6 contact point is at least 10 mm, 12 mm, 14 mm, or 16 mm greater than the y-coordinate of MDV3 contact point. In another embodiment of this example, in the first position the y-coordinate of MDV1 contact point, MDV5 contact point, and/or the MDV6 contact point is no more than 34 mm, 32 mm, 30 mm, or 28 mm greater than the y-coordinate of the MDV3 contact point. In another embodiment of this example, in the first position the x-coordinate of the MDV6 contact point is within ±8 mm of the x-coordinate of the MDV3 contact point, and in further embodiments is within ±7 mm, ±6 mm, ±5 mm, or ±4 mm. In another embodiment of this example, in the first position the x-coordinate of MDV6 contact point is negative and the x-coordinate of MDV3 contact point is negative, and thus they are located on the same side of the direction-of-motion plane.

Just like the close proximity bulges have straight-line reference-close distances, so too do the distant bulge(s). In one embodiment distant proximity means that in the first position a straight line distance between (a) the point at which MDV3 touches bulge 3 (255), referred to as the MDV3 contact point, and (b) the point at which MDV1 touches bulge 1 (253), referred to as the MDV1 contact point, is at least 16 mm, and at least 17 mm, 18 mm, 19 mm, and 20 mm in further embodiments; and a straight line distance between (a) the MDV3 contact point, and (b) the point at which MDV5 touches bulge 5 (257), referred to as the MDV5 contact point, is at least 16 mm, and at least 17 mm, 18 mm, 19 mm, and 20 mm in further embodiments; and a straight line distance between (a) the MDV3 contact point, and (b) the point at which MDV6 touches bulge 6 (258), referred to as the MDV6 contact point, is at least 16 mm, and at least 17 mm, 18 mm, 19 mm, and 20 mm in further embodiments. The aforementioned straight line distances are referred to as a straight-line reference-distant distance, which as described above is a straight line distance from the reference bulge first position contact point to the distant bulge first position contact point. In one embodiment the straight-line reference-distant distance of bulge 6 (258) is less than the straight-line reference-distant distance of bulge 1 (253) and/or bulge 5 (257), and in further embodiments at least 1 mm less, 2 mm less, or 3 mm less.

In one embodiment the MDV1 contact point and the MDV5 contact point are located on opposite sides of the direction-of-motion plane. In another embodiment a distance from the direction-of-motion plane to the MDV1 contact point is no more than 15 mm, and in further embodiments no more than 14 mm, 13 mm, 12 mm, 11 mm, or 10 mm. In another embodiment a distance from the direction-of-motion plane to the MDV5 contact point is no more than 20 mm, and in further embodiments no more than 19 mm, 18 mm, 17 mm, 16 mm, or 15 mm. In another embodiment a distance from the direction-of-motion plane to the MDV5 contact point is greater than a distance from the direction-of-motion plane to the MDV1 contact point. In another embodiment a distance from the direction-of-motion plane to the MDV1 contact point is at least 4 mm, and in further embodiments at least 5 mm, 6 mm, or 7 mm. In another embodiment a distance from the direction-of-motion plane to the MDV5 contact point is at least 9 mm, and in further embodiments at least 10 mm, 11 mm, 12 mm, or 13 mm. In another embodiment a distance from the direction-of-motion plane to the MDV5 contact point is greater than a distance from the direction-of-motion plane to the MDV1 contact point, and in further embodiments at least 1 mm greater, 2 mm greater, 3 mm greater, 4 mm greater, 5 mm greater, or 6 mm greater. A seventh minimum distance example includes bulge 3 (255), bulge 2 (254), bulge 4 (256), bulge 1 (253), and bulge 5 (257), and as with all examples and embodiments, any of the disclosed relationships may apply. Similarly, any of the disclosed relationships of this embodiment, or any other embodiments or example, may apply to any of the other examples or embodiments. Just as bulge 1 (253) and bulge 5 (257) have minimum distance x-coordinate differentials, so too do bulge 2 (254) and bulge 4 (256). Thus, in one embodiment of this example, in the first position a bulge 2 (254) minimum distance x-coordinate differential is the x-coordinate of the MDV2 contact point minus the x-coordinate of MDV3 contact point, and a bulge 4 (256) minimum distance x-coordinate differential is the x-coordinate of MDV4 contact point minus the x-coordinate of the MDV3 contact point. In one embodiment the bulge 2 (254) minimum distance x-coordinate differential is greater than the absolute value of the bulge 4 (256) minimum distance x-coordinate differential. In another embodiment the bulge 2 (254) minimum distance x-coordinate differential is greater than the bulge 1 (253) minimum distance x-coordinate differential, and in further embodiments the bulge 2 (254) minimum distance x-coordinate differential is within 3 mm, 2 mm, or 1 mm of the bulge 1 (253) minimum distance x-coordinate differential. In one embodiment the absolute value of the bulge 4 (256) minimum distance x-coordinate differential is less than the absolute value of the bulge 5 (257) minimum distance x-coordinate differential, and in further embodiments the absolute value of the bulge 4 (256) minimum distance x-coordinate differential is less than the absolute value of the bulge 5 (257) minimum distance x-coordinate differential by at least 1 mm, 2 mm, or 3 mm.

In an eighth minimum distance example, in the first position the z-coordinate of MDV3 contact point is greater than the z-coordinate of the MDV contact points of all of the other bulges. While in another embodiment the z-coordinate of the MDV5 contact point is less than the MDV contact points of all of the other bulges. In a further embodiment, in the first position the y-coordinate of MDV3 contact point is less than the y-coordinate of all other MDV contact points. In a further embodiment, in the first position the absolute value of the x-coordinate of the MDV3 contact point is less than the absolute value of the x-coordinate of the MDV contact points of at least three, four, or five other bulges. In another embodiment, in the first position the y-coordinate of at least one of the MDV1 contact point, the MDV5 contact point, or the MDV6 contact point is positive. In another embodiment, in the first position the y-coordinate of at least two of the MDV1 contact point, the MDV5 contact point, or the MDV6 contact point is positive. In another embodiment, in the first position the y-coordinate of the MDV2 contact point, the MDV3 contact point, and the MDV4 contact point are negative. In another embodiment in the first position the MDV3 length is greater than the MDV of all other bulges. In another embodiment in the first position the MDV6 length is less than the MDV of all other bulges. Again, to be explicit, any of the relationships disclosed in one example or embodiment may be combined with any other relationship disclosed in other examples or embodiments. Further, all the coordinate relationships (apex-apex, nearest-point, and minimum distance), AAV relationships, NPV relationships, and MDV relationships disclosed with respect to the first position apply equally to the second position, indicated by the right "active" state columns in Table 11, and won't be repeated herein for the sake of brevity.

In another example the hand clamp (100) has a dorsal arm (200) having a dorsal arm pressure plate (230) with a reference bulge, which may be any of the DAPP bulges 1-6 (253-258), at least one close proximity bulge selected from DAPP bulge 2 (254) or DAPP bulge 4 (256), and at least one distant bulge selected from DAPP bulge selected from DAPP bulge 1 (253), DAPP bulge 5 (257), or DAPP, bulge 6 (258). The hand clamp (100) also has a palmer arm (300) having a palmer arm pressure bulge (320). A biasing mechanism (500) engages the dorsal arm (200) and the palmer arm (300) and adjustable to create relative movement of the dorsal arm (200) and the palmer arm (300) thereby changing the distance between the palmer arm pressure bulge (320) and the reference bulge. A first position is defined by a minimum reference bulge first distance of 20 mm measured between the palmer arm pressure bulge (320) and the reference bulge, a second position is defined by a minimum reference bulge second distance of 18 mm between the palmer arm pressure bulge (320) and the reference bulge, and a reference bulge minimum distance delta is the difference between the minimum reference bulge first distance and the minimum reference bulge second distance. The minimum reference bulge first distance and the minimum reference bulge second distance, and any disclosed "minimum—distance" refers to the previously disclosed minimum distance vectors, or MDV, and are not dependent on the apex of the palmer arm pressure bulge (320). A minimum close proximity bulge first distance is measured between the close proximity bulge and the palmer arm pressure bulge (320) in the first position, a minimum close proximity bulge second distance is measured between the close proximity bulge and the palmer arm pressure bulge (320) in the second position, and a close proximity bulge minimum distance delta is a difference between the minimum close proximity bulge first distance and the minimum close proximity bulge second distance. Again, the minimum close proximity bulge first distance and the minimum close proximity bulge second distance, and any disclosed "minimum—distance" refers to the previously disclosed minimum distance vectors, or MDV, and are not dependent on the apex of the palmer arm pressure bulge (320). A minimum distant bulge first distance is measured between the distant bulge and the palmer arm pressure bulge (320) in the first position, a minimum distant bulge second distance is measured between the distant bulge and the palmer arm pressure bulge (320) in the second position, and a distant bulge minimum distance delta is a difference between the minimum distant bulge first distance and the minimum distant bulge second distance. Once again, the minimum distant bulge first distance and the minimum distant bulge second distance, and any disclosed "minimum—distance" refers to the previously disclosed minimum distance vectors, or MDV, and are not dependent on the apex of the palmer arm pressure bulge (320). For example, in one embodiment the reference bulge is bulge 3 (255), and thus the reference bulge minimum distance delta is the previously disclosed MDV delta such as any of those disclosed, and all of the associated disclosed relationships, which in the embodiment of Table 11 is 2 mm. Similarly, the close proximity bulge minimum distance delta is the previously disclosed MDV delta such as any of those disclosed, and all of the associated disclosed relationships, with respect to bulge 2 (254) or bulge 4 (256), which in the embodiment of Table 11 is 1.3 mm or 0.9 mm. Likewise, the distant bulge minimum distance delta is the previously disclosed MDV delta such as any of those disclosed, and all of the associated disclosed relationships, with respect to bulge 1 (253), bulge 5 (257), or bulge 6 (258), which in the embodiment of Table 11 is 4.5 mm, 1.0 mm, or 7.3 mm. Further, in one embodiment the close proximity bulge minimum distance delta is less than the reference bulge minimum distance delta, and the distant bulge minimum distance delta is greater than the reference bulge minimum distance delta, however again any of the disclosed MDV delta relationships may also apply in further embodiments. In one embodiment the distant bulge minimum distance delta is at least two times the reference bulge minimum distance delta, and the distant bulge minimum distance delta is at least three times the close proximity bulge minimum distance delta. For example, in the embodiment of Table 11 both MDV1 and MDV6 are at least two times MDV3, and both MDV1 and MDV6 are at least three times MDV2 and MDV4. However, again any of the disclosed MDV delta relationships may also apply in further embodiments. In another embodiment the distant bulge minimum distance delta is no more than fifteen times the reference bulge minimum distance delta, and the distant bulge minimum distance delta is no more than ten times the close proximity bulge minimum distance delta; while in further embodiments the distant bulge minimum distance delta is no more than twelve, ten, eight, or six times the reference bulge minimum distance delta, and the distant bulge minimum distance delta is no more than nine, eight, seven, six, or five times the close proximity bulge minimum distance delta.

In another embodiment the biasing mechanism has a longitudinal axis and a direction-of-motion plane contains the longitudinal axis and an apex of the palmer arm pressure bulge (320), irrespective of the orientation of the longitudinal axis, although it is easiest to illustrate in the figures with the direction-of-motion plane oriented vertically, which in one embodiment aligns with the origin as seen in FIG. 30. Additionally; a transverse plane contains the apex of the palmer arm pressure bulge (320) and is perpendicular to the direction-of-motion plane. In the illustrated embodiment of FIG. 29 the transverse plane is a vertical plane extending into, and out of, the page at the origin. While many of the previously disclosed coordinates are associated with the orientation of the clamp (100), much of the disclosure is irrespective of the orientation when described simply with respect to the direction-of-motion plane and the transverse plane.

In one embodiment the close proximity bulge and the distant bulge are located on opposite sides of the direction-of-motion plane, such as when the close proximity bulge is bulge 4 (256) and the distant bulge is bulge 1 (253), or when the close proximity bulge is bulge 2 (254) and the distant bulge is bulge 5 (257), as seen in FIG. 30. In another embodiment at least a portion of the distant bulge is located on the opposite side of the transverse plane than the location of the reference bulge and the close proximity bulge, such as when the distant bulge 1 (253), bulge 5 (257), or bulge 6 (258), and the close proximity bulge is bulge 2 (254) or bulge 4 (256).

In a further embodiment at least a portion of the reference bulge is located on the same side of the direction-of-motion plane as the location of the close proximity bulge, such as the example illustrated in FIG. 30 with the reference bulge being bulge 3 (255) and the close proximity bulge being bulge 4 (256).

Again, a minimum distance vector, or MDV, is not dependent on the apex of the palmer arm pressure bulge (320), but rather is a vector that is the shortest distance between any point on the apex of palmer arm pressure bulge (320) and any point on the respective DAPP bulges 1-6 (253-258) being analyzed. Thus, a MDV is easily measured in the physical environment and is not illustrated in the figures, although it is analogous to the nearest-point vectors but is not constrained to the apex of the palmer arm pressure bulge (320), and is merely the shortest distance between any portion of a DAPP bulges 1-6 (253-258) being analyzed and any portion of the palmer arm pressure bulge (320). Further, a reference bulge first position contact point is the location that the minimum reference bulge first distance touches the reference bulge, a close proximity bulge first position contact point is the location that the minimum close proximity bulge first distance touches the close proximity bulge, a distant bulge first position contact point is the location that the minimum distant bulge first distance touches the distant bulge. Additionally, a straight-line reference-close distance is a straight line distance from the reference bulge first position contact point to the close proximity bulge first position contact point, and in one embodiment the straight-line reference-close distance is no more than 15 mm, and in another embodiment a straight-line reference-distant distance is a straight line distance from the reference bulge first position contact point to the distant bulge first position contact point and the straight-line reference-distant distance is at least 18 mm. In a further embodiment any of the straight-line reference-close distances are no more than 14 mm, 13 mm, 12 mm, 11 mm, or 10 mm. Similarly, in further embodiments any of the straight-line reference-distant distances are at least 19 mm, 20 mm, 21 mm, or 22 mm.

In another embodiment a first distance from the direction-of-motion plane to the reference bulge first position contact point is less than (a) a second distance from the direction-of-motion plane to the close proximity bulge first position contact point, and (b) a third distance from the direction-of-motion plane to the distant bulge first position contact point. When oriented as in figures such as FIG. 36, these distances essentially correspond to coordinates along the x-axis, and thus any of the disclosure relating to x-coordinates applies equally to distances from the direction-of-motion plane. In a further embodiment the third distance is less than the second distance, and the direction-of-motion plane passes through a portion of the reference bulge.

In yet another embodiment the reference bulge, the close proximity bulge, or bulges, and the distant bulge, or bulges, are each formed as at least a portion of a sphere. In a further embodiment the reference bulge has a reference bulge radius, the close proximity bulge, or bulges, has a close proximity bulge radius within ±35% of the reference bulge radius, and the distant bulge, or bulges, has a distant bulge radius within ±35% of the reference bulge radius; while in further embodiments the disclosed ±35% range is narrowed to ±30%, ±25%, ±20%, ±15%, ±10%, ±5%, or even 0%.

A reference bulge second position contact point is the location that the minimum reference bulge second distance touches the reference bulge, a close proximity bulge second position contact point is the location that the minimum close proximity bulge second distance touches the close proximity bulge, a distant bulge second position contact point is the location that the minimum distant bulge second distance touches the distant bulge. Further, a first second-position distance is measured from the direction-of-motion plane to the reference bulge second position contact point, a second second-position distance is measured from the direction-of-motion plane to the close proximity bulge second position contact point, and a third second-position distance is measured from the direction-of-motion plane to the distant bulge second position contact point. In one embodiment the first second-position distance is not equal to the first distance, and thus the distance from the direction-of-motion plane changes as the clamp (100) is moved from the first position to the second position. Similarly, in another embodiment the third second-position distance is not equal to the third distance, and thus the distance from the direction-of-motion plane changes as the clamp (100) is moved from the first position to the second position.

Another embodiment includes at least two distant bulges including a second distant bulge having a minimum second distant bulge first distance is measured between the second distant bulge and the palmer arm pressure bulge (320) in the first position, a minimum second distant bulge second distance is measured between the second distant bulge and the palmer arm pressure bulge (320) in the second position, and a second distant bulge minimum distance delta is a difference between the minimum second distant bulge first distance and the minimum second distant bulge second distance. Thus, this embodiment includes at least two of bulge 1 (253), bulge 5 (257), and bulge 6 (258). Further, the second distant bulge minimum distance delta is greater than the distant bulge minimum distance delta, while in further embodiment the second distant bulge minimum distance delta is at least two times, three times, four times, or five time greater than the distant bulge minimum distance delta. For example, in the embodiment of Table 11, MDV delta of bulge 6 (258) is significantly greater than MDV delta of bulge 1 (253), which is significantly greater than MDV delta of bulge 5 (257).

Further, a second distant bulge first position contact point is the location that the minimum second distant bulge first distance touches the second distant bulge, and a straight-line second reference-distant distance is a straight line distance from the reference bulge first position contact point to the second distant bulge first position contact point, and in one embodiment the straight-line second reference-distant distance is at least 18 mm. In further embodiments the straight-line second reference-distant distance is at least 19 mm, 20 mm, 21 mm, or 22 mm.

Figure 36:
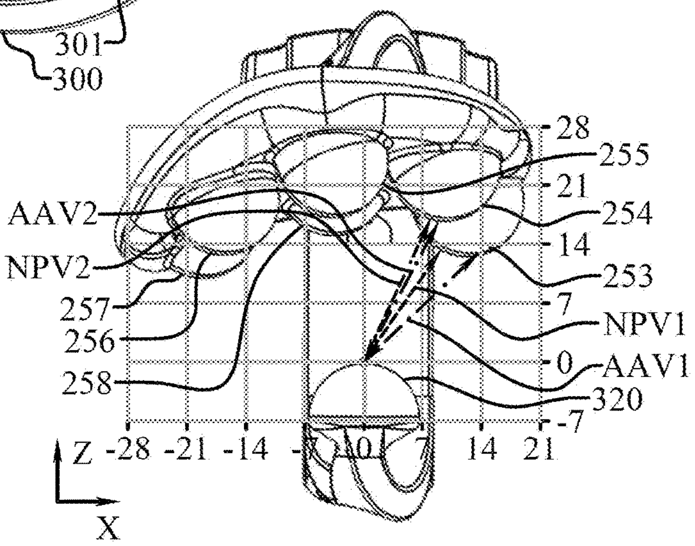
FIG. 36 is a proximal side view of a hand clamp embodiment having a (X, Z) coordinate grid.
Figure 37:
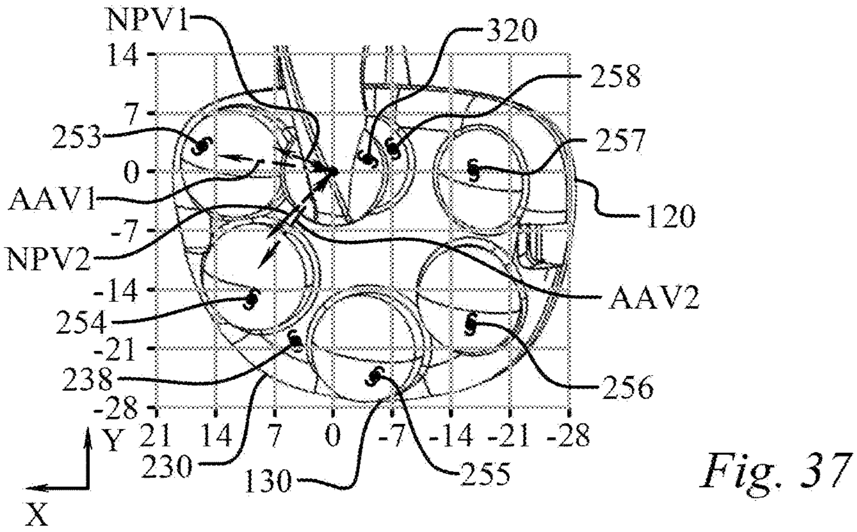
FIG. 37 is a palmer side plan view of a hand clamp embodiment having a (X, Y) coordinate grid.
Figure 38:
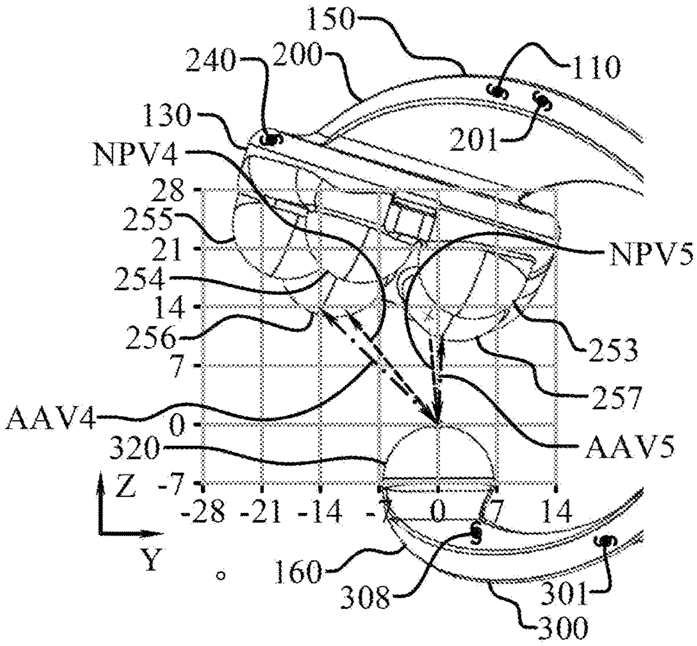
FIG. 38 is a dextral side view of a hand clamp embodiment having a (Y, Z) coordinate grid.
Figure 39:
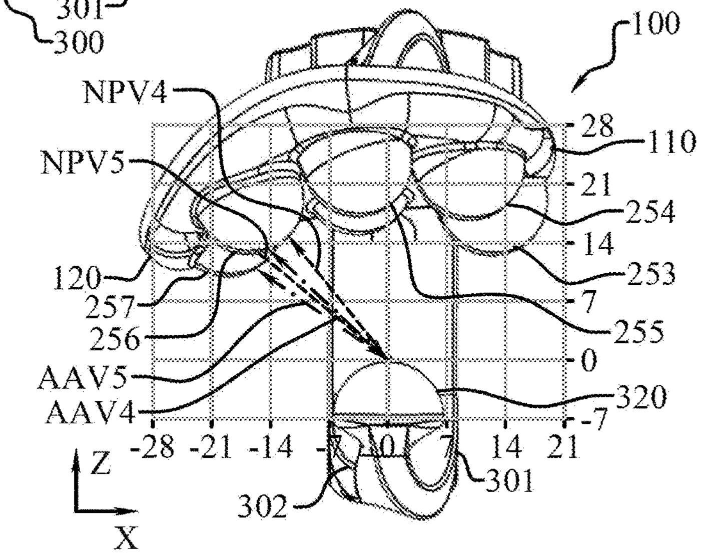
FIG. 39 is a proximal side view of a hand clamp embodiment having a (X, Z) coordinate grid.
Figure 40:
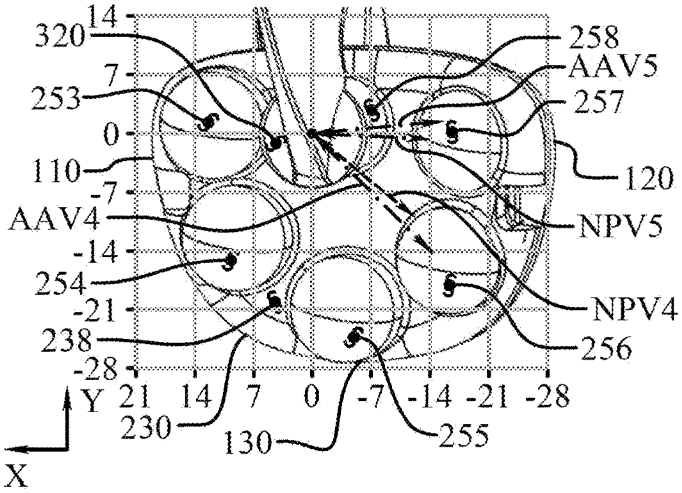
FIG. 40 is a palmer side plan view of a hand clamp embodiment having a (X, Y) coordinate grid.
Figure 41:
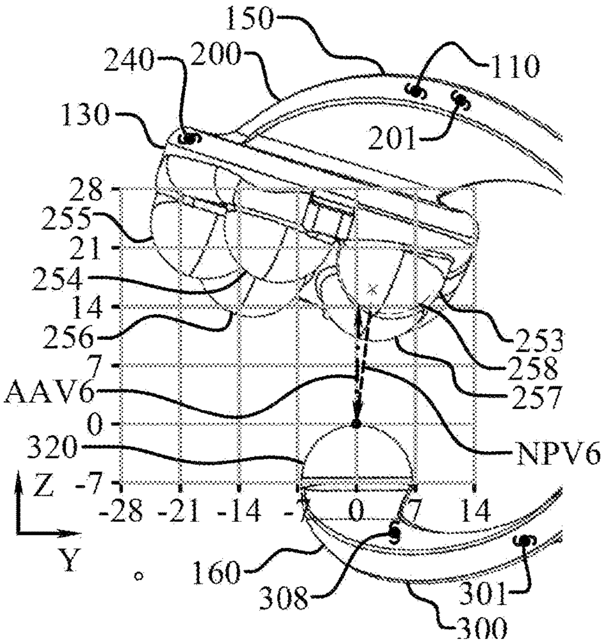
FIG. 41 is a dextral side view of a hand clamp embodiment having a (Y, Z) coordinate grid.
Figure 42:
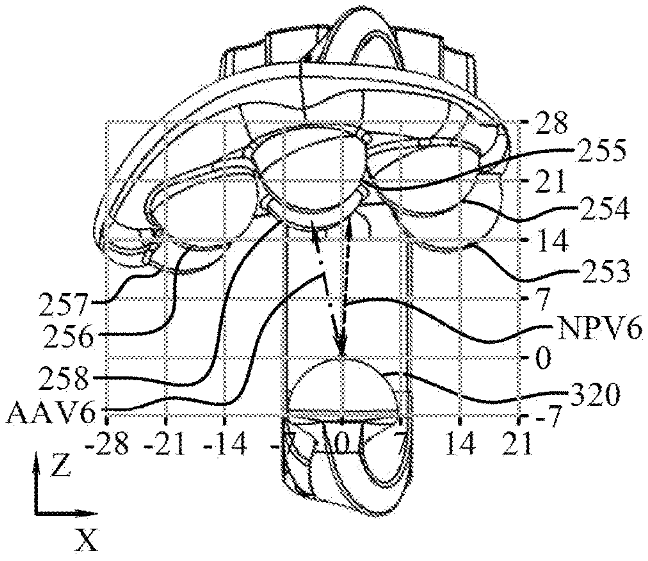
FIG. 42 is a proximal side view of a hand clamp embodiment having a (X, Z) coordinate grid.
Figure 43:
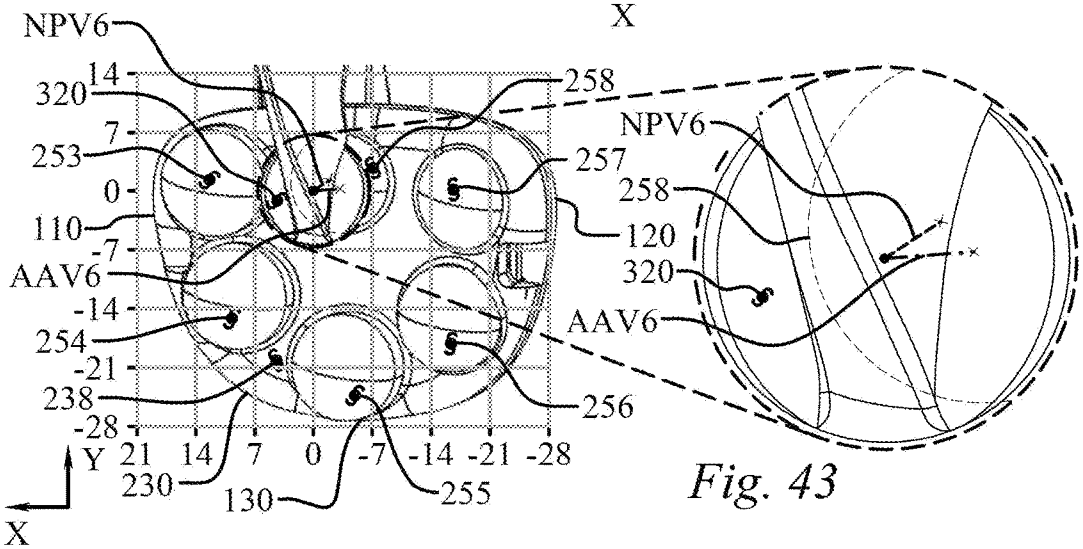
FIG. 43 is a palmer side plan view of a hand clamp embodiment having a (X, Y) coordinate grid.
Figure 44:
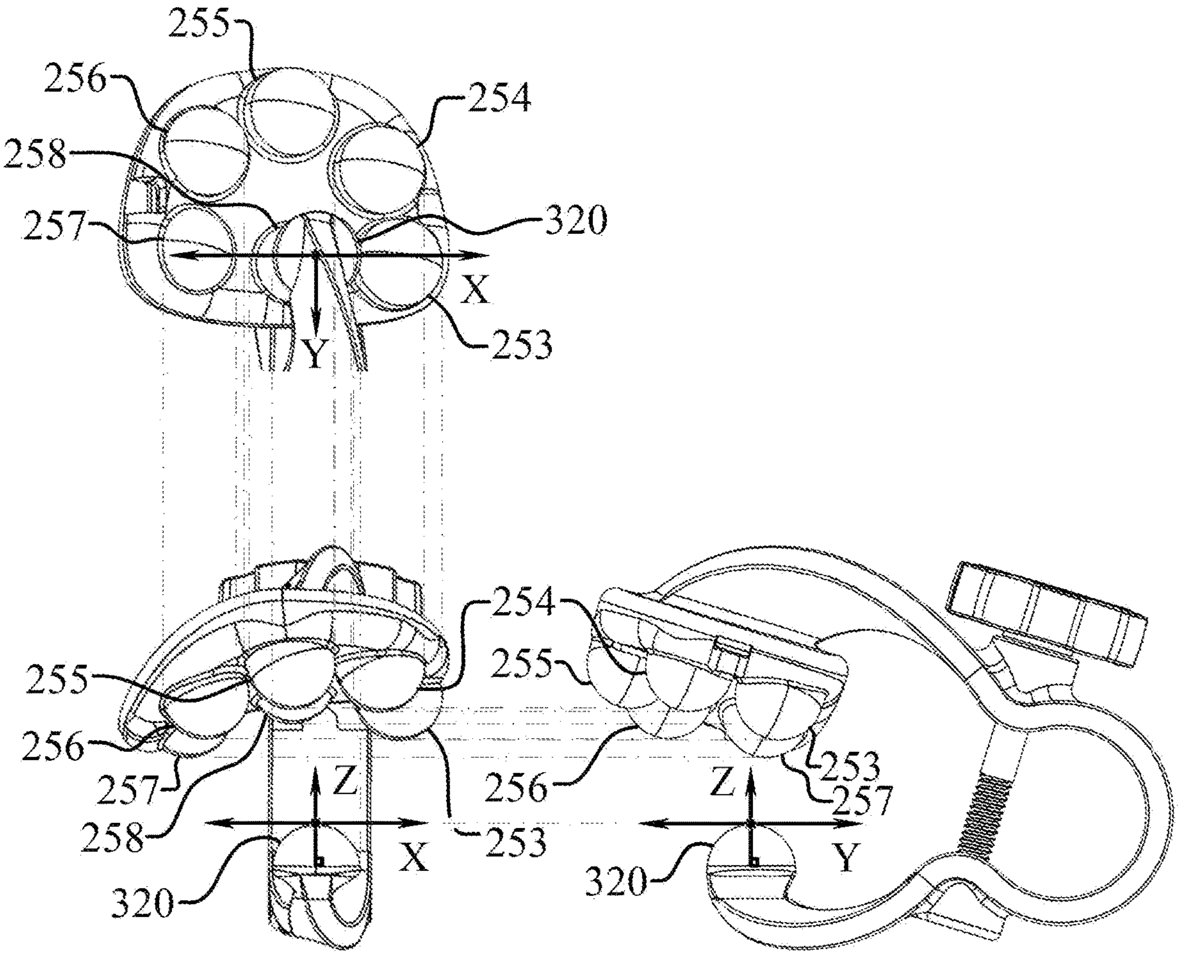
FIG. 44 is a dextral side view, a proximal side view, and a palmer side view of a hand clamp.

In another embodiment a fourth distance from the direction-of-motion plane to the second distant bulge first position contact point is less than the second distance and the third distance, and at least a portion of the second distant bulge is located on the opposite side of the transverse plane than the location of the reference bulge and the close proximity bulge, as easily understood with respect to the second distant bulge being bulge 6 (258) in FIG. 36. In an embodiment the fourth distance is ±5 mm of the first distance, and in further embodiments ±4 mm, ±3 mm, or ±2 mm. In a further embodiment the second distant bulge first position contact point is located on the opposite side of the direction-of-motion plane than the location of the distant bulge first position contact point, and the direction-of-motion plane passes through a portion of the second distant bulge, again as easily understood with respect to the second distant bulge being bulge 6 (258) in FIG. 36.

Another embodiment includes a second close proximity bulge having a minimum second close proximity bulge first distance is measured between the second close proximity bulge and the palmer arm pressure bulge (320) in the first position, a minimum second close proximity bulge second distance is measured between the second close proximity bulge and the palmer arm pressure bulge (320) in the second position, and a second close proximity bulge minimum distance delta is a difference between the minimum second close proximity bulge first distance and the minimum second close proximity bulge second distance. And in another embodiment the second close proximity bulge minimum distance delta is less than the reference bulge minimum distance delta, and the second close proximity bulge minimum distance delta is not equal to the close proximity bulge minimum distance delta.

Additionally, a second close proximity bulge first position contact point is the location that the minimum second close proximity bulge first distance touches the second close proximity bulge, a straight-line second reference-close distance is a straight line distance from the reference bulge first position contact point to the second close proximity bulge first position contact point, and the straight-line second reference-close distance is no more than 15 mm, and in further embodiments no more than 14 mm, 13 mm, 12 mm, or 11 mm. A fifth distance from the direction-of-motion plane to the second close proximity bulge first position contact point is less than the second distance, thus the distance from the direction-of-motion plane changes between the first position and the second position. And in another embodiment the second close proximity bulge first position contact point is located on the opposite side of the direction-of-motion plane than the location of the close proximity bulge first position contact point.

In another example the hand clamp (100) does not require a distinct dorsal arm (200) and/or palmer arm (300). Rather, any of the disclosed biasing mechanism (500) may engage the palmer arm pressure bulge (320) and any one, or more, of the DAPP bulges 1-6 (253-258) so that the distance therebetween is adjustable to create relative movement and change the distance between the palmer arm pressure bulge (320) and the reference bulge.

It should be understood that the DAPP bulges (250) are not limited to the number of DAPP bulges (250) as outlined above, nor is the placement of each of the DAPP bulges (250) limited. In one embodiment of the clamp (100) a user may have their anthropometric measurements taken of their hand to customize the dorsal arm pressure plate (DAPP) (230) with the number of DAPP bulges (250), size, shape, height, and placement of the individual DAPP bulges (250). For example, someone who is petite may require a dorsal arm pressure plate (DAPP) (230) that is much smaller than one for a large man. Additionally, someone who is elderly has skin that may have lost its elasticity and has become thinner; as a result the DAPP bulge (250) height may need to be reduced to prevent injury to the person.

One embodiment includes a system and method whereby a user takes at least one photo of their hand, a software system analyzes the at least one photo, generates a custom DAPP template, and transmits the custom DAPP template to an additive manufacturing machine, such as a 3-D printer, or transmits to the custom DAPP template to a material removal manufacturing machine, such as a CNC milling machine, and creates a custom dorsal arm pressure plate (DAPP) (230) and/or a complete custom clamp (100).

In another embodiment the clamp (100) is sold in the form of a kit that includes at least two different dorsal arm pressure plates (DAPP) (230) that the user may select from releasably install on the clamp (100). In one embodiment the two different dorsal arm pressure plates (DAPP) (230) have at least one of the following: (a) differing quantities of bulges, (b) differing sizes of bulges, (c) differing spacing of bulges, (d) differing materials, and/or (e) differing hardness. In one embodiment a first dorsal arm pressure plate (DAPP) (230) with a first location of bulge 3 (255), and a second dorsal arm pressure plate (DAPP) (230) with a second location of bulge 3 (255) that is different than first location of bulge 3 (255). In a further embodiment the difference is at least 1 mm in any of the disclosed x-coordinates, y-coordinates, and/or z-coordinates; and further embodiments change the 1 mm to at least 2 mm, 3 mm, 4 mm, 5 mm, 6 mm, 7 mm, 8 mm, 9 mm, or 10 mm.

In another embodiment the clamp (100) includes a safety feature to prevent a user from over tightening the clamp. The biasing mechanism (500) may incorporate a torque limiting feature, for example the adjustment screw knob (512) may free-wheel once a predetermined torque is reached so that the clamp (100) may not be further tightened beyond the predetermined torque setting. Similarly, one, or both, of the arms may incorporate a frangible section designed to safely break without risk of injuring the user once a predetermined stress level is reached within the arm.

The clamp (100) may comprise in part or whole from, but not limited to the following plastics: Polyethylene (PE), Polypropylene (PP), Acrylonitrile Butadiene Styrene (ABS), Polystyrene (PS), Polycarbonate (PC), Polyvinyl Chloride (PVC), Polyethylene Terephthalate (PET), Polyamide (Nylon), Polyoxymethylene (POM) or Acetal, Polyphenylene Oxide (PPO), Polyphenylene Sulfide (PPS), Polyetheretherketone (PEEK), Polyurethane (PU), Thermoplastic Elastomers (TPE). Furthermore, the clamp may further be comprised in part or whole from, but not limited to the following metals: Aluminum (Al), Zinc (Zn), Magnesium (Mg), Copper (Cu), Brass (Cu—Zn alloy), Bronze (Cu—Sn alloy), Iron (Fc), Stainless Steel, Tin (Sn), Titanium (Ti), Nickel (Ni), Zamak (a family of zinc alloys), Zamak 3 (Zn—Al—Cu—Mg alloy), Zamak 5 (Zn—Al—Cu—Mg alloy), Zamak 7 (Zn—Al—Cu—Mg alloy).

Further, in one embodiment one or more of the DAPP bulges 1-6 (253-258) may have different material properties from one or more of the other DAPP bulges 1-6 (253-258); while in a further embodiment the palmer arm pressure bulge (320) may have different material properties than one or more of the DAPP bulges 1-6 (253-258). It should be noted that any of the disclosure made with respect to one or more of the DAPP bulges 1-6 (253-258) may also be applied to the palmer arm pressure bulge (320).

In some embodiments, the bulge material may have a modulus of elasticity ranging from about 0.001 GPa to about 25 GPa, and a durometer ranging from about 5 to about 95 on a Shore D scale. In other examples, gels or liquids can be used, and softer materials which are better characterized on a Shore A or other scale can be used. The Shore D hardness on a polymer is measured in accordance with the ASTM (American Society for Testing and Materials) test D2240. In some embodiments, the bulge material may have a density of at least 0.50 g/cc, and at least 0.70, 0.90, 1.1, and 1.3 g/cc in additional embodiments. In a further series of embodiments the bulge material density is no more than 2.00 g/cc, and no more than 1.90, 1.80, 1.70, and 1.60 g/cc in additional embodiments. The bulge material may have a hardness of about 10 to about 70 shore A hardness. In certain embodiments, a shore A hardness of about 40 or less is preferred. In certain embodiments, a shore D hardness of up to about 40 or less is preferred. Any one or more of the bulges may have different durometers, masses, densities, colors, and/or other material properties. Further, in one embodiment at least one bulge is formed of at least 2 materials where the density of the heavier material is at least 10% greater than the density of the lighter material, and at least 20%, 30%, and 50% in additional embodiments. While in further embodiments at least one bulge is formed of at least 2 materials where the density of the heavier material is no more than 500% greater than the density of the lighter material, and no more than 450%, 400%, 350%, 300%, and 250% in additional embodiments. Likewise with respect to hardness, in one such embodiment at least one bulge is formed of at least 2 materials where the hardness on a Shore A scale of the harder material is at least 10% greater than the Shore A hardness of the softer material, and at least 20%, 30%, and 50% in additional embodiments. While in further embodiments the Shore A hardness of the harder material is no more than 500% greater than the Shore A hardness of the softer material, and no more than 450%, 400%, 350%, 300%, and 250% in additional embodiments. The use of varying materials controls and/or changes the activation of the various acupressure points. In one embodiment the palmer arm pressure bulge (320) is formed a different material than at least one of the DAPP bulges 1-6 (253-258). In another embodiment at least one of the DAPP bulges 1-6 (253-258) is formed of a different material than at least one other of the DAPP bulges 1-6 (253-258). In a further embodiment, the hardness of bulge 3 (255) is greater than the hardness of at least one of bulge 1 (253), bulge 2 (254), bulge 4 (256), bulge 5 (257), or bulge 6 (258). In another embodiment, the hardness of bulge 3 (255) is at least 5%, 10%, or 15% greater than the hardness of at least one of bulge 1 (253), bulge 2 (254), bulge 4 (256), bulge 5 (257), or bulge 6 (258). In yet another embodiment, the hardness of bulge 3 (255) is no more than 50%, 40%, 30%, or 20% greater than the hardness of at least one of bulge 1 (253), bulge 2 (254), bulge 4 (256), bulge 5 (257), or bulge 6 (258). In another embodiment the hardness of the palmer arm pressure bulge (320) is greater than at least one, two, three, four, five, or all six of bulge 1 (253), bulge 2 (254), bulge 3 (255), bulge 4 (256), bulge 5 (257), or bulge 6 (258). In a further embodiment the hardness of the palmer arm pressure bulge (320) is less than at least one, two, three, four, five, or all six of bulge 1 (253), bulge 2 (254), bulge 3 (255), bulge 4 (256), bulge 5 (257), or bulge 6 (258). The bulges may be manufactured at least in part of rubber, silicone, elastomer, another relatively low modulus material, metal, another material, or any combination thereof. In another embodiment the bulges may be formed, at least in part, of one or more of various polymers (e.g., ABS plastic, nylon, and/or polycarbonate), a fiber-reinforced polymer material, an elastomer or a viscoelastic material (e.g., rubber or any of various synthetic elastomers, such as polyurethane, a thermoplastic or thermoset material polymer, or silicone), any combination of these materials, or another material. Further, any of the components disclosed may be formed, at least in part, of one or more of ABS (acrylonitrile-butadiene-styrene) plastic, a composite (e.g., true carbon or another material), a metal or metal alloy (e.g., titanium, aluminum, steel, tungsten, nickel, cobalt, an alloy including one or more of these materials, or another alloy), one or more of various polymers (e.g., ABS plastic, nylon, and/or polycarbonate), a fiber-reinforced polymer material, an elastomer or a viscoelastic material (e.g., rubber or any of various synthetic elastomers, such as polyurethane, a thermoplastic or thermoset material polymer, or silicone), any combination of these materials, or another material. Examples of materials that may be utilized for the bulges include, without limitation; viscoelastic elastomers; vinyl copolymers with or without inorganic fillers; polyvinyl acetate with or without mineral fillers such as barium sulfate; acrylics; polyesters; polyurethanes; polyethers; polyamides; polybutadienes; polystyrenes; polyisoprenes; polyethylenes; polyolefins; styrene/isoprene block copolymers; hydrogenated styrenic thermoplastic elastomers; metallized polyesters; metallized acrylics; epoxies; epoxy and graphite composites; natural and synthetic rubbers; piezoelectric ceramics; thermoset and thermoplastic rubbers; foamed polymers; ionomers; low-density fiber glass; bitumen; silicone; and mixtures thereof. The metallized polyesters and acrylics can comprise aluminum as the metal. Commercially available materials include resilient polymeric materials such as Scotchweld™ (e.g., DP-105™) and Scotchdamp™ from 3M, Sorbothane™ from Sorbothane, Inc., DYAD™ and GP™ from Soundcoat Company Inc., Dynamat™ from Dynamat Control of North America, Inc., NoViFlex™ Sylomer™ from Pole Star Maritime Group, LLC, Isoplast™ from The Dow Chemical Company, Legetolex™ from Piqua Technologies, Inc., and Hybrar™ from the Kuraray Co., Ltd.

Any one or more of the bulges may have a color or shade selected to contrast with at least one of the other bulges to further aid the user in proper placement of the clamp (100). Contrast can be quantified with reference to the CIELAB color system, a three dimensional system which defines a color space with respect to three channels or scales, one scale or axis for Luminance (lightness) (L) an "a" axis which extends from green (−a) to red (+a) and a "b" axis from blue (−b) to yellow (+b). A color difference between two colors can then be quantified using the following formula:

$$\Delta E^*_{ab} = \sqrt{(L^*_2 - L^*_1)^2 + (a^*_2 - a^*_1)^2 + (b^*_2 - b^*_1)^2}$$

where ($L^*_1$, $a^*_1$ and $b^*_1$) and ($L^*_2$, $a^*_2$ and $b^*_2$) represents two colors in the L, a, b space and where $\Delta E_{ab}$=2.3 sets the threshold for the "just noticeable difference" under illuminant conditions using the reference illuminant D65 (similar to outside day lighting) as described in CIE 15.2-1986. Thus, for the bulges of the present invention, a contrasting color difference, $\Delta E_{ab}$, is greater than 2.3, preferably greater than 10, more preferably greater than 20, even more preferably greater than 40 and even more preferably greater than 60.

One skilled in the art will recognize the relative luminance can be calculated from any color code (like HEX or RGB). Additionally, a contrast can be defined by the relative luminance of the lighter color (L1) is divided by the relative luminance of the darker color (L2) via a contrast ratio equal to (L1+0.05)/(L2+0.05). For the purposes of this application the contrasting color is the one with the higher relative luminance value. In a further embodiment the contrast ratio of the contrasting color to an adjacent color is at least 3.0, while in a further embodiment the contrast ratio is at least 5.0, and at least 7.0, and at least 9.0 in additional embodiments. In a further series of embodiments the contrast ratio is 21 or less, and 19 or less in another embodiment, and 17 or less in yet a further embodiment.

Any one or more of the bulges may be translucent or transparent. Further, any one or more of the bulges may have a surface texture, and/or frictional or adhesion characteristics, that is different than the surface texture, and/or frictional or adhesion characteristics, of at least one of the other bulges. Different textures may be manufactured into the bulges via ridges and/or valleys, or the application of stickers or films to the bulges.

In a further embodiment at least one of the bulges includes an antimicrobial agent, which may be in the form of a surface coating, and which may exhibit migration through bulge as the surface coating of antimicrobial agent is depleted. In yet another embodiment at least one of the bulges includes a moisture-resistant, antimicrobial and/or an antibacterial material, and/or is coated with an antimicrobial coating composition, which may include a hydrophilic polymer (or a mixture of polymers) and antimicrobial active agent(s) immobilized within the coating composition.

According to some embodiments, the at least one antimicrobial agent is selected from the group consisting of: essential oils, acids, esters or salts thereof and bacteriocins. According to some embodiments, the at least one antimicrobial agent is selected from the group consisting of: benzoic acid salt, salicylic acid salt, ascorbic acid, zinc oxide and lauric alginate. According to some embodiments, the at least one antimicrobial active agent is a natural active agent, obtained from a natural source, and not an artificially synthesized molecule. According to some embodiments, the at least one active agent is selected from the group consisting of: essential oils, acids and bacteriocins. According to some embodiments, the at least one active agent comprises at least one essential oil selected from the group consisting of agar oil or oodh, distilled from agarwood (*Aquilaria malaccen-*

*sis*), Ajwain oil, distilled from the leaves of (*Carum copticum*), Angelica root oil, distilled from the *Angelica archangelica*, Anise oil, from the *Pimpinella anisum*, Asafoctida oil, Balsam of Peru, from the Myroxylon, Basil oil, Bay oil, Bergamot oil, Black pepper oil, Buchu oil, made from the buchu shrub, Birch oil, Camphor oil, Cannabis flower essential oil, Calamodin oil (or calamansi essential oil), Caraway seed oil, Cardamom seed oil, Carrot seed oil, Carvacrol oil, Cedar oil (or cedarwood oil), Chamomile oil, Calamus oil, Cinnamon oil, Cistus ladanifer oil (leaves and flowers), Citron oil, Citronella oil, Citrus oil, Clary Sage oil, Coconut oil, Clove oil, coffee oil, Coriander oil, Costmary oil (bible leaf oil), Costus root oil, Cranberry seed oil, Cubeb oil, Cumin seed oil/black seed oil, Cypress oil, Cypriol oil, Curry leaf oil, Davana oil, from the *Artemisia pallens*, Dill oil, Elecampane oil, Eucalyptus oil, Fennel seed oil, Fenugreek oil, Frankincense oil, Galangal oil, Galbanum oil, Garlic oil distilled from *Allium sativum*, Geranium oil, Ginger oil, Goldenrod oil, Grapefruit oil, Henna oil, Helichrysum oil, Hickory nut oil, Horseradish oil, Hyssop, Idaho-grown Tansy, Jasmine oil, Juniper berry oil, *Laurus nobilis* oil, Lavender oil, Ledum oil, Lemon oil, Lemongrass oil, Lime, *Litsea cubeba* oil, Linalool, extract of liquorice root, Mandarin oil, Marjoram oil, Melissa oil, *Mentha arvensis* oil, Moringa oil, Mountain Savory oil, Mugwort oil, Mustard oil, Myrrh oil, Myrtle, Neem oil, Neroli produced from the blossom of the bitter orange tree, Nutmeg oil, Orange oil, Oregano oil, Orris oil extracted from the roots of the Florentine iris (*Iris florentina*), *Iris germanica* and *Iris pallida*, Palo Santo, Palmarosa Essential oil, Parsley oil, Patchouli oil, Perilla essential oil, Pennyroyal oil, Peppermint oil, Petitgrain, Pine oil, Ravensara, Red Cedar, Roman Chamomile, Rose oil, Rosehip oil, Rosemary oil, Rosewood oil, Sage oil, Sandalwood oil, Sassafras oil, Savory oil, from *Satureja* species, Schisandra oil, Spearmint oil, Spikenard, Spruce oil, Star anise oil, Tangerine, Tarragon oil, distilled from *Artemisia dracunculus*, Tea tree oil, Thyme oil, Tsuga oil, Turmeric, Valerian oil, Warionia, Vetiver oil (khus oil), Western red cedar, Wintergreen, Yarrow oil and Ylang-ylang oil. Each possibility is a separate embodiment of the present invention. In some embodiments, the one or more essential oil is selected from the group consisting of Lemmon essential oil, Clove oil, Citrus oil, Carvacrol essential oil. Each possibility is a separate embodiment of the present invention.

In another embodiment, one or more of the DAPP bulges 1-6 (253-258) or palmer arm pressure bulge (320) may be removable and interchangeable. Thus, a kit may include bulges of different sizes and/or configurations and orientations that may be removably installed on the clamp (100) to provide significant adjustability and applicability to hands of widely variable sizes and/or sensitivities. Thus, a kit may include multiple variations of any of the DAPP bulges 1-6 (253-258) or the palmer arm pressure bulge (320), including any of the disclosed variations.

A further embodiment incorporates pressure sensing technology to display and/or control the force applied by the DAPP bulges 1-6 (253-258) or the palmer arm pressure bulge (320). For instance, in one embodiment at least one of the DAPP bulges 1-6 (253-258) or the palmer arm pressure bulge (320) incorporates a pressure sensor, and/or force sensor, in communication with a display device, which be a clamp mounted display or a remote display, such as a display of a mobile phone. In another embodiment a pressure sensor, and/or force sensor, and/or strain/stress sensor is incorporated into one, or more, of the dorsal arm (200), the palmer arm (300), the resilient arm connector (400), the biasing mechanism (500), the dorsal arm pressure plate (DAPP) (230), and/or the dorsal arm pressure plate engaging insert (PEI) (210), in communication with a display device, which be a clamp mounted display or a remote display, such as a display of a mobile phone. Additionally, the display device may incorporate a predetermined high level safety setting and/or a predetermined effective range setting, and audible or tactile feedback signals may be generated by the display device to communicate to the user.

In other embodiments one, or more, of the DAPP bulges 1-6 (253-258) or the palmer arm pressure bulge (320), may be fluid filled. In another embodiment the fluid pressure may be adjustable by the user. In another embodiment one, or more, of the DAPP bulges 1-6 (253-258) or the palmer arm pressure bulge (320) includes a fluid port for communication with a fluid applicator, such as a syringe, thereby allowing the user to individually adjust the amount of fluid, and therefore the hardness, of the bulge. Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. Any of the disclosed coordinates are plus or minus 5 mm in one embodiment, plus or minus 4 mm in another embodiment, plus or minus 3 mm in a further embodiment, plus or minus 2 mm in still another embodiment, and plus or minus 1 mm in yet a further embodiment. The corresponding structures, materials, acts, and equivalents of all means or step plus function elements in the claims below are intended to include any structure, material, or acts for performing the functions in combination with other claimed elements as specifically claimed.

The invention claimed is:

1. A hand clamp (100), comprising:

a dorsal arm (200) having a dorsal arm pressure plate (230) with a reference bulge, at least one close proximity bulge, and at least one distant bulge;

a palmer arm (300) having a palmer arm pressure bulge (320);

a biasing mechanism (500) engaging the dorsal arm (200) and the palmer arm (300) and is adjustable to create relative movement of the dorsal arm (200) and the palmer arm (300) thereby changing the distance between the palmer arm pressure bulge (320) and the reference bulge;

wherein;

a first position is defined by a minimum reference bulge first distance of 20 mm measured between the palmer arm pressure bulge (320) and the reference bulge, a second position is defined by a minimum reference bulge second distance of 18 mm between the palmer arm pressure bulge (320) and the reference bulge, and a reference bulge minimum distance delta is the difference between the minimum reference bulge first distance and the minimum reference bulge second distance;

a minimum close proximity bulge first distance is measured between the close proximity bulge and the palmer arm pressure bulge (320) in the first position, a minimum close proximity bulge second distance is measured between the close proximity bulge and the palmer arm pressure bulge (320) in the second position, and a close proximity bulge minimum distance delta is a difference between the minimum close proximity bulge first distance and the minimum close proximity bulge second distance;

a minimum distant bulge first distance is measured between the distant bulge and the palmer arm pressure bulge (320) in the first position, a minimum distant bulge second distance is measured between the distant bulge and the palmer arm pressure bulge (320) in the second position, and a distant bulge minimum distance delta is a difference between the minimum distant bulge first distance and the minimum distant bulge second distance;

the close proximity bulge minimum distance delta is less than the reference bulge minimum distance delta, and the distant bulge minimum distance delta is greater than the reference bulge minimum distance delta.

2. The hand clamp (200) of claim 1, wherein the distant bulge minimum distance delta is at least two times the reference bulge minimum distance delta, and the distant bulge minimum distance delta is at least three times the close proximity bulge minimum distance delta.

3. The hand clamp (200) of claim 2, wherein the distant bulge minimum distance delta is no more than fifteen times the reference bulge minimum distance delta, and the distant bulge minimum distance delta is no more than ten times the close proximity bulge minimum distance delta.

4. The hand clamp (200) of claim 3, wherein the biasing mechanism has a longitudinal axis, a direction-of-motion plane contains the longitudinal axis and an apex of the palmer arm pressure bulge (320), and a transverse plane contains the apex of the palmer arm pressure bulge (320) and is perpendicular to the direction-of-motion plane, the close proximity bulge and the distant bulge are located on opposite sides of the direction-of-motion plane, and at least a portion of the distant bulge is located on the opposite side of the transverse plane than the location of the reference bulge and the close proximity bulge.

5. The hand clamp (200) of claim 4, wherein at least a portion of the reference bulge is located on the same side of the direction-of-motion plane as the location of the close proximity bulge.

6. The hand clamp (200) of claim 5, wherein a reference bulge first position contact point is the location that the minimum reference bulge first distance touches the reference bulge, a close proximity bulge first position contact point is the location that the minimum close proximity bulge first distance touches the close proximity bulge, a distant bulge first position contact point is the location that the minimum distant bulge first distance touches the distant bulge, a straight-line reference-close distance is a straight line distance from the reference bulge first position contact point to the close proximity bulge first position contact point and the straight-line reference-close distance is no more than 15 mm, and a straight-line reference-distant distance is a straight line distance from the reference bulge first position contact point to the distant bulge first position contact point and the straight-line reference-distant distance is at least 18 mm.

7. The hand clamp (200) of claim 6, wherein a first distance from the direction-of-motion plane to the reference bulge first position contact point is less than (a) a second distance from the direction-of-motion plane to the close proximity bulge first position contact point, and (b) a third distance from the direction-of-motion plane to the distant bulge first position contact point.

8. The hand clamp (200) of claim 7, wherein the third distance is less than the second distance, and the direction-of-motion plane passes through a portion of the reference bulge.

9. The hand clamp (200) of claim 7, wherein the reference bulge, the close proximity bulge, and the distant bulge are each formed as at least a portion of a sphere.

10. The hand clamp (200) of claim 9, wherein the reference bulge has a reference bulge radius, the close proximity bulge has a close proximity bulge radius within ±35% of the reference bulge radius, and the distant bulge has a distant bulge radius within ±35% of the reference bulge radius.

11. The hand clamp (200) of claim 7, wherein a reference bulge second position contact point is the location that the minimum reference bulge second distance touches the reference bulge, a close proximity bulge second position contact point is the location that the minimum close proximity bulge second distance touches the close proximity bulge, a distant bulge second position contact point is the location that the minimum distant bulge second distance touches the distant bulge, a first second-position distance is measured from the direction-of-motion plane to the reference bulge second position contact point, a second second-position distance is measured from the direction-of-motion plane to the close proximity bulge second position contact point, and a third second-position distance is measured from the direction-of-motion plane to the distant bulge second position contact point, and wherein the first second-position distance is not equal to the first distance.

12. The hand clamp (200) of claim 7, wherein the third second-position distance is not equal to the third distance.

13. The hand clamp (200) of claim 7, further including a second distant bulge having a minimum second distant bulge first distance is measured between the second distant bulge and the palmer arm pressure bulge (320) in the first position, a minimum second distant bulge second distance is measured between the second distant bulge and the palmer arm pressure bulge (320) in the second position, and a second distant bulge minimum distance delta is a difference between the minimum second distant bulge first distance and the minimum second distant bulge second distance, wherein the second distant bulge minimum distance delta is greater than the distant bulge minimum distance delta.

14. The hand clamp (200) of claim 13, wherein a second distant bulge first position contact point is the location that the minimum second distant bulge first distance touches the second distant bulge, and a straight-line second reference-distant distance is a straight line distance from the reference bulge first position contact point to the second distant bulge first position contact point, and the straight-line second reference-distant distance is at least 18 mm.

15. The hand clamp (200) of claim 14, wherein a fourth distance from the direction-of-motion plane to the second distant bulge first position contact point is less than the second distance and the third distance, and at least a portion of the second distant bulge is located on the opposite side of the transverse plane than the location of the reference bulge and the close proximity bulge.

16. The hand clamp (200) of claim 15, wherein the fourth distance is ±5 mm of the first distance.

17. The hand clamp (200) of claim 15, wherein the second distant bulge first position contact point is located on the opposite side of the direction-of-motion plane than the location of the distant bulge first position contact point, and the direction-of-motion plane passes through a portion of the second distant bulge.

18. The hand clamp (200) of claim 13, further including a second close proximity bulge having a minimum second close proximity bulge first distance is measured between the second close proximity bulge and the palmer arm pressure bulge (320) in the first position, a minimum second close proximity bulge second distance is measured between the second close proximity bulge and the palmer arm pressure bulge (320) in the second position, and a second close proximity bulge minimum distance delta is a difference between the minimum second close proximity bulge first distance and the minimum second close proximity bulge second distance, wherein the second close proximity bulge minimum distance delta is less than the reference bulge minimum distance delta, and the second close proximity bulge minimum distance delta is not equal to the close proximity bulge minimum distance delta.

19. The hand clamp (200) of claim 18, wherein a second close proximity bulge first position contact point is the location that the minimum second close proximity bulge first distance touches the second close proximity bulge, a straight-line second reference-close distance is a straight line distance from the reference bulge first position contact point to the second close proximity bulge first position contact point and the straight-line second reference-close distance is no more than 15 mm.

20. The hand clamp (200) of claim 19, wherein a fifth distance from the direction-of-motion plane to the second close proximity bulge first position contact point is less than the second distance, and the second close proximity bulge first position contact point is located on the opposite side of the direction-of-motion plane than the location of the close proximity bulge first position contact point.

* * * * *